US008819026B2

(12) United States Patent
Fischer

(10) Patent No.: US 8,819,026 B2
(45) Date of Patent: *Aug. 26, 2014

(54) SEQUENTIAL CHAIN REGISTRY

(75) Inventor: Randal B. Fischer, Ridgway, CO (US)

(73) Assignee: SCR Technologies, Inc., Ridgway, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,288

(22) Filed: Aug. 25, 2011

(65) Prior Publication Data

US 2012/0054201 A1    Mar. 1, 2012

Related U.S. Application Data

(60) Provisional application No. 61/377,809, filed on Aug. 27, 2010.

(51) Int. Cl.
*G06F 17/30* (2006.01)

(52) U.S. Cl.
USPC .......................... 707/742; 707/748; 707/793

(58) Field of Classification Search
USPC ......................................... 707/748, 742, 793
See application file for complete search history.

(56) References Cited

U.S. PATENT DOCUMENTS

| 6,725,287 | B1   | 4/2004  | Loeb et al. |
| 7,047,420 | B2 * | 5/2006  | Douceur et al. ............... 713/190 |
| 7,082,437 | B2   | 7/2006  | Reed et al. |
| 7,281,008 | B1   | 10/2007 | Lawrence et al. |
| 8,126,933 | B2 * | 2/2012  | Nishiyama .................... 707/803 |
| 8,290,986 | B2 * | 10/2012 | Popescul et al. .............. 707/798 |
| 2001/0037255 | A1 | 11/2001 | Tambay et al. |
| 2003/0177025 | A1 | 9/2003  | Curkendall et al. |
| 2003/0220862 | A1 | 11/2003 | Kilgore et al. |
| 2004/0000586 | A1 | 1/2004  | White |
| 2004/0093501 | A1 | 5/2004  | Holcombe et al. |
| 2005/0038710 | A1 | 2/2005  | Zimmerman et al. |
| 2005/0065862 | A1 | 3/2005  | Doubet |
| 2006/0100939 | A1 | 5/2006  | Boyer et al. |
| 2006/0101067 | A1 * | 5/2006 | Kilian-Kehr et al. ..... 707/103 R |
| 2006/0253385 | A1 | 11/2006 | Reams |
| 2007/0083551 | A1 * | 4/2007 | Jezierski et al. .......... 707/103 R |
| 2007/0156544 | A1 | 7/2007  | Meyer et al. |
| 2007/0192216 | A1 | 8/2007  | Arnold et al. |

(Continued)

FOREIGN PATENT DOCUMENTS

| WO | WO 02/21401 A2 | 3/2002 |
| WO | WO 2008011076 | 1/2008 |
| WO | WO 2008049033 | 4/2008 |

OTHER PUBLICATIONS

PCT International Search Report and Written Opinion mailed Apr. 9, 2012, in Application PCT/US2011/049372, 9 pages.

(Continued)

*Primary Examiner* — Noosha Arjomandi
(74) *Attorney, Agent, or Firm* — Merchant & Gould P.C.

(57) ABSTRACT

Systems and methods are disclosed for tracking an object as it traverses a sequential chain. The relationships between the object, its movement through space and time, and the entities associated with the object at a discreet point of time are captured by a sequential chain. A unique identifier may be created that is continuously modified as the object traverses the sequential chain. The unique identifier may be used to capture relationship information between the object and its related entities and movements.

20 Claims, 30 Drawing Sheets

(56) References Cited

U.S. PATENT DOCUMENTS

| | | | |
|---|---|---|---|
| 2007/0219916 A1* | 9/2007 | Lucas | 705/58 |
| 2008/0010239 A1 | 1/2008 | Nochta | |
| 2008/0195434 A1 | 8/2008 | Broughton | |
| 2008/0215719 A1 | 9/2008 | Swan | |
| 2009/0187583 A1* | 7/2009 | Pape et al. | 707/100 |
| 2009/0271435 A1 | 10/2009 | Yako et al. | |
| 2009/0299805 A1 | 12/2009 | Baughman et al. | |
| 2009/0307032 A1* | 12/2009 | Tribe et al. | 705/7 |
| 2010/0017436 A1 | 1/2010 | Wolge | |
| 2010/0023520 A1 | 1/2010 | Barboy et al. | |
| 2010/0076931 A1 | 3/2010 | Bornhoevd et al. | |
| 2012/0054246 A1 | 3/2012 | Fischer | |
| 2013/0262331 A1 | 10/2013 | Fischer | |

OTHER PUBLICATIONS

PCT International Search Report and Written Opinion mailed Apr. 9, 2012, in Application PCT/US2011/049378, 9 pages.
"Betfair Fraud Detection Use Case", EPTS F2F Meeting, Stamford, CT, Sep. 2008, pp. 1-15.
"Big Data Bonanza", Financial Times, Dec. 14, 2012, pp. 1-2.
"Brief Summary of the Dodd-Frank Wall Street Reform and Consumer Protection Act", pp. 1-16.
"Global Risks 2008: A Global Risk Network Report", World Economic Forum, Jan. 2008, 54 pages.
"Google ventures has big plans for 'start-up university' ", The Wall Street Journal, Feb. 13, 2012, pp. 1-2.
"One easy way to start a trade war", Financial Times, Dec. 9, 2009, 1 page.
"Sunshine Rules", Financial Times, Aug. 22, 2012, pp. 1-2.
Accenture, "High Performance in a Volatile World: Seven Imperatives for Achieving Dynamic Supply Chains", 2009, pp. 1-24.
Aciar, Silvana et al., "Informed Recommender: Basing Recommendations on Consumer Product Reviews", IEEE, May/Jun. 2007, pp. 39-47.
Almgren, Robert, "Event Processing in Algorithmic Trading", Gartner Event Processing Summit, Sep. 15, 2008, pp. 1-32.
Armstrong, Robert et al., "Lex in depth: Facebook", Financial Times, May 2, 2012, pp. 1-7.
Arthur, W. Brian, "Competing Technologies, Increasing Returns, and Lock-In by Historical Events", Jun. 1987, revised May 1988, 22 pgs.
Atkins, Ralph, "Eurozone: Frankfurt's dilemma", Financial Times, May 24, 2011, pp. 1-4.
Balch, Oliver, "Assessment tools come of age", Financial Times, Nov. 25, 2009, pp. 1-2.
Barboza, David, "Supply chain for iPhone highlights costs in China", The New York Times, Jul. 5, 2010, pp. 1-4.
Baulier, Jerry, "What is the technology vision for event processing?", Aleri, EPTS Symposium, Sep. 18, 2008, pp. 1-29.
Bizarro, Pedro, "EPTS Use Case Workgroup Status Report", 4th EPTS Symposium, Stamford, CT, Sep. 18, 2008, pp. 1-24.
Bizarro, Pedro, "Status report on the BiCEP—Benchmarking Complex Event Processing project", 4th EPTS Symposium, Stamford, CT, Sep. 18, 2008, pp. 1-21.
Bradshaw, Tim et al., "Facebook's premium ad prices still rising", Financial Times, May 6, 2012, pp. 1-2.
Bradshaw, Tim, "Facebook ad potential starts feeding frenzy", Financial Times, Feb. 21, 2011, pp. 1-2.
Buck, Tobias, "Israel: Invention Tension", Financial Times, Aug. 31, 2011, pp. 1-4.
Business Software, "Top 15 Supply Chain Management Software Vendors Revealed", 2011 Edition, 2011, pp. 1-71.
Cane, Alan, "Digital Delivery: Supplier-Consumer relationship Undergoes a Revolution", Financial Times, Jan. 25, 2011, pp. 1-2.
Cane, Alan, "The days of the next big thing could be over", Financial Times, Dec. 9, 2009, pp. 1-3.
Cisco, "Is there a business advantage to building the end of cities as we know them?" ad, Financial Times, Jan. 26, 2012, 1 page.
Cisco, "Old Days: You bought the chutney because you liked the jar" ad, Financial Times, Jan. 25, 2012, pp. 1-2.

Criscione, Valeria, "Norwegian fund acts to stem water risks", Financial Times, Dec. 6, 2009, pp. 1-2.
Crooks, Ed et al., "Unilever and Coke vow to cut emissions", Financial Times, Dec. 12, 2009, 1 page.
Crooks, Ed, "Chiquita to stop use of tar sands oil", Financial Times, Dec. 15, 2011, pp. 1-3.
Crooks, Ed, "Oil companies plan new safety body", Financial Times, Jan. 30, 2011, pp. 1-2.
Dembosky, April et al., "Advertisers uneasy with Facebook", Financial Times, May 6, 2012, pp. 1-4.
Dembosky, April, "Facebook offers more information to advertisers", Financial Times, Oct. 3, 2011, pp. 1-2.
Dembosky, April, "Facebook sets up site for ad creatives", Financial Times, Mar. 27, 2011, pp. 1-2.
Dembosky, April, "Facebook treads fine line with advertisers", Financial Times, Jul. 23, 2012, pp. 1-2.
Deutsch, Anthony, "Cargill threatens palm oil supplier over deforestation", Financial Times, Mar. 25, 2010, 1 page.
Ding, Li et al., "Linked Open Government Data", IEEE Computer Society, May/Jun. 2012, pp. 11-15.
Dodd-Frank Wall Street Reform and Consumer Protection Act, 111th Congress Public Law 203, US Government Printing Office, Jul. 21, 2010, pp. 1-902.
Douglis, Fred et al., "System S: Stream Computing at IBM Research", IBM Corporation, 2008, pp. 1-21.
Eaglesham, Jean et al., "Businesses resist 'conflict minerals' law", Financial Times, Aug. 17, 2010, 1 page.
Eaglesham, Jean et al., "US Law to squeeze 'conflict minerals' ", Financial Times, Aug. 17, 2010, pp. 1-2.
EITI (Extractive Industries Transparency Initiative) website: http://eiti.org/, printed May 2, 2013, 2 pgs.
EPC Global Inc., "EPC Information Services (EPCIS) Version 1.0 Specification", ratified standard, Apr. 12, 2007, pp. 1-144.
EPC Global Inc., "Pedigree Ratified Standard", version 1.0 as of Jan. 5, 2007, 138 pgs.
EPC Global Inc., "The EPCglobal Network and the Global Data Synchronization Network (GDSN): Understanding the Information & the Information Networks", 2004, pp. 1-12.
EPC Global powered by GS1, Object Naming Service (ONS), Version 1.0, Oct. 4, 2005 version, pp. 1-24.
EPTS, "Event Processing Glossary—Version 1.1", Editors: David Luckham and Roy Schulte, Jul. 2008, pp. 1-19.
Ernst & Young, "Climate change and sustainability: Five areas of highly charged risk for supply chain operations", 2010, pp. 1-16.
Etzion, Opher et al., "Event Processing in Action", with forward by David Luckham, 2011, Manning Publications Co., Stamford, CT, pp. 1-386.
Ferris, Christopher, "Software Standards—Role and Influence of Standards", IBM Corporation, 4th Event Processing Symposium, Sep. 18, 2008, pp. 1-17.
Ferris, Christopher, IBM Software Group, "EP Standards Panel", 4th Event Processing Symposium, Sep. 18, 2008, pp. 1-10.
Financial Times Special Report, "Global Brands", May 19, 2011, pp. 1-8.
Fischer, Randal et al., "EITI and the Oil and Gas Industry: Fiscal Transparency through the Supply Chain", Discussion Paper Aug. 2008, pp. 1-27.
Fischer, Randal et al., "Kazakhstan Petroleum Association", Feb. 28, 2008, Astana, pp. 1-5.
Fischer, Randal et al., "Market Framework for Understanding Resource Revenue Transparency", Oct. 28, 2007, pp. 1-35.
Fischer, Randal et al., "Pilot Project for Transparency Improvement (PPTI)", Zayed Future Energy Prize submission, Sep. 25, 2008, pp. 1-53.
Fischer, Randal et al., "Remodelling of the Extractive Industries Transparency Initiative (EITI): Why it is Necessary and How to Do It", Executive Summary, Aug. 4, 2008, pp. 1-27.
Fischer, Randal et al., "The Extractive Industries Transparency Initiative (EITI): Revenue Transparency in the Oil & Gas Market Place" Dec. 2007, pp. 1-19.
Fischer, Randal et al., "The Extractive Industries Transparency Initiative (EITI): Revenue Transparency in the Oil & Gas Market Place", Feb. 28, 2008, pp. 1-19.

(56) References Cited

OTHER PUBLICATIONS

Fretwell, Lisa et al., "Catch 'Em and Keep 'Em: Revitalizing the Store in a Cross-Channel World", Cisco Internet Business Group, Jan. 2012, pp. 1-7.
Garrett, Nicholas et al., "Electronics groups alarmed after renegade troops take over Congo tin mine", Financial Times, Mar. 6, 2008, pp. 1-2.
Garrett, Nicholas, "Certified Trading Chains in Mineral Production & The Extractive Industry Transparency Initiative", Sep. 21, 2008, pp. 1-43.
Gartner, "Server Vizualization: One Path that Leads to Cloud Computing", Gartner RAS Core Research Note G00171730, Oct. 29, 2009, pp. 1-3.
Godin, Arkady, "4th Event Processing Symposium Event Processing as seen by customers Position Statement", The MITRE Corporation, Sep. 17, 2008, pp. 1-11.
Godin, Arkady, "4th Event Processing Symposium Real-Time Data Stream Analytical Publish/Subscribe System", The MITRE Corporation, Sep. 17, 2008, pp. 1-16.
Godley, Wynne et al., "Prospects for the U.S. and the World: A Crisis that Conventional Remedies Cannot Resolve", The Levy Economics Institute of Bard College Strategic Analysis, Dec. 2008, 11 pgs.
Gooch, Liz, "Europe acts to ensure its imported timber is legal", The New York Times, Apr. 9, 2010, pp. 1-3.
Grant, Jeremy, "Euro Summit to review the architecture of finance", Financial Times, Sep. 24, 2009, pp. 1-2.
Grant, Jeremy, "Watchdogs call for central registry", Financial Times, Feb. 26, 2009, 1 page.
Grant, Jeremy, "Welcome to a world of low predictability", Financial Times, Apr. 28, 2009, pp. 1-3.
Grasso, Valerie Bailey, "The Berry Amendment: Requiring Defense Procurement to Come from Domestic Sources", Congressional Research Service, May 4, 2011, pp. 1-23.
Grasso, Valerie Bailey, "The Specialty Metal Provision and the Berry Amendment: Issued for Congress", Congressional Research Service, Oct. 5, 2010, pp. 1-24.
GS1 Healthcare, "A GS1 Healthcare US Success Story: Purdue Pharma Expands & Enhances Serielization & EPC/RFID Programs Using GS1 EPCglobal Gen2 Standard", 2 pgs.
GS1 website: http://www.gs1us.org/, printed May 2, 2013, 2 pgs.
GS1, "An Introduction to the Global Individual Asset Identifier (GIAI)", BarCodes and eCom, Dec. 2006, pp. 1-8.
GS1, "An Introduction to the Global Location No. (GLN)", BarCodes and eCom, Dec. 2006, pp. 1-9.
GS1, "An Introduction to the Global Returnable Asset Identifier (GRAI)", BarCodes and eCom, Dec. 2006, pp. 1-8.
GS1, "An Introduction to the Global Service Relation No. (GSRN)", BarCodes and eCom, Dec. 2006, pp. 1-9.
GS1, "An Introduction to the Global Trade Item No. (GTIN)", BarCodes and eCom, Dec. 2006, pp. 1-16.
GS1, "An Introduction to the Serial Shipping Container Code (SSCC)", BarCodes and eCom, Dec. 2006, pp. 1-10.
GS1, "Data Driver Can Do More for Your Business", Flyer, 2 pages.
GS1, "Global Location No. (GLN) Subscription Overview", Nov. 2006, 3 pgs.
GS1, "GPC—UNSPSC Alignment Update for the User Community", 2 pgs.
GS1, "Guidelines for Department of Defense Unique Identification (UID) Markings Using the GS1 System", BarCodes and eCom, revised Nov. 2006, pp. 1-26.
GS1, "Industry Pilot Study: Tracing Grapes from Chilean Field to U.S. Grocery", 2012, pp. 1-8.
GS1, EPC Adoption Roadmap, website: www.gs1.org/resources/tools/epc-adoption-roadmap, printed May 2, 2013, 2 pgs.
GS1, General Specifications, "Section 8.0, GS1 Standards Glossary of Terms", Jan. 2007, Version 7.1, pp. 1-20.
GS1, Identification Key Series—GDTI (Global Document Type Identifier), Issue 1.3, Feb. 2009, pp. 1-4.
GS1, The EPCglobal Architecture Framework, EPCglobal Final Version 1.2 Approved Sep. 10, 2007, authors Felice Armenio et al., pp. 1-64.
Hansen, Markus et al., "Identification and Tracking of Individuals and Social Networks using the Electronic Product Code on RFID Tags", Aug. 2007, Karlstads Universitet, pp. 1-20.
Harrnigton, Peter, "Machine Learning in Action", 2012, Manning Publications Co., Shelter Island, NY, pp. 1-382.
Harvey, Fiona, "Take green path, US business warned", Financial Times, Apr. 7, 2009, pp. 1-2.
Hodge, Anthony, "Voluntary mining code is best way to build trust", Financial Times, Mar. 11, 2011, 1 page.
Hotz, Robert Lee, "Future of data: encoded in DNA", The Wall Street Journal, Aug. 16, 2012, pp. 1-3.
Hughes, Jennifer, "ECB calls for more clarity in bond market", Financial Times, Dec. 24, 2009, pp. 1-2.
IBM ad, "Smarter Business for a Smarter Planet", 2009, 1 pg.
ICMM, "Mining: Partnerships for Development", Position Statement, Feb. 2010, pp. 1-4.
Issing, Otmar et al., "New Financial Order Recommendations by the Issing Committee", London, England, Version: Feb. 2, 2009, pp. 1-36.
Issing, Otmar et al., "Why the regulators must have a global 'risk map'", AP—Financial Times Paper and Magazine found online at: http://activepaper.olivesoftware.com/Repository/getFiles.asp?Style . . . , Feb. 19, 2009, pp. 1-2.
Jacobs, Rose, "Environment: Airlines begin to realise green fuel is a complex proposition", Financial Times, Jul. 7, 2012, pp. 1-4.
Jannach, Dietmar et al., "Recommender Systems—An Introduction", Sep. 30, 2010, pp. 1-327.
Jannach, Dietmar et al., "Tutorial—Recommender Systems", Int'l. Joint Conference on Artificial Intelligence, Barcelona, Jul. 17, 2011, 126 pages.
Jodi Oil (Joint Organisations Data Initiative) website: http://jodidata.org/, printed May 2, 2013, pgs.
Kahneman, Daniel et al., "Prospect Theory: An Analysis of Decision under Risk", Econometrica, 47(2), Mar. 1979, pp. 263-291.
Kay, John, "Innovation is not about wearing a white coat", Financial Times, Dec. 16, 2009, pp. 1-2.
Kay, John, "Radical innovation rarely comes from within", Financial Times, Nov. 23, 2010, pp. 1-2.
Kirchgaessner, Stephanie et al., "Halliburton and BP knew risk before spill", Financial Times, Oct. 28, 2010, 1 page.
Koenig, Ian, "Content Distribution in an Event Oriented World", Sep. 2008, pp. 1-25.
Kotler, Philip, "Don't forget the effect of marketing", Financial Times, Apr. 20, 2010, 1 page.
Lo, Andrew W., "The Financial Industry Needs its Own Crash Safety Board", Financial Times, Mar. 2, 2010, 1 page.
Lohr, Steve, "The Internet gets physical", The New York Times, Dec. 17, 2011, pp. 1-4.
Lovas, Louis, "CEP Standards", Progress Apama, Progress Software Corporation, 2006, pp. 1-7.
Lucas, Louise, "'Sustainable' palm oil falls short of mark", Financial Times, May 30, 2011, pp. 1-2.
Lucas, Louise, "Food producers accused over palm oil", Financial Times, May 22, 2011, 1 page.
Lucas, Louise, "Growing issue for palm oil producers", Financial Times, May 22, 2011, pp. 1-2.
Lucas, Louise, "Palm Oil struggles for sustainability", Financial Times, Oct. 26, 2011, pp. 1-2.
Lucas, Louise, "Unilever sets goal to source its palm oil", Financial Times, Apr. 24, 2012, pp. 1-2.
Macnamara, William et al., "Shell chief's warning on Dodd-Frank", Financial Times, Mar. 2, 2011, pp. 1-2.
Marcus, Bob, "Event Processing as a Service: Cloud Computing", pp. 1-18.
Marmanis, H. et al., "Algorithms of the Intelligent Web", 2009, Manning Publications Co., Greenwich, CT, pp. 1-369.
Marsh, Peter, "Big groups back global eco-label scheme", Financial Times, Feb. 28, 2011, 1 page.
Marsh, Peter, "Closed Encounters with Suppliers", Financial Times, Jul. 6, 2011, pp. 1-3.

(56) References Cited

OTHER PUBLICATIONS

Marz, Nathan, "Big Data: Principles and best practices of scalable realtime data systems", MEAP Edition, version 3, 2012, Manning Publications, pp. 1-100.
Masters, Brooke et al., "Cries of anti-Americanism as rating risk is revised", Financial Times, Jan. 29, 2012, pp. 1-3.
Masters, Brooke et al., "Finance: Shadow boxes", Financial Times, Feb. 2, 2011, pp. 1-6.
McEntire, Jennifer et al., "Traceability (Product Tracing) in Food Systems: An IFT Report Submitted to the FDA, vol. 1: Technical Aspects and Recommendations", Comprehensive Reviews in Food Science and Food Safety, vol. 9, 2010, pp. 92-158.
McNulty, Sheila et al., "Halliburton sues BP over Macondo claim", Financial Times, Sep. 2, 2011, 1 page.
McNulty, Sheila, "Suppliers of oil sands fuel shunned", Financial Times, Feb. 10, 2010, 1 page.
Michelson, Brenda M., "Event Processing Market Observations", 4th Event Processing Technical Symposium, Sep. 17, 2008, pp. 1-8.
Morrison, Harry et al., "Opinion: climate change and a question of loyalty", Financial Times, May 18, 2011, pp. 1-2.
Murray, Sarah, "Jobless generation hungry for change", Financial Times, Jan. 26, 2012, pp. 1-3.
Nasiripour, Shahien et al., "Disclosure of government payments mandated", Financial Times, Aug. 22, 2012, pp. 1-2.
Newing, Rod, "Environment: long-term impact of green issues played down", Financial Times, May 18, 2011, pp. 1-2.
Newing, Rod, "Supply Chains: Relationships key to reducing risk", Financial Times, Jun. 9, 2009, pp. 1-2.
Niblett, Peter, "Event Distribution in a Heterogeneous Environment aka Standards for Event Distribution", pp. 1-24.
Oakley, David, "McKinsey signals slower growth era", Financial Times, Sep. 25, 2009, 1 page.
O'Donnel, Kim, "Safeway scales the 'seafood scorecard' by Greenpeace", USA Today, pp. 1-3.
Olson, Michael, "Building Processing Technical Society", Event Processing Technical Society, Sep. 18, 2008, pp. 1-21.
Paschke, Adrian, "Rule ML W3C RIF Event Processing Standards", 4th Event Processing Symposium, Sep. 17-19, 2008, pp. 1-30.
PCT International Search Report and Written Opinion in International Application PCT/US2013/034976, mailed Jul. 29, 2013, 11 pgs.
Peels, Robert et al., "Responding to the Lehman Wave: Sales Forecasting and Supply Management during the Credit Crisis", Dec. 5, 2009, pp. 1-20.
Power Tagging whitepaper, "Smart Grid—Smart Power", pp. 1-6.
Pozsar, Zoltan et al., "Shadow Banking", Federal Reserve Bank of New York Staff Reports, Staff Report No. 458, Jul. 2010, pp. 1-81.
Recommender Systems, An Introduction, Chapter 12, "Recommendations in ubiquitous environments", 7 pgs.
Reinhart, Carmen et al., "The Aftermath of Financial Crises", Dec. 19, 2008, 13 pgs.
Rosenberg, Jothy et al., "The Cloud at Your Service", with forward by Anne Thomas Manes, 2011, Manning Publications Co., pp. 1-273.
Rosenfeld, Jeff et al., "Comparison of North American and Imported Crude Oil Lifecycle GHG Emissions", Final Report, TIAX Case No. D5595, Jul. 6, 2009, pp. 1-229.
RSPO (Roundtable on Sustainable Palm Oil), website: http://rspo.org, printed May 2, 2013, 2 pgs.
Schrage, Michael, "Interoperability: the great enabler", Financial Times, Feb. 5, 2009, pp. 1-2.
Schulte, W. Roy, "Event Processing Standards", EPTS, Sep. 18, 2008, pp. 1-7.
SCR Technologies, Inc., "Digital Energy Journal", Apr. 2011, pp. 1-3.
Searls, Doc, "The customer as a God", The Wall Street Journal, Jul. 20, 2012, pp. 1-4.
Shadow Banking, The Shadow Banking System, Map,conceptualized, designed and created by Zoltan Pozsar, The Federal Reserve Bank of New York, Nov. 2009, 1 page.
Simonite, Tom, "What Facebook Knows", Technology Review, Jul./Aug. 2012, 8 pgs.
Stabile, Tom, "Architects of a 'social investment data engine' ", Financial Times, Apr. 11, 2010, pp. 1-2.
Steel, Emily, "Social Media make mark at London games", Financial Times, Jul. 25, 2012, pp. 1-2.
Taylor, Paul, "Examining the cloud's green credentials", Financial Times, Apr. 25, 2011, pp. 1-3.
Taylor, Paul, "Supply chain is a strategic discipline", Financial Times, Jan. 25, 2011, pp. 1-3.
Taylor, Richard N. et al., "Domain-specific software architecture and product lines", Software Architecture Lecture 24, 2008, pp. 1-34.
Tett, Gillian, "Global insight: New world of supply chains", Financial Times, Aug. 12, 2009, pp. 1-2.
The Economist Newspaper Ltd., "Free Exchange Economics", obtained online at http://www.economist.com/blogsfireeexchange/2012/08/growth-0/print on Aug. 14, 2012, pp. 1-4.
Thompson, Clive, "Set Data Free", Wired, Apr. 2011, 1 page.
Urban, Susan D, PhD., "A Vision for Event Processing Technology in 2018: Roadmap for Research Directions", EPTS Symposium, Sep. 17-19, 2008, pp. 1-14.
Urban, Susan D, PhD., "Research Directions for the Specification, Semantics, and Optimization of a Stream Composite Event Definition Language for Distributed Event Stream Processing", 4th Event Processing Technical Symposium, Sep. 17, 2008, pp. 1-20.
U.S. Appl. No. 13/218,319, Amendment and Response filed Mar. 20, 2013, 40 pgs.
U.S. Appl. No. 13/218,319, Amendment and Response filed Aug. 1, 2013, 12 pgs.
U.S. Appl. No. 13/218,319, Office Action mailed Dec. 20, 2012, 16 pgs.
U.S. Appl. No. 13/218,319, Office Action mailed Apr. 1, 2013, 13 pgs.
UTZ Guide of Implementation, "Interpretation and examples for the fulfillment of the Code of Conduct—Coffee", 2006 version, pp. 1-143.
Van Duyn, Aline, "Code system to help track US mortgages", Financial Times, Sep. 23, 2009, pp. 1-2.
Van Duyn, Aline, "Understand the financial system first, then regulate it", Financial Times, Apr. 1, 2011, pp. 1-2.
Vincent, Paul, "Standards for CEP, CEP Tools", TIBCO Software, Inc., 2008, pp. 1-10.
Von Ammon, Rainer, "Teaching Event processing", CITT Centrum Fur Informations—Technologie Transfer GMBH, pp. 1-17.
Von Ammon, Rainer, et al., "Integrating Complex Events for Collaborating and Dynamically Changing Business Processes", pp. 1-16.
Waters, Richard, "Data opens doors to financial innovation", Financial Times, Dec. 13, 2012, pp. 1-3.
Waters, Richard, "Google to unveil new search facility", Financial Times, May 17, 2012, pp. 1-2.
Waters, Richard, "Google to unveil search results overhaul", Financial Times, May 16, 2012, 1 page.
Waters, Richard, "Number crunchers seek patterns in data", Financial Times, Dec. 13, 2012, pp. 1-2.
Waters, Richard, "World-wise web?", AP Financial Times Paper and Magazine, Mar. 4, 2008, pp. 1-5.
Watts, Duncan J., "A simple model of global cascades on random networks", PNAS, Apr. 30, 2002, vol. 99, No. 9., pp. 1-6.
West Global, "Vantify Experience Centre: Aspects of Activity Monitoring in a Mobile Operator", p. 116.
Wiggins, Jenny et al., "Good enough to eat?", Financial Times, Apr. 15, 2009, pp. 1-4.
Wiggins, Jenny, "Unilever cuts palm oil ties over environment fears", Financial Times, Dec. 11, 2009, 1 page.
Wylie, Ian, "Supply chain of information offers a vital link", Financial Times, Nov. 19, 2012, pp. 1-2.

\* cited by examiner

| NAME_ITEM | NAME_P: | ID_PSC_COM | NAME_COMP | ID_DOC_S | NAME_DOC_S | TD_GDTI | NAME_TI | DES_TD |
|---|---|---|---|---|---|---|---|---|
| El Morgan Crude O | PSC-500 | 50 | El Morgan Field | 7 | Item-15 DocStrin | GDTI [TD-500/50 | TD-500/50 | Field Prod Reco |
| El Morgan Crude O | PSC-500 | 51 | Gathering Lines | 7 | Item-15 DocStrin | GDTI [TD-500/51 | TD-500/51 | Meter Tickets |
| El Morgan Crude O | PSC-500 | 52 | Shore/Field Stor | 7 | Item-15 DocStrin | GDTI [TD-500/52 | TD-500/52 | Tank Gauge Pri |
| El Morgan Crude O | PSC-500 | 53 | Oil Tanker | 7 | Item-15 DocStrin | GDTI [TD-500/53 | TD-500/53 | Bill of Lading |
| El Morgan Crude O | PSC-500 | 54 | Shore Storage | 7 | Item-15 DocStrin | GDTI [TD-500/54 | TD-500/54 | Tank Farm Reco |
| El Morgan Crude O | Process Plat | 55 | Refinery | 7 | Item-15 DocStrin | GDTI [TD-500/55 | TD-500/55 | Dist Unit Meter |

User-Owner Data Entry Form: To Build and Declare PSC [tbl(1036)] (1500)

Left column:
- ID of PSC: 1 (1502)
- Name of PSC: Name-PSC-100 (1504)
- ID of Enterprise: (1506)
- ID of PSC Component: 1 (1508)
- First/Last SC Component: PA(1)-PA(n) (1510)
- Component Type: PA (1512)
- Component Rank: 1
- Name of Component: Oil Field (1514)

Right column:
- Component Description: Prod Wells X, Y, Z (1516)
- Name of MSC, if Any: Name-MSC-1 (1518)
- Type of Host: Country (1520)
- Name of Host: U.K. (1522)
- Notes:
- MSC Segment?: ✓ (1524)

SCR Key Influencers Report for: 'CO2 Emmissions, Well-to-Service Station'

| SC Component | CO2 Emmissions: tons/mm BTU | CO2 Rank | SCC Contribution to Total CO2 |
|---|---|---|---|
| 1. El Morgan Oil Field | 0.144 | 1 | |
| 7. M.H. Refinery | 0.109 | 2 | |
| 4. Oil Tanker | 0.065 | 3 | |
| 2. Trunk Pipeline | 0.023 | 4 | |
| 5. Shore Storage | 0.018 | 5 | |
| 3. Shore/Field Storage | 0.011 | 6 | |
| 10. Tank Truck | 0.010 | 7 | |
| 8. Offtake Lines | 0.007 | 8 | |
| 9. Product Tanks | 0.006 | 9 | |
| 6. Feed Lines to Unit | 0.003 | 10 | |
| TOTAL | 0.396 | Σ 1:10 | 100% |

FIG 22

SEQUENTIAL CHAIN REGISTRY

PRIORITY

This application claims priority to U.S. Provisional Patent Application No. 61/377,809, entitled "Sequential Chain Registry System and Method," filed on Aug. 27, 2010, and is related to co-pending patent application Ser. No. 13/218,319, entitled "Sequential Chain Registry for Event Awareness," both of which are hereby incorporated by reference in their entirety.

BACKGROUND

It is often desirable to track an object as it traverses a sequential chain. For example, a consumer product begins as raw materials, which are then transported to a manufacturer that constructs a component of the consumer product using the raw materials. The component may then be transported to another manufacturer who constructs the consumer product using the component. The consumer product may then pass through any number of distributors until it reaches a retailer and, finally, the end consumer.

Because the consumer product, and the components and raw materials that make up the product, generally pass through so many different manufacturers that are often not related, it is difficult to track the product and its components as they travel through a supply chain or other form of sequential chain. It is even more difficult to track materials to which a barcode, RFID, or other tracking mechanism cannot continuously be physically attached as materials transit supply or other forms of chains. However, information related to products, components and raw materials is often desirable to consumers (for example, consumers who may be interested in tracking the origins and other attributes of products they purchase) and to regulators (for example, regulators who may want to ensure that the materials used to make the products are used legally).

SUMMARY

Embodiments of the present disclosure relate to systems and methods for the creation of a digital sequential chain that may be used to track objects as they traverse a sequential chain. In embodiments, the sequential chain relates object data, movement data, and entity data in a way that all of the movements and transformations that are performed on a product may be captured from the transition of the product from a raw material to its final form. In further embodiments, the sequential chain may also be applied to track intangible objects as they traverse a sequential chain. Furthermore, the embodiments disclosed herein are flexible enough to track both structured and unstructured data.

In embodiments, a unique identifier, such as a DocString Identifier, is created that may be modified to track the relationship between one or more objects, the traversal of the one or more objects through space and time, and the relationship(s) between an object and one or more entities at each discrete time period. In such embodiments, the unique identifier may be continually modified in order to capture relationships as the object traverses the sequential chain.

Embodiments of the present disclosure also relate to providing a user interface that may be used to provide the data for constructing a sequential chain. Yet another embodiment discloses analytics that may be performed on data obtained from the sequential chain and a user interface for conveying the results of such analysis.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

FIG. 13 illustrates an exemplary format in which a DocString identifier may be stored in an SCR database table.

FIG. 15 is an embodiment of a data entry form for enabling an SCR database to receive data.

DETAILED DESCRIPTION

Figure 1:
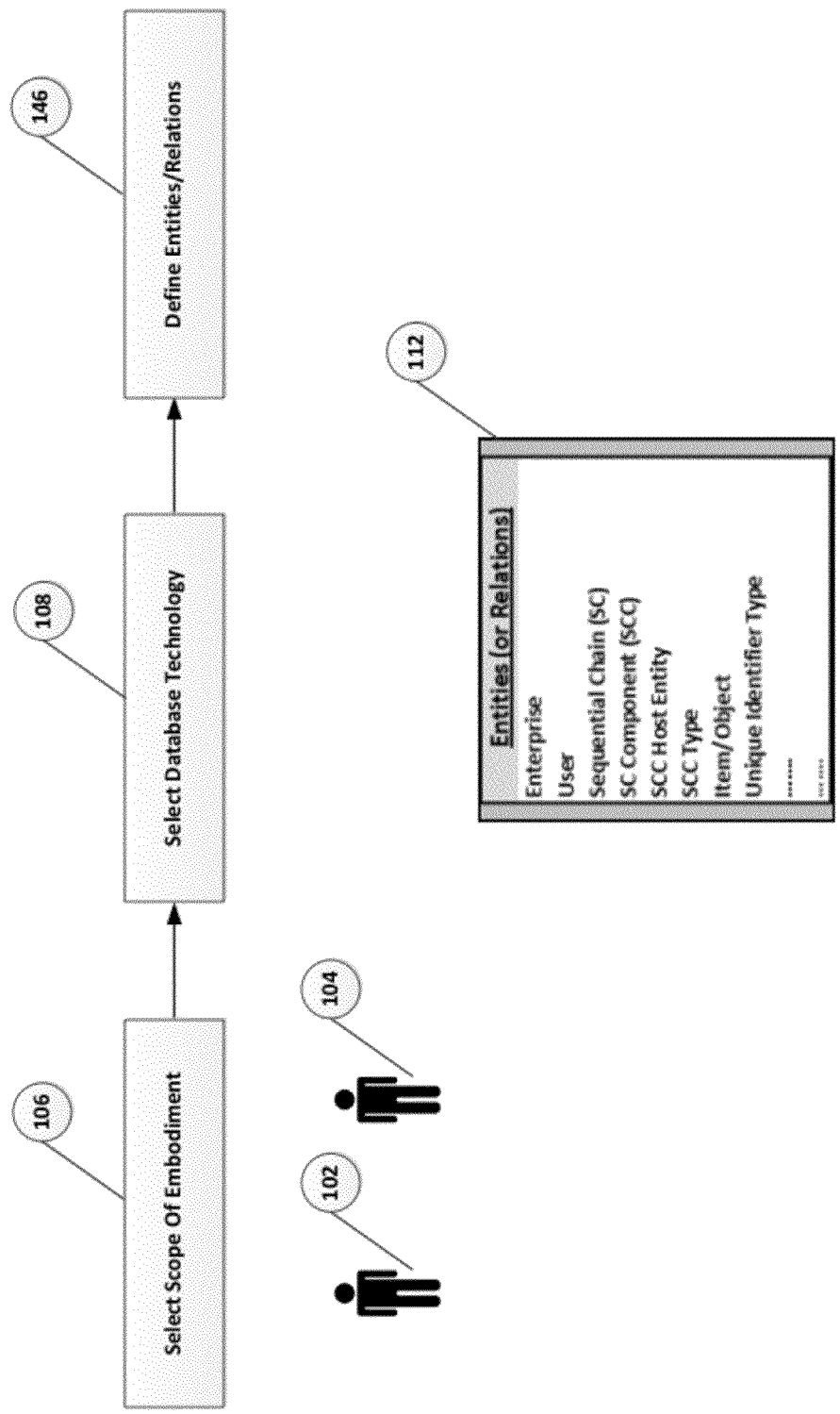
FIG. 1 is a flowchart illustrating an embodiment of a next step taken by a system facilitator, by system users or by another for designing a database structure for an embodiment of the SCR system and method.

Embodiments of the present disclosure relate to procedures by which to make and use a Sequential Chain Registry, referred to herein as SCR or the SCR system and method; a non-limiting plurality of embodiments for the SCR system and method; and non-limiting examples of data types and data sources that may be used for data input to an embodiment. "SCR," "SCR system," and "SCR system and method" may also herein be used generally to describe any disclosed embodiments of the present application, and use of such terms is not intended to limit the disclosure hereof or any resulting claims that assert priority hereto. In addition, although particular methods and processes may be disclosed as being performed, in examples, by particular systems, persons, or structures, it is understood that such method steps may be performed by any combination of other systems, persons, or structures without departing from the scope hereof.

In embodiments, a "Sequential Chain Registry" enables suppliers, customers and other users of SCR to preserve and access data created, or capable of being created, within both complex and simple sequential chains. For example, non-limiting examples of a sequential chain may include a supply chain, a chain of events, a chain of manufacturing processes, the transportation of a product, or any other type of event or set of events in which an object is changed and/or transported over a time period. In embodiments, SCR may comprise a database-grounded procedure, process, system, and/or method whereby particular objects may be tracked and traced as those objects exist in and move through any nature of sequential chain, including parts, or components, of a sequential chain. As used herein, the term sequential chain may also include, without limitation, any of supply chain, value chain, process chain, logistics chain or other nature of simple or complex group of processes, pathway, or pathways by which an object exists (or objects exist) in, moves through, and may be altered within one or a plurality of components comprising such chains. Without limitation, the term sequential chain may also apply to circumstances wherein an object (for instance, but not limited to, an oil or gas well) may not be a moving object that transits a sequential chain, but rather may be a stationary object (e.g., a non-moving object) that may be operated upon via a plurality of processes contributing to the status, nature, size, description or other dimension, without limitation, of such object at a particular time (e.g., as a set of particular oil well drilling processes and tasks contribute to drilling and completion of an oil well, which may exist in a stationary condition, e.g., in a fixed locus where such well has been drilled and completed). In embodiments involving moving objects—that is, with objects that transit through a sequential chain—system users may be interested in particular types of data and information, as these may pertain to dimensions of time and/or space in which moving objects exist in and transit through sequential chains. In embodiments involving stationary, or non-moving, objects, system users may be interested in particular types of data and information, as these may pertain to: i) space, with respect to the particular space, or locus, in which such stationary object may exist; and, ii) time, including with respect to temporal relationships that may describe temporal sequences in which two or a plurality of events or event executions may occur in connection with particular processes operating upon such stationary object or objects. Further discussions of sequential chains and object(s) are provided below.

In embodiments, a registry may include an architected database system wherein a database is capable of receiving data from one or a plurality of users. Without limitation, such data may give unique identification to a sequential chain and to a plurality of components comprising a sequential chain. Such elements, or components, of a sequential chain are characterized by systems and/or users as relating to one another, such that a database may receive and store data in a manner that allows logical relations to be established between: an object in a particular component of a sequential chain; each such component to each other such component of a sequential chain; and other elements, as herein further described. In embodiments as will be further described below, database entity relationships may be established and maintained between objects and their various forms as they transit a sequential chain, supply chain components that make up the sequential chain, supply chain component host entities and/or sub-entities that may define each supply chain host, and between sequential chains themselves.

The sequential chain may be used to track data related to the changes of an object, both physically (e.g., by physical and/or chemical manipulation of the object) and through space (e.g., the transportation of the object), as the object proceeds through a chain of processes or events (e.g., a supply chain). Tracking such data enables enterprises to capture a variety of forms of information pertaining to products (both tangible and intangible) as the products make their way through complex global supply chains, enter into trade or commerce, and/or pass through various intermediaries until products eventually reach downstream intermediate and/or final customers. As will be described in more detail below, the sequential chain registry is capable of storing any type of information related to the object as it progresses though a process and/or transaction changes.

The reference herein to "sequential chain registry system and method" employs the term "sequential" from this notion, or construct, of a sequential chain component-centered data set, acting as a hub, that accretes over time into a larger data set as an object sequentially moves within a uniquely identified sequential chain through a plurality of uniquely identified sequential chain components. A sequential chain may be registered in the registry. Registration of the sequential chain in a registry (e.g., a database or other software environment) allows for the association of a unique identifier with the SC.

Registration of the sequential chain thereby allows the sequential chain: a) to possess a unique identity; and b) to "hold" or "house" a plurality of sequential chain components (e.g., data related to a process or change that may occur during the sequential chain) by relating the sequential chain components using the unique identifier. The ability of the registered sequential chain to house the sequential chain component data allows for the gathering of information related to an object as it traverses a sequential chain.

In embodiments, a sequential chain may include the system of organizations, people, technology, activities, processes, information and resources involved in moving a product, service, or other form of object from supplier to customer. By way of non-limiting example, sequential chain activities, or processes, may include transformation of natural resources, raw materials and other elements into a finished product that is delivered to customers, including intermediate and end customers. A sequential chain may begin with the human extraction of raw material, and includes several production links (e.g., component construction, assembly, and merging) before moving to elements such as storage facilities, and finally reaching the consumer.

Presently, it is easier to track objects that are packaged. For example, a can of tuna can be easily tracked because a barcode or an RFID may be placed on the packaging. However, unpackaged objects prove to be much more difficult to track as they progress along a supply chain. For example, a bar code or RFID may not readily be placed on a live tuna, a molecule of oil that is travelling through a pipeline, or an intangible financial instrument. Furthermore, the unpackaged objects may be mixed with other unpackaged objects (e.g., the molecule of oil from one oil field is mixed with oil from another oil field as it is introduced into the pipeline or commingled in storage tanks) As will be demonstrated throughout this disclosure, the embodiments described herein overcome the problems related to tracking unpackaged products. Furthermore, one of skill in the art will appreciate that the systems and methods disclosed herein may be practiced with packaged objects as well. For example, nearly all packaged goods are at some point unpackaged or contain previously unpackaged components. The SCR systems and methods herein provide for a continuous identifier that can track an object and/or its components prior to being packaged and having affixed to it a physical identifier. In embodiments, the physical identifier may be based on or become a part of the SCR identifiers disclosed herein to provide continuous identification.

An unpackaged object may be referred to as an uncovered object. In embodiments, uncovered objects include objects, including both tangible and intangible objects and including services and the like, that are not otherwise amenable to tracking and tracing by existing systems based on existing forms of object unique identifiers. Also as used herein, covered objects include objects that are not uncovered objects. SCR enables access to information pertaining to both uncovered and covered objects and to the sequential chains, the sequential chain components, and the surroundings of sequential chain components in which these objects exist, have existed or may exist.

In embodiments, both covered and uncovered objects may be identified using an object unique identifier. An object unique identifier, also referred to herein as a document string identifier or DocString identifier, may be used to give object unique identification to uncovered objects. In embodiments, the DocString identifier, as it may be created within the SCR system and method, enables uncovered objects to be given object unique identification throughout sequential chains. Absent such DocString identifier, such uncovered objects may not otherwise be amenable to tracking and tracing continuously throughout sequential chains. In embodiments, the structure of the SCR system and method, including its capability to form a DocString identifier for giving unique identity to uncovered objects, enables a database in an SCR embodiment to receive, store, manipulate, and return more data and information pertaining to objects than may otherwise be possible via existing tracking and tracing systems and existing forms of object unique identifiers (such as barcodes and RFIDs).

In embodiments, a DocString identifier may be created in conjunction with other operations of the SCR system and method. Once it is created within an SCR database, a DocString identifier may be used to enable continuous identification of uncovered objects throughout sequential chains, whereas uncovered objects otherwise may not be amenable to such continuous identification. In embodiments, the SCR enables data storage in a database of a plurality of data attributes and data values pertaining to: uncovered objects and trade documents associated with such objects; sequential chains in which such objects exist or may exist; component segments of such sequential chains; the milieu or environment surrounding such component segments; and other data. On the other hand, embodiments also enable tracking and tracing uncovered objects through sequential chains by further enabling the formation of a form of object unique identifier—that is, formation of the DocString identifier—that enables the continuous identification of objects as these objects exist in, and transit through, sequential chains. While described with respect to tracking uncovered objects, in embodiments the DocString identifier may also be used to track covered objects.

While embodiments of the present disclosure have been described with respect to tracking data related to objects as they traverse a sequential chain, one of skill in the art will appreciate that the embodiments disclosed herein may be used to track and relate other types of data. For example, the embodiments disclosed herein may be used to provide event awareness by tracking structured or unstructured data as they relate to a sequence of executed events and/or planned events in order to relate data in such a manner that related events are tied together.

SCR Data Types

Various different types of data (or SCR components) may be employed to track an object and/or data related to an object as it traverses a chain, such as, but not limited to, a supply chain. For convenience and illustration, but not by way of limitation, four defined data types, or categories, are included in demonstrating the data that may be received by, and on which computation may be performed within, the SCR system and method. As used herein: i) data type-1, also referred to as object data, refers to data attributes and data values pertaining to an object that transits a sequential chain; ii) data type-2, also referred to as sequential chain (SC) data, refers to data attributes and data values pertaining to a sequential chain; iii) data type-3, also referred to as sequential chain component (SCC) data refers to data attributes and data values pertaining to a plurality of sequential chain components, which comprise a sequential chain; and iv) data type-4, also referred to as sequential chain component host or host entity (SCC host or SCC host entity) data refers to data attributes and data values pertaining to a host entity that hosts a particular sequential chain component. In embodiments, each of the SCR components described herein may also be associated with an identifier. The identifier may be shared among the SCR components, for example, all of the different SCR components related in a sequential chain may have the same identifier, each SCR component may have its own unique identifier, or each SCR component may be associated with both a shared identifier and a unique identifier.

In embodiments, object data may be used to represent an object, such as a covered object or an uncovered object. The object may be any type of object, including but without limitation tangible objects and intangible objects that traverse a sequential chain. As a non-limiting example, object data may represent oil as it traverses a supply chain. Object data may be extendable such that any type of data commonly associated with the covered or uncovered object represented by the object data may be stored in the object data. This flexibility allows the SCR systems and methods disclosed herein to be employed regardless of the type of underlying object that is being represented while allowing all relevant information associated with the object to be captured and stored. In embodiments, objects may be dynamic; that is, objects may change during the sequential chain. For example, an object may start out as crude petroleum and be refined into gasoline.

The SCC, in embodiments, is a data object capable of storing information about a sequential chain component. In embodiments, an SCC may represent a component segment or element of an SC along with movement though time in which an object transits through an SCC that is associated with a sequential chain. For example, an SCC may represent an oil field where the oil was first extracted, a pipeline movement of the oil, processing of the oil in a refinery, etc. In embodiments, an SCC may represent another SC. Although specific examples are provided, one of skill in the art will appreciate that SCC may represent information related to a process activity (e.g., a refinery or a chemical plant) or a change of control action (e.g., a pipeline or oil tanker).

As described above, an SC component (or SCC) may represent information about a particular point, process, conveyance or the like in the sequential chain. Data representing information about an entity related to the particular point, process, conveyance or the like in the sequential chain may be associated with an SCC. Such related data may be stored in one or more SCC host (or SCC host entity) objects. In embodiments, multiple SCC host objects may be associated with a single SCC, that is, the data for multiple entities may be related to a single portion of time, e.g., an instance represented by a SCC, in the sequential chain. As non-limiting examples, a SCC may represent a pipeline that oil is travelling through or a tanker carrying oil. In turn, an example of a SCC host may be a country or other location in which is located a petroleum refinery, etc. SCC host objects may also include one or more SCC host sub-objects organized hierarchically or otherwise. For example, an SCC host object related to an SCC (e.g., a refinery) may be the country in which the SCC is located (e.g., the United Kingdom). An SCC host sub-object may comprise the city in which the SCC is located within the SCC host object (e.g., Milford Haven, Wales).

The sequential chain (SC) object, in embodiments, is a data object capable of grouping together and storing all other information (e.g., object data, SCC data, SCC host data, etc.) that is related or relatable in a common sequential chain. The SC represents the entire sequential chain, which is comprised of a plurality of SCCs. In embodiments, the SC may be used to group and relate all information related to objects (e.g., object data) as they move through time and space as well as all of the entities associated with each discrete period.

Such information related to objects, SCs, SCCs, and SCC host entities may be referred to as attributes. Any type of attribute may be associated with the various data types disclosed herein. The sequential chain registry systems and methods disclosed herein enable the capturing of any nature of SC Components (e.g., an oil producing field) as well as information related to an SC Host Entity (e.g., a country, region, oil field name, and/or static or dynamic data further describing host entities). In embodiments, attributes may be related to the objects themselves. In such embodiments, the attributes may contain information related to quantity and/or quality measures of a product. The embodiments disclosed herein provide ways of relating information between objects, SC Components, and SC Host Entities thereby providing a flexible information profile related to an object and its hosts as it traverses a sequential chain. For example, embodiments of SCR described herein may utilize the relationships described herein to provide real world information about an object traversing a supply chain, such as, but not limited to information demonstrating that a particular lot quantity of crude oil is produced or refined by one or more countries that practice "excellent" or "good" levels of Fiscal Transparency, as measured by an independent $3^{rd}$ party such as the Extractive Industries Transparency Initiative, or EITI. Without the advent of SCR, such information may be lost as the supply of crude oil changes hands between different entities which have different, disparate data systems which cannot or may not communicate with one another.

In embodiments, the SC is an object that is assigned a unique identifier which differentiates a particular SC from any and all other SCs. Assigning a unique identifier to the SC may also be referred to as the "registration" of the SC. Thus, the registration of the SC in a registry (e.g., a database or other software environment) allows for the association of a unique identifier with the SC. Registration of the SC thereby allows the SC: a) to possess a unique identity; and b) to "hold" or "house" a plurality of SC components by relating the SC components using the unique identifier.

The SCR components (e.g., the SC component; the SCC component; the SCC host entity component; and the object component) described above are intended to be interoperable with many different types of software systems. This allows for information, in the form of structured and/or unstructured data, to be captured and maintained as an object traversing a sequential chain changes its profile in terms of ownership, location, physical and/or chemical characterization or of other nature of change. Generally, different owners incorporate different software and databases that often cannot effectively communicate with one another. Because of this, information related to an object's transit through and processing within a sequential chain may be lost as the object changes ownership and/or position while transiting a sequential chain. The SCR components described herein are designed to be software/database independent, allowing for the sharing of data across disparate systems. Additionally, the SCR components described herein may be operable with various forms of analytics software. For example, the components described herein may be used with data mining software, statistical analysis software, etc. to allow analytical processing of an object and its related data. While a specific taxonomy is used to describe certain aspects of the SCR components disclosed herein, one of skill in the art will appreciate that the taxonomy is provided for ease of illustration and is in no way intended to limit the scope of usage for the SCR components disclosed herein.

A plurality of computations may be performed on data received by a database that is designed as part of an embodiment of the SCR. By way of example but not limitation, an embodiment of the SCR may employ relational database functionality to create data sets from a plurality of individual data objects. Alternatively, other types of database structures may be used.

Sequential Chains

FIG. 1 is a flowchart illustrating an embodiment of a method by which a user may commence the construction of an embodiment of the SCR system and method. A system facilitator 102, a system user 104, or another may begin specification of a particular embodiment by selecting a scope of the embodiment 106. By way of example but not limitation, one embodiment as described herein is an embodiment of SCR for the oil and gas industry, wherein such embodiment, more generally, herein is referred to as the 'object-centric' embodiment. Alternatively, other embodiments of SCR may be selected, as such other embodiments herein are described and illustrated. Once an embodiment's scope is determined 106, the system facilitator 102, a system user 104, or another—for instance, a database system designer or other appropriate information technology professional—may select the particular database technology 108 judged to be most suitable to the particular scope of embodiment targeted for the SCR system and method. By way of example but not limitation, relational database technology may be selected as an appropriate technology around which to design an embodiment of the SCR. As used herein, the term RDBMS signifies a relational database management system, such as offered by software vendors Oracle®, IBM®, Microsoft®, and other enterprises.

Embodiments described herein use RDBMS software as a component of the SCR system and method. Hereafter in this description, examples shown for embodiments of the SCR system and method are derived by using an RDBMS software application offered by Microsoft®—Microsoft® Office Access™ 2007. As will be apparent to an artisan of ordinary skill, other database software and/or other forms of database technology other than relational database technology may also be selected for use in designing and operating an embodiment of the SCR. Likewise, RDBMSs other than those vended by Microsoft® may also be employed. After selecting an appropriate database technology 108, a system designer defines a plurality of entities, or relations, which may be used in an SCR embodiment 146, as described next.

A system designer or another, with or without collaboration with system users 104, may define a plurality of database entities 146, which are also referred to herein as database relations. As used herein in a database context, the term entity or relation means something (e.g., an object) that a system designer or user can identify and wants to keep track of As shown in FIG. 1, by way of example but not limitation, entities 112 may be: enterprises; users; objects; sequential chains; SC components; SCC host entities; and other entities. Such definitions of entities by a system user or another may be declared into, and received by, a database.

Figure 2:
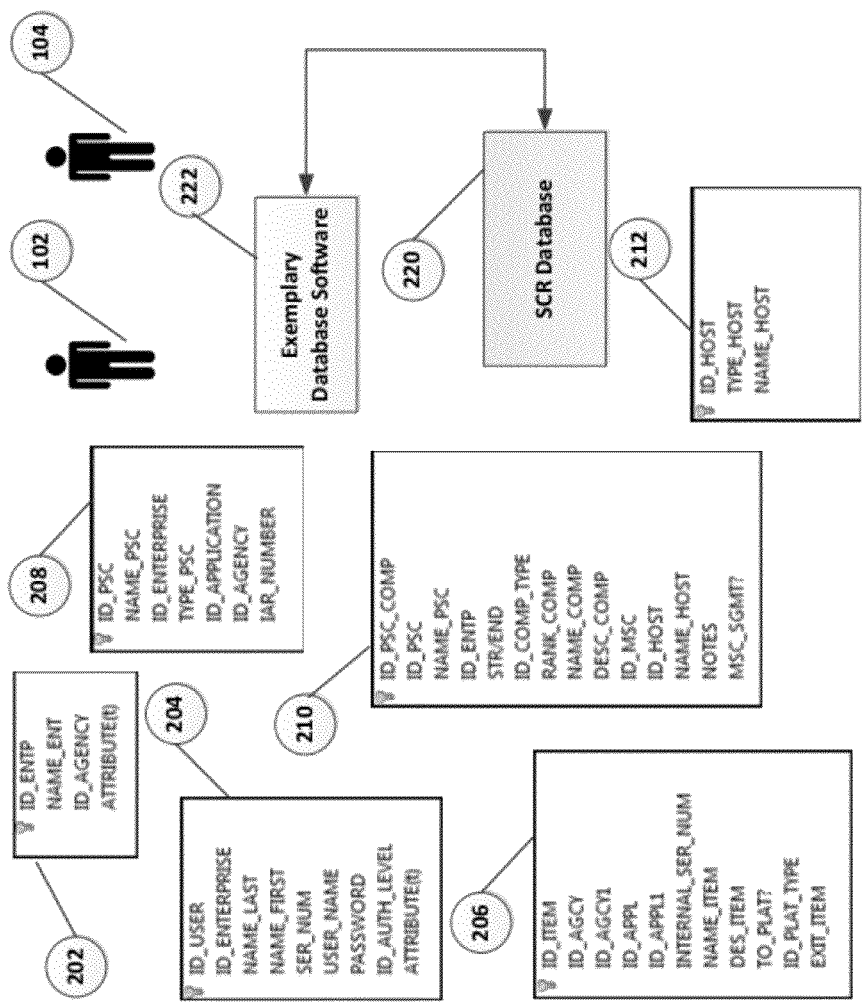
FIG. 2 is an illustration depicting embodiments of database entities.

FIG. 2 is an illustration depicting embodiments of database entities and relationships. Such entity data and entity relationships may be created, managed, and maintained by the various SCR systems and methods disclosed herein. By way of example but not limitation, element 202 depicts a database representation, as provided by exemplary database software, for the enterprise entity. The enterprise entity 202 is received into an SCR database 220 as a result of a system designer or another declaring it into the database via a suitable database software system such as the exemplary database software 222. In the instance of the enterprise entity 202, a plurality (t)-count of data attributes pertaining to the enterprise entity is created as a result of the process of declaring attributes into, and receiving them by, the SCR database 220. Similarly, FIG. 2 depicts other exemplary entities and their associated data attributes received into the SCR database for entities: user 204; object (or item or product, etc.) 206; sequential chain 208; SC component 210; and SC component host entity 212.

Figure 3:
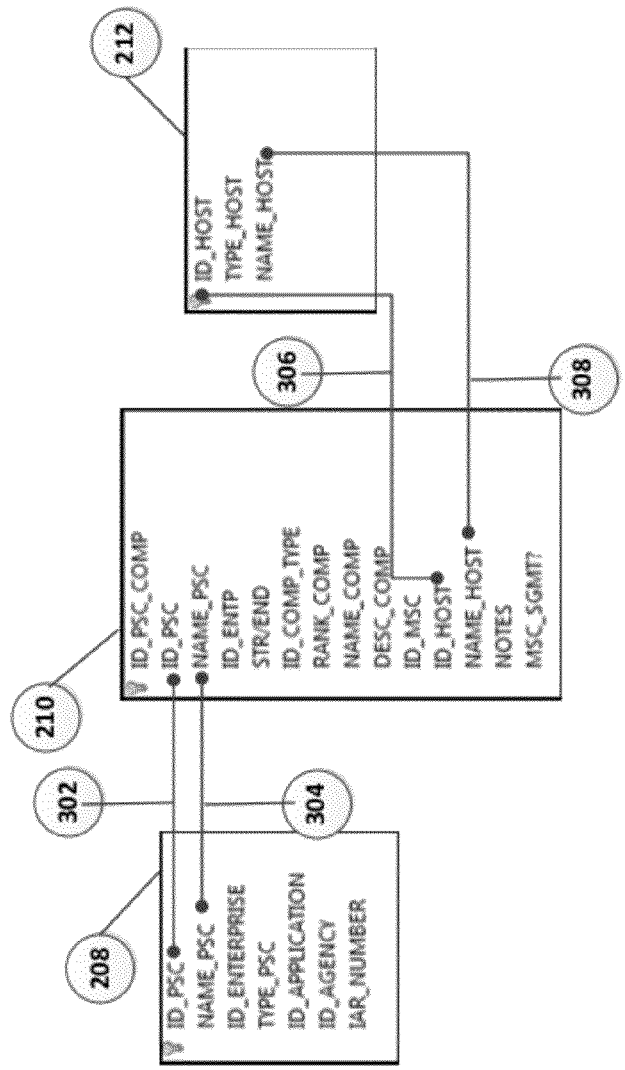
FIG. 3 shows example embodiments of entity relationships amongst three exemplary entities.

Definition of entity relationships may be performed by a user, by the SCR system, or by any other process, following the earlier definition of a plurality of entities. As used herein, the term entity relationship refers to an association, made within a database, among entity classes. FIG. 3 shows example embodiments of entity relationships amongst three exemplary entities 208, 210, 212. For instance, two entity relationships 302, 304 are shown between the exemplary entity sequential chain 208 and the exemplary entity SC component 210. Respectively, the two entity relationships are indicated in FIG. 3 to be created by using a sequential chain's unique ID reference 302, e.g., a form of identifier, and the sequential chain's name 304 as the common data attributes for the two exemplary entities. In an analogous manner, two other entity relationships 306, 308 are shown between the exemplary entity SC component 210 and the exemplary entity SC component host 212. Respectively, the latter two entity relationships use a SC component host's unique ID reference 306 and the SC component host's name 308 as the common data attributes for these two entity relationships. In embodiments, an SCR database receives declarations of entity relationships from a system designer, system facilitator, user, or another, via database software.

Figure 4:
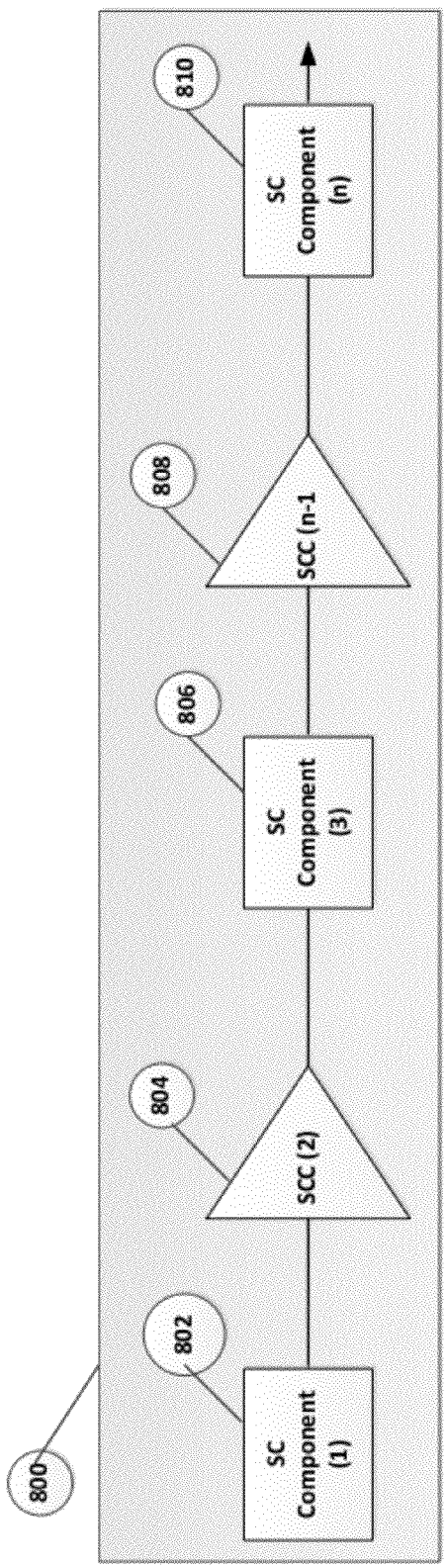
FIG. 4 provides an example embodiment of a sequential chain (SC) that may be represented using the components described herein.

Having described example embodiments of different types of data and relationships that may be managed and maintained by the various SCR systems and methods, FIG. 4 provides an example embodiment of a sequential chain (SC) that may be represented using the components described herein. FIG. 4 is an embodiment of a block diagram illustrating a conceptual view of the construction of an exemplary sequential chain 800, comprised of SC components 802, 804, 806, 808, 810, representing (n)-count of SC components. A system designer or another may declare a particular instance of an entity relationship (e.g., a logical relationship between two particular entities) via database software, thereby enabling a database in an embodiment to receive data describing an intended entity relationship. By way of example but not limitation and referring FIG. 4, a particular instance of a sequential chain, as conceptually shown in element 800, may be declared into, and received within, a database, via database software by using the entity classes for sequential chain 800 and SC component 802 to create relationship instances that describe a plurality of particular SC components comprising a particular sequential chain.

For the embodiment shown in FIG. 4, specification by a user or another of a particular sequential chain 800 is received into a database, whereby the sequential chain is comprised of (n)-count of particular SC components 802 through 810. As shown in FIG. 4, the sequential chain and the SC components comprising it may each be uniquely identified via particular identifiers (e.g., by use of non-repeating, sequential whole numbers as a form of identifier) and also may be assigned a plurality of other attributes, including attributes such as a name, an enterprise owner, an SC component rank and other attributes. Thus, in the foregoing, have been described four elements of a database system that may be used to describe even large, complex sequential chain systems. The four elements may include: entities, attributes, identifiers and relationships. Embodiments of the SCR system and method described herein may employ these four (and other) database elements.

In FIG. 4, a particular embodiment of SCR is shown to classify SC components (or SCCs, which comprise sequential chains) into two types of components, e.g., process activities (or PAs) as designated by the rectangles 802, 806, 810 and change of control actions (or CCAs) as designated by the triangles 804, 808. By way of example but not limitation, a process activity may be a set of oil producing wells or a petroleum refinery. A change of control action may be an oil tanker or natural gas pipeline, either of which, for instance, would transport crude oil or natural gas from one process facility to another. A connotation of temporal and/or spatial movement by the term, 'change of control'—e.g., in reference to change of control actions, or CCAs, as one form of SC component—may be convenient to system designers or to others who construct a particular embodiment; however, terms other than PA and CCA may also be used in other embodiments.

The use of PAs and CCAs allows for the use of logical checks to ensure that a SC is validly constructed and complete. For instance, an SC embodiment herein provides for (n)-count of sequential chain components (SCCs) as comprising a sequential chain, wherein (n) is any odd whole number such as, e.g., 5, 7, or 15. This example taxonomy also provides for sequential chains to commence and end with a process activity, or PA [signified by the rectangles 802, 810 in FIG. 4] and for change of control actions, or CCAs [signified by the triangles 804, 808 in FIG. 4] to be inserted between each two neighboring process activities. Thus, one exemplary, but non-limiting, schema provides for each neighboring pair of PAs to be linked by one change of control action (or CCA) and for a sequential chain to commence and end with a particular process activity. Alternatively, other schema may be used in a particular SCR embodiment.

A particular embodiment of the SCR system and method may be constructed to include suitable logic tests to ensure that the intended structure of all sequential chains is accomplished in reification. For instance, a suitable logic test may be created to ensure that: (i) an SCR database [e.g., shown as element 220 in FIG. 2] receives declared data pertaining to a number of discrete process activities (or PAs) equal to [(n+1)/2] and to a number of discrete change of control actions (or CCAs) equal to [(n−1)/2] for any particular sequential chain, wherein (n) represents an odd whole number; and (ii) the sequential chain commences with an SC component that is a process activity, or PA [thereby, ensuring that a process activity also exists at the end of the sequential chain, assuming (n) is an odd whole number]. In another embodiment, other or different logic tests may be employed with the embodiments disclosed herein. For example, a test may be included to ensure that no unique SC component appears more than once in a declared sequential chain (unless, for instance, some form of re-circulation of objects through a particular SC component is intended by a system designer or another).

One of skill in the art will appreciate that the embodiments described herein may be employed in, or for, various different sequential chains related to various different industries. As such, the rules for each SC may vary depending upon the needs of the particular industry or the nature of sequential chains applicable to the particular industry. Any number of logic tests may be employed with the embodiments disclosed herein to ensure that the SC conforms to and accurately represents a specific sequence of events, processes, steps or the like. Thus, for reasons of data control and data quality, it may be appropriate for a particular embodiment of the SCR system and method to include a plurality of logic tests to ensure both data accuracy and sound logical relationships of the data elements received into, and accessed from, a particular SCR database system. Employment of a particular taxonomy and schema for forming and declaring sequential chains, such as described herein, enables the construction of such logic tests. As will be apparent to an artisan of ordinary skill in database design, a plurality of other taxonomies and other logic tests may be constructed, depending on the nature and complexity of a particular application environment for a particular SCR embodiment. The extent and complexity of such taxonomy and logic tests may also reflect the extent of data quality control that is intended for a particular SCR embodiment, as well as the data quality control that is available within the application space pertaining to such particular SCR embodiment.

Next are described aspects of SCR's data and logical structures that enable data relation, or association, amongst a plurality of data, including, but not with limitation, data pertaining, respectively, to objects (e.g., products) in sequential chains, sequential chains, SC components comprising a sequential chain, and host entities hosting SC components, for objects as they exist, or may exist, in a particular SC component within a particular sequential chain.

Figure 5:
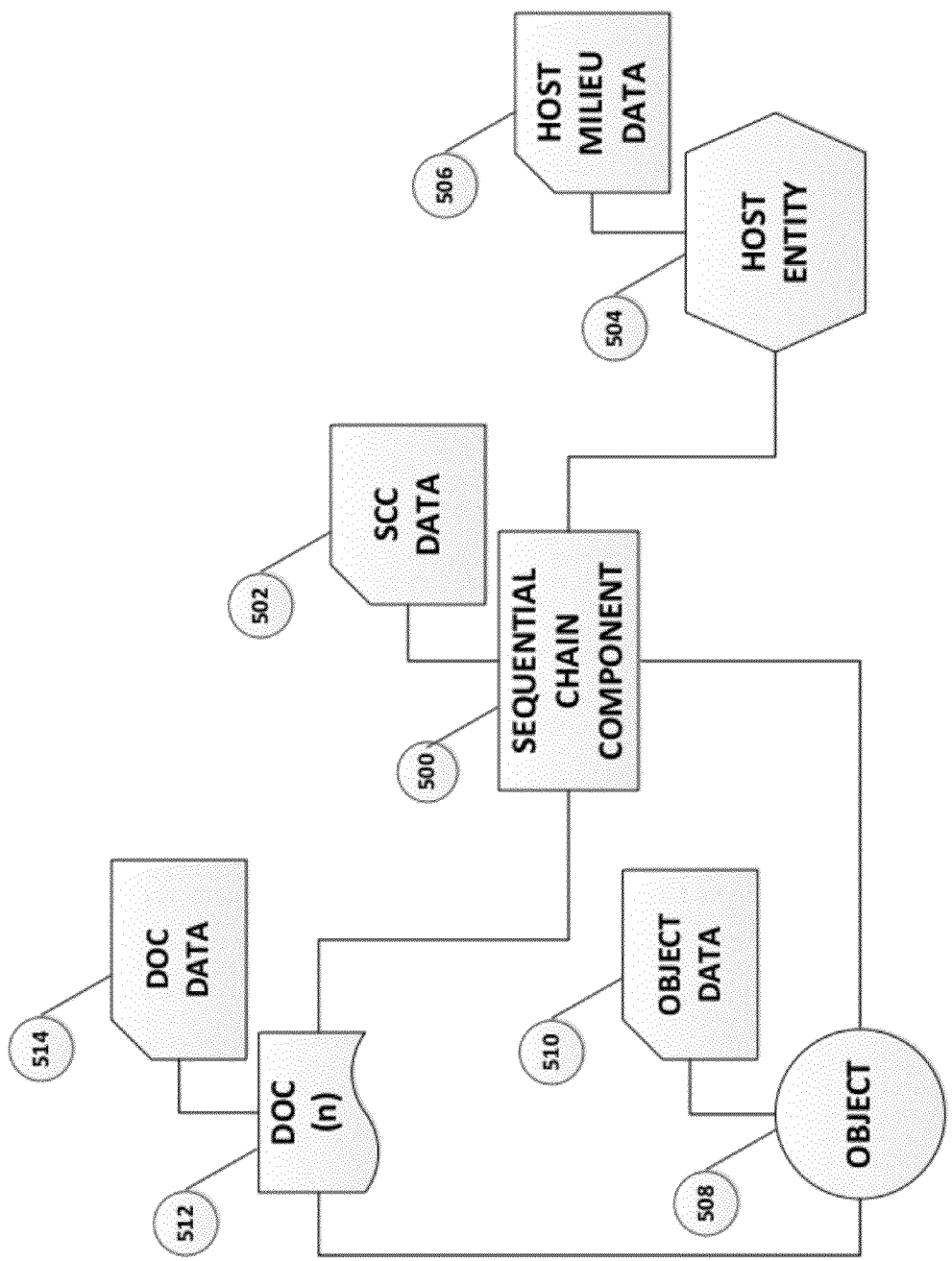
FIG. 5 is a block diagram depicting embodiments of relationships amongst: a sequential chain component; a host entity that hosts the SC component; an object that exists in the SC component; and a document that contains data pertaining to the object as the object exists relative to the SC component.

FIG. 5 is a block diagram depicting embodiments of relationships amongst a sequential chain component 500; a host entity 504 that hosts the SC component; an object 508 that exists in the SC component; and a document 512 that contains data pertaining to the object as the object exists relative to the SC component. Each of these elements represents a database entity that may be received by an SCR database pursuant to the data communication procedures as will be described later. The lines connecting these entities in FIG. 5 [for instance, the line connecting the entity SC component 500 and the entity object 508] signify an entity relationship, which also may be received (e.g., as a specification of a user or another) by an SCR database.

Each of database entities 500, 504, 508, 512 may have data associated with it pertaining, respectively, to: SC component data 502, SC component host entity data 506 (also referred to as 'host milieu data'), object data 510, and document-related data 514. The document entity 512 and corresponding document data 514 may be applicable when an SCR embodiment is designed and operated for an environment involving uncovered objects; the document entity may also be employed in an environment involving covered objects or a hybrid environment involving both covered and uncovered objects. As herein later described, the document entity 512 may provide a particular functionality, relative to uncovered objects, whereby a DocString identifier may be formed to give object unique identity to uncovered objects, which objects otherwise may be incapable of consistently holding an existing form of object unique identifier. Pursuant to the principles of Boolean logic (also referred to as Boolean algebra), an SCR database enables data associations or relations amongst a SC component 500 and the database entities related to the SC component, that is, to: a SC component host entity 504; an object 508 that exists in the SC component; and a document 512 that pertains to the object and to the SC component. In embodiments, data 502, 506, 510, 514 pertaining to these four entities may be received by an SCR database via appropriate data forms.

In the embodiments described herein, a portion of a data structure by which an SCR database enables association, or relation, of a plurality of data 502, 506, 510, 514 [which data pertains to an object 508 that exists, or has existed or may exist, in a particular SC component 500; a host entity 504 in which the SC component exists; and a document 512] may be used in forming a DocString identifier, which is herein below further described. A data structure employed in the SCR system and method enables the association, therefore, of data for an object, a SC component, and a SC component host entity and also for data pertaining to a document entity 512 when the document entity is employed in a particular embodiment. As used herein, the term vertical logical conjunction signifies data associations, or relations, for data pertaining to an object in a particular SC component. The entity SC component 500 enables conjunction of data attributes and data values pertaining to the other entities linked to it in the four-entity network shown in FIG. 5. Next is described the manner in which a data set formed within an SCR database, as just described for a particular SC component in a sequential chain, is associated with other data sets similarly formed for all SC components that comprise a sequential chain. As described above, registering a SC in a registry provides the SC with a unique identifier that may be used to associate all of the data (e.g., data for SC components, SC component hosts, objects, etc.) related to the sequential chain.

Figure 6:
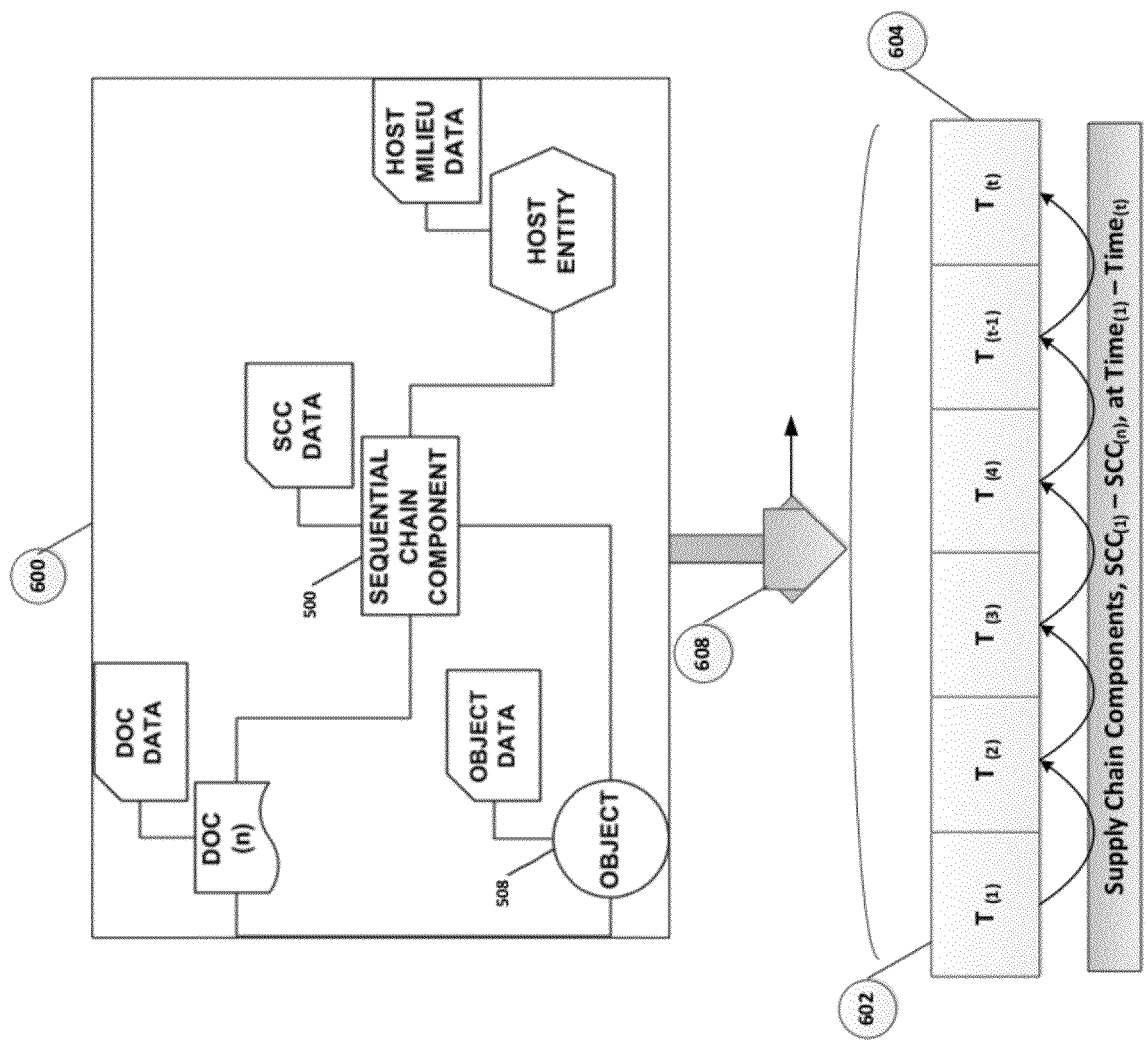
FIG. 6 illustrates the manner in which, in embodiments, a group, or set, of a plurality of such SC component-specific data sets may be formed.

The particular embodiments provided herein illustrate the manner in which vertical logical conjunction enables an SCR database to create a data set that associates particular data pertaining to an object that is related to a particular SC component, which component may comprise part of a sequential chain. FIG. 6 and the following description illustrate the manner in which, in embodiments, a group, or set, of a plurality of such SC component-specific data sets may be formed, thereby relating data in each particular data set (e.g., data pertaining to a particular SC component and a particular object in that SC component) to other data in all other such data sets for all SC components in which an object may exist or has existed in a uniquely identified sequential chain. As used herein, the process of associating a larger set of data sets so formed for a plurality of SC components (through which an object transits, or may transit, within a particular sequential chain) signifies horizontal logical conjunction.

As shown in FIG. 6, a data set 600 may be formed in an SCR database for a particular SC component. Data set 600 may pertain to an object 508 that exists, or has existed, in a particular SC component 500. Represented in the bottom portion of FIG. 6 is a time-sequential set of uniquely identified SC components (in adjacent rectangles), together comprising a uniquely identified sequential chain, wherein each discrete SC component, from component 1 to component (n), is shown in a series of time jumps from time $T_{(1)}$ 602 to time $T_{(t)}$ 604. Each time (t) represents a discrete time or time interval during which an object exists in, or has existed in, the SC component that relates to time (t). Such discrete time or time interval may be referred to as a timestamp, which term is used herein.

In embodiments, data relative to a time or time period, defined by particular timestamp(s), may be received by and stored in an SCR database as an attribute of: an object, e.g., a product; a SC component hosting the object during the time referenced by the timestamp(s); a document describing the object and/or the SC component; all three of these entities; or otherwise. In FIG. 6, the large arrow 608 extending between the data set 600 for SC component$_{(n)}$ and the set of time jumps through (n)-count of SC components represents the movement through time in which the object 508 transits through a sequential chain, wherein the sequential chain is comprised of the ordered sequence of SC components, that is, $SCC_{(1)}$ through $SCC_{(n)}$, and wherein the sequential chain is given its own unique identity which is received by and stored in the SCR database via a data entry form or any other method of gathering and storing data known to the art. The reference herein to "sequential chain registry system and method" employs the term "sequential" from this notion, or construct, of a SC component-centered data set, acting as a hub, that accretes over time into a larger data set as an object sequentially (in time) moves within a uniquely identified sequential chain through a plurality of uniquely identified SC components comprising the sequential chain.

Figure 7:
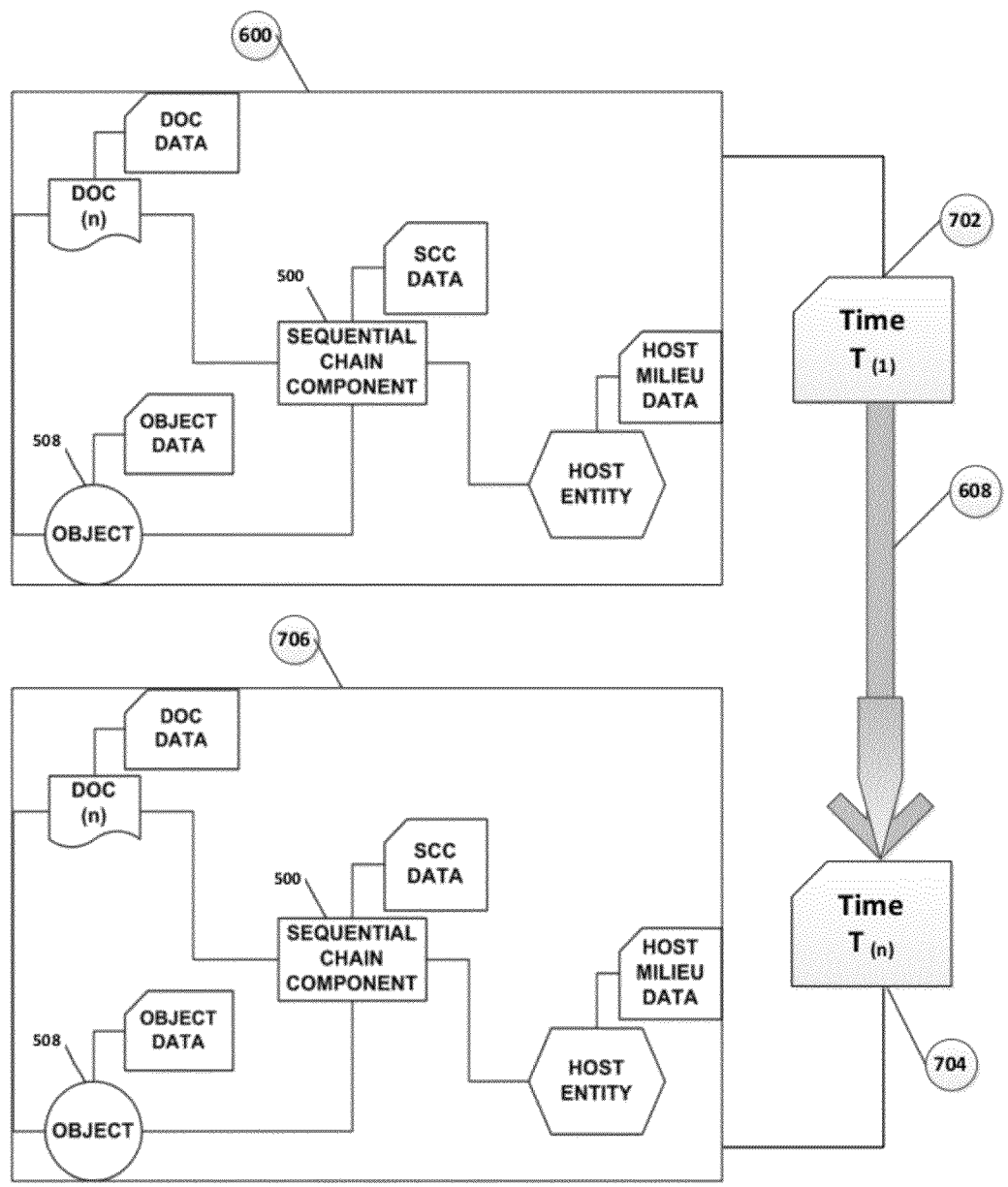
FIG. 7 is a block diagram illustrating an embodiment of a data set that may be organized and compiled within an SCR database for a particular object as it transits a sequential chain and/or as it changes its form during the transit.

FIG. 7 is a block diagram illustrating an embodiment of a data set that may be organized and compiled or received within an SCR database for a particular object that transits a sequential chain. Such extended data set for an object 508 is comprised of all data sets for each particular SC component that comprises a uniquely identified sequential chain and in which an object exists or has existed. As previously described, an object being tracked through a sequential chain may be dynamic. That is an object may change form as it traverses the sequential chain. As described herein, an object may change position (e.g., transit through space and time) as well as change its physical, chemical or other nature of form. The SCR embodiments described herein are able to capture these changes while maintaining data related to the object as it traverses the sequential chain. The use of the unique identifier assigned to a registered SC allows capturing data related to the object despite the object's undergoing dynamic changes.

In embodiments, data may be received by an SCR database such that data set 600, shown in FIG. 7, is compiled or received in the SCR database with respect to an object 508 that exists or has existed in SC component 500 for the time or time interval relating to timestamp $T_{(1)}$ (702). A plurality of such SC component-specific data sets may be received in the SCR database for each particular uniquely identified SC component in a uniquely identified sequential chain through and including the final such data set 706, which pertains to the final SC component in the sequential chain and to timestamp $T_{(n)}$ 704. By receiving such complete data set within the indicated data structure, an SCR database is enabled to: store all received data in relational tables; manipulate such data in a plurality of manners in response to users' data queries; and return such manipulated data to users in response to such queries via a data communications network. With an SCR database so enabled, users, enterprises and others may obtain significant informational value relating to objects (such as products) that are brought into markets via sequential chains and also relating to the components comprising sequential chains, to the host entities hosting such components, and to other information assembled or compiled via an SCR embodiment.

Data received by an SCR database may be declared by one or a plurality of system users. For instance, a single user may declare, via data entry forms, all data into the SCR database for a particular object as it transits all SC components comprising a uniquely identified sequential chain. Alternatively, data received by the SCR database may be declared by one user with respect to one or more SC components, while data may be declared by different users with respect to other SC components. By way of example but not limitation, an SCR database may receive data, via data entry forms: from a field administrative staff person for one or more upstream facilities (as SC components) and from a corporate finance staff person for other downstream operations (also as SC components). As used herein, "users" may also include natural persons, computer applications and other processes. For example, the SCR database may receive data from other sequential chains or sequential-chain systems. This can be particularly useful in situations where data relative to a sequential chain is currently stored in separate siloed database systems that are controlled by different organizations. The SCR registry permits such siloed information to be received and correlated according to formats that accommodate inter-organizational sequential chains. For example, the SCR registry enables data integration across various, siloed enterprise systems (e.g., Oracle vs. IBM databases) which allows for the continued tracking of data related to an object as it changes ownership and moves through different information systems.

Further, an SCR database may receive data from enterprise system users wherein such data relates to: an object that transits a sequential chain; a sequential chain that hosts a plurality of SC components; a plurality of SC components, which comprise a sequential chain; and some, but not necessarily all, of the data attributes pertaining to a SC component host entity. An example of an SC component host entity received by an SCR database may be, for instance, the classification (such as 'country') of a host entity of a particular SC component, as a data attribute, and the particular name of such host entity (such as 'Algeria') as a data value for such data attribute. Insofar as many data attributes relating to an SC component host entity, which hosts a particular SC component, may be specific to the host entity and not to an object or to other nature of database entities, an SCR database may receive data from a system facilitator for data attributes that describe a particular host entity. In such manner, a system facilitator may (but need not) be one who is outside of the particular entity managing an SCR system implementation, whereby such system facilitator may focus on data the pertains to SC component host entities, apart from an enterprise's objects that may exist in SC components hosted by such SCC host entities.

In embodiments, an SCR database may receive data from a plurality of different sources within an application environment of a particular SCR embodiment. Enterprise data (e.g., data comprising the type of data stored by one of the SCR data types disclosed herein) may be received by an SCR database from enterprise users and enterprise customers, while data describing a SC component host entity may be received by an SCR database from a system facilitator who focuses on providing host entity-specific data. For example, in embodiments SCC host entity data may be centrally maintained in a central repository. Because SCC host entity data may be relatively static in time (e.g., as may be contrasted to object data), central management of such SCC host entity data makes it easier to provide users with the proper SCC host entity data rather than requiring the user to discover that information herself. Managing the data as such allows for SCR system users a scale advantage by having a neutral party or parties maintain SCC host entity data which may be data attributes that are generated by many entities such as the UN, IMF, etc. pertaining to characteristics of countries. For example, the UN maintains a 'human development index' (HDI), which is updated annually; Columbia University maintains a number of country-specific environmental indicators; Transparency International maintains an annually updated index of Corruption Perceptions Index (CPI), etc. By providing a central repository for SCC host entity data, users do not have to individually maintain such data.

Blend Platform

Figure 8:
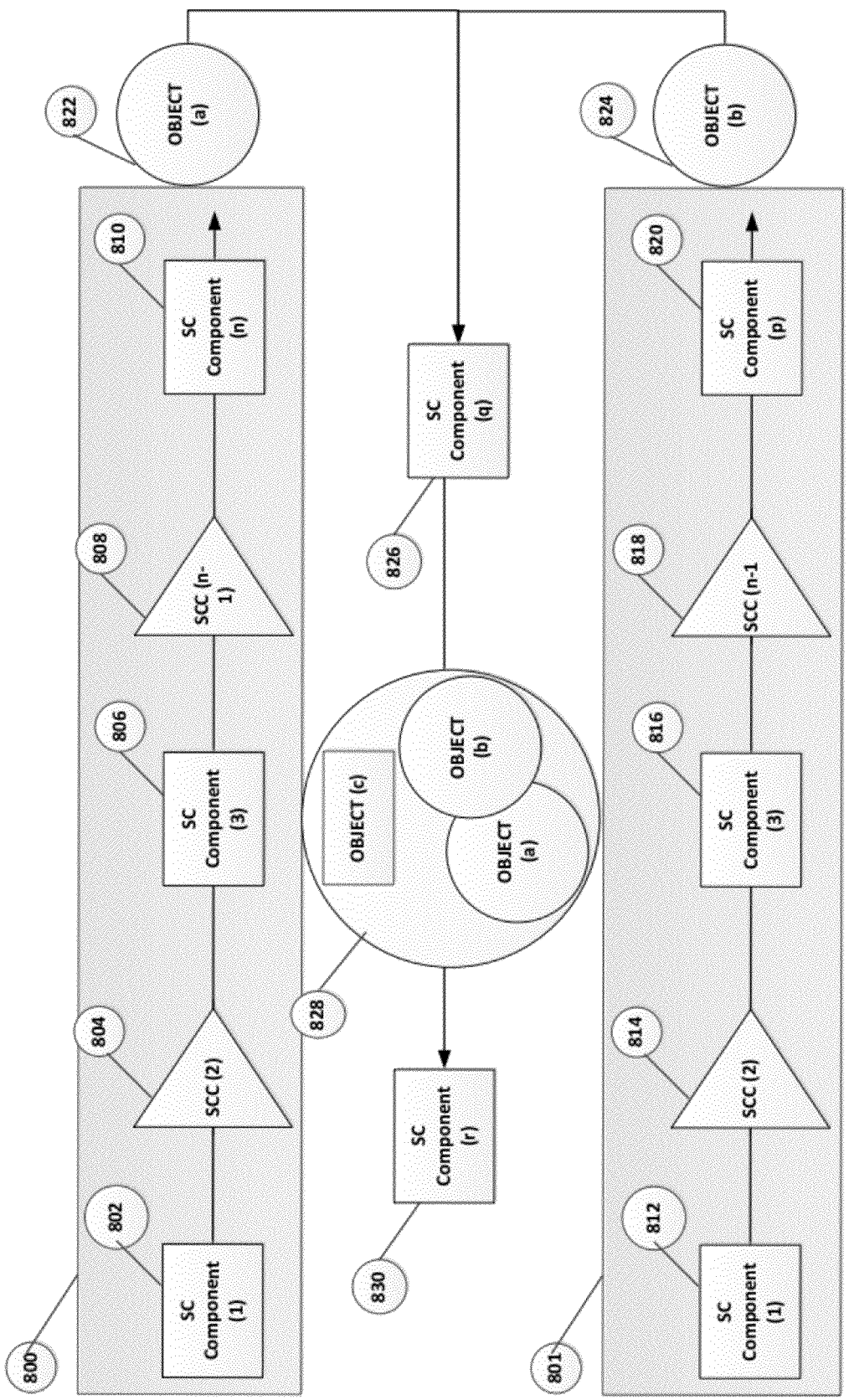
FIG. 8 is a block diagram illustrating an embodiment of a sequential chain construction of a particular class of SC component with the functionality of a blend platform.

FIG. 8 is a block diagram illustrating an embodiment of a sequential chain construction of a particular class of SC component (e.g., SC component (q) 812) with functionality of a blend platform. As used herein, the functionality of a blend platform is that which enables one or more uniquely identified objects [e.g., object (a) 822] to be combined, or blended, with one or more other uniquely identified objects [e.g., object (b) 824], wherein such objects' unique identity and existence within a uniquely identified sequential chain (and the constituent SC components comprising the sequential chain) have been recorded as data received by and stored in an SCR database and, further, whereby a combined, or blended, object [e.g., object (c) 828] may become a distinct object that may be further associated with one or a plurality of additional SC components (e.g., SC component (r) 830) that are situated downstream of the blend platform 812. An exemplary instance of the functionality of a blend platform 812 is described below. Additionally, values of data attributes for object (c) 828 may be separately measured or otherwise determined after the object (c) has been formed, or blended, in the blend platform. In this latter instance, once such values are measured or otherwise determined, an SCR database may receive data for such values via means described earlier.

In embodiments, an SCR database may receive data pertaining to: an object (a) 822; a sequential chain 800; and (n)-count of SC components 802, 804, 806, 808, 810 comprising such sequential chain, wherein such data may include data values for a plurality of data attributes, including a data attribute for one or more forms of unique identifiers, which give unique identity to data objects representing all of such object, sequential chain, and SC components (and, additionally, SCC host entities). In a similar manner, an SCR database may receive data pertaining to: an object (b) 824; a sequential chain 801; and (p)-count of SC components 812, 814, 816, 818, 820 comprising such sequential chain, wherein such data may include data values for a plurality of data attributes, including a data attribute for one or more forms of unique identifiers, which give unique identity to data objects representing all of such object, sequential chain, and SC components (and, additionally, SCC host entities). For clarity, it is noted that an SCR database, in addition to receiving such data, also may receive data (via a data entry form) that associate the respective object—that is, object (a) 822 and object (b) 824—with each SC component in which such object exists and further which associate each uniquely identified SC component with the uniquely identified sequential chain that hosts each SC component and SCC host entity.

SC component (q) 826, as an SCR blend platform, may receive object (a) 822 and object (b) 824, thereby resulting in formation of object (c) 816. In embodiments, object (c) 816 may be assigned its own unique identifier or DocString Identifier. As will be apparent to one of ordinary skill in the art, two or more such objects may be conjoined in blend platform 812, but, for clarity of representation, only two such objects are described herein and with FIG. 8. The combined, or blended, object (c) 816 may terminate its transit of a sequential chain at the blend platform, e.g. at the SC component (q) 812, or alternatively, such blended object may continue its transit to a further downstream SC component (r) 814. In embodiments, the SC component (q) 812 may also be a component of SC 800, SC 801, or both.

The references above to an object transiting a sequential chain and combining with another object in a blend platform, and including the possible further transit of the blended object to other SC components, signify an SCR database receiving data, via means herein earlier described, pertaining to the objects, the sequential chains and SC components comprising the sequential chains, and to any SCC host entities associated with SCCs. Referring to FIG. 8, computed values of data attributes for a blended object, as such blended object is herein above described, may be obtained by data manipulation in a plurality of manners, including computation: within an SCR database 220; within a data analysis module 1810; outside of the SCR database and the data analysis module, with resultant computed data received by the SCR database via means as herein earlier described; via some combination of these first three manners; or otherwise.

In embodiments, a blend platform 812 may be either a process activity, or PA, as indicated by the rectangle 812 in FIG. 8, or a change of control action, or CCA. Similarly, the SC component 814, if any, into which a blended object (c) 816 transits, may also be either a PA or a CCA. Further, in embodiments, if blend platform 812 is: i) a PA, then the succeeding SC component 814, if any, will be a CCA; ii) is a CCA, then the succeeding SC component 814, if any, will be a PA. In such manner, the previously described taxonomy and data structure are preserved for creating sequential chains (as database entities) from SC components (also as database entities), whereby a sequential chain commences and ends with a PA and with a CCA linking each adjoining PA. As will be apparent to an artisan of ordinary skill and as earlier herein described, other nature of taxonomy and data structure may be used. The taxonomy as herein described is one of various particular methods by which users may create logic tests to ensure clear and consistent construction of embodiments of sequential chains from SC components. System designers, users and others may choose to articulate alternative forms of taxonomies.

By way of example but not limitation, the following description is given to illustrate manipulation of data pertaining to objects being combined, or blended, at a SC component functioning as a blend platform in a particular embodiment of the SCR system and method. Object (a) 822 and object (b) 824 may be, for instance, two distinct lot quantities of crude oil, say, of 50,000 tons each. These two objects may be combined, or blended, at SC component (q) 812, each such object having exited its respective prior SC component (n) 810 or SC component (p) 820. Object (c) 816 may be created within the blend platform, e.g., within SC component (q) 812, resulting in the object (c) 816 being a new lot quantity of 100,000 tons of blended crude oil. For instance, the blend platform, e.g., SC component (q) 812, may be a large steel storage tank located at the premises of a petroleum refinery and used for storing crude oil and crude oil blends. In turn, SC component (n) 810 and SC component (p) 820 may each be a particular crude oil pipeline system that transports crude oil to the refinery storage tank.

The combined, or blended, object (c) 816 has associated with it a plurality of data attributes and corresponding data values. In embodiments, data values for these attributes of object (c) 816 may be computed via a plurality of methods. For instance, for the attribute 'quantity,' the quantity of crude oil associated with the object (c) may be computed within an SCR database, resulting in a data value of 100,000 tons for the blended object (c) 816. Another example of computed data, whereby a blended data attribute value may be computed for the blended object from data relating to objects comprising such blended object, follows. A crude oil blend of two different types of crude oil (for example, 50,000 tons each of Arabian Light and West Texas Intermediate crude oils) may have a combined, blended value of 9.7 for the attribute of the Corruption Perceptions Index, or CPI, as published by the Transparency International (TI) organization. Such exemplary blended data attribute may be computed from the CPI values as these are publicly reported by TI. Data values may be so computed for a plurality of data attributes for blended object (c) 816.

For these two exemplary instances of a blended object being formed from two distinct crude oil lots, it may be that a plurality of data attributes are not amenable to simple linear computation, such as illustrated above for the combining of quantities of the separate lots of an object. Accordingly, in such circumstances, a system designer or another may include appropriate computational modules: within an SCR database; within a data analysis module; or otherwise; and whereby such computational modules may perform computations of varying complexity in order to obtain data values for particular data attributes of the blended object. Such computational modules—for instance, products offered by SAS Institute, Inc. of Cary, N.C. or a variety of spreadsheet applications—therefore, may be employed to manipulate data to obtain values for data attributes pertaining to a combined, or blended, object formed in a blend module (also herein referred to as a blend platform). For instances in which computed data values pertaining to data attributes of a blended object are obtained via computation outside of an SCR database, such data values and data attributes may be received by the SCR database in the manner herein earlier described.

Split Platform

Figure 9:
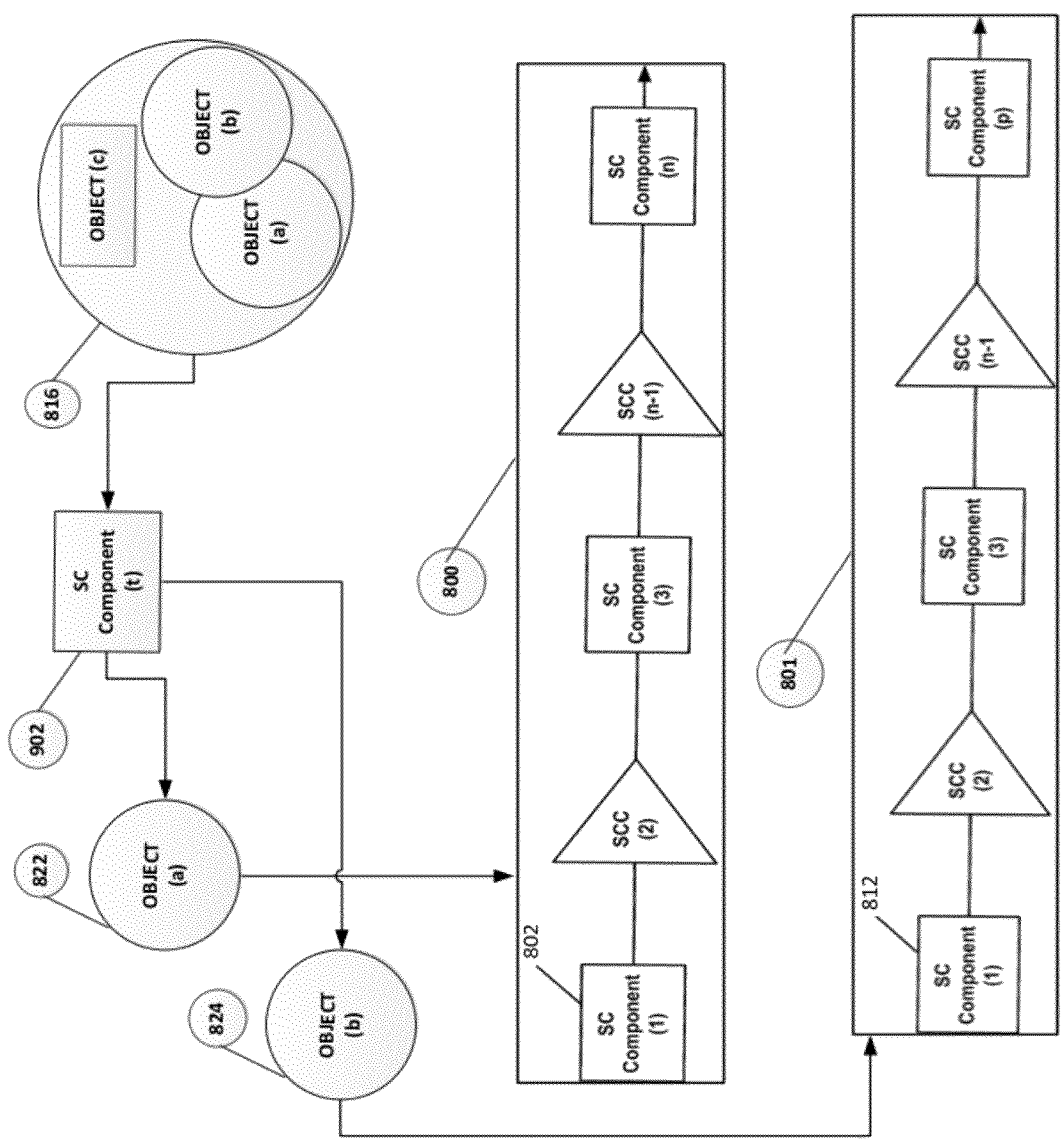
FIG. 9 is a block diagram illustrating an embodiment of a sequential chain construction by a system designer or another of a particular class of SC component with functionality of a split platform.

In further embodiments, in addition to blending multiple objects into a new blended object, an object may be split into multiple different objects. The SCR systems and methods disclosed herein are capable of tracking each split object through a sequential chain. FIG. 9 is a block diagram illustrating an embodiment of a conceptual construction by a system designer or another of a particular class of SC component [e.g., SC component (t) 902] with functionality of a split platform. As herein used, the functionality of a split platform is that which enables an object [e.g., object (c) 816] to be separated in a manner, e.g., to be split apart, at the split platform such that two or more component objects [object (a) 822 and object (b) 824] are derived, wherein such pre-split object's [e.g., object (c) 816] unique identity and existence within a uniquely identified sequential chain [that is, within a sequential chain that includes the uniquely identified SC component (t) 902 as a split platform] have been recorded as data received by and stored in an SCR database and, further, whereby the disaggregated, or split-apart, objects [e.g., object (a) 822 and object (b) 824] may be or become distinct objects that may be further associated in the database with other sequential chains, for instance, with sequential chain 800 or sequential chain 801.

For example, as illustrated in the embodiment depicted in FIG. 9, an object (c) 816 may transit into a split platform [e.g., SC component (t) 902] and be split apart in a manner that creates object (a) 822 and object (b) 824. Alternatively, more than two such split-apart objects may be formed at a split platform. The split-apart objects may then either: cease their transit of a sequential chain; or advance further downstream to another sequential chain such as sequential chain 800 or sequential chain 801. As will be discussed further with respect to FIG. 11, a sequential chain may contain several smaller sequential chains, each of which may, itself, comprise a proprietary sequential chain.

Data values for particular data attributes pertaining to the split-apart objects may be computationally derived in the manners herein above described for a blend platform. Alternatively, such data values for the split-apart objects may be separately measured or otherwise determined, following which an SCR database may receive such data values for the data attributes pertaining to the respective split-apart objects via means herein earlier described. An exemplary instance of the functionality of a split platform 902 is described next.

SC component (t) 902, as a split platform, may be a crude oil distillation tower in a petroleum refinery. Object (c) 816 may be a quantity, e.g., as a continuous flow, of crude oil, which is charged into the crude oil distillation tower. A plurality of distilled and residual hydrocarbon materials—such as represented by object (a) 822 and object (b) 824—may be formed by operation of the crude oil distillation tower. Such split-apart objects may be, for instance, olefins and other gases, light oils, and residual heavy oils, all of which may be formed via a crude oil distillation process. Thus, in such manner, the SC component (t) 902 is shown to function as a split platform.

Figure 10:
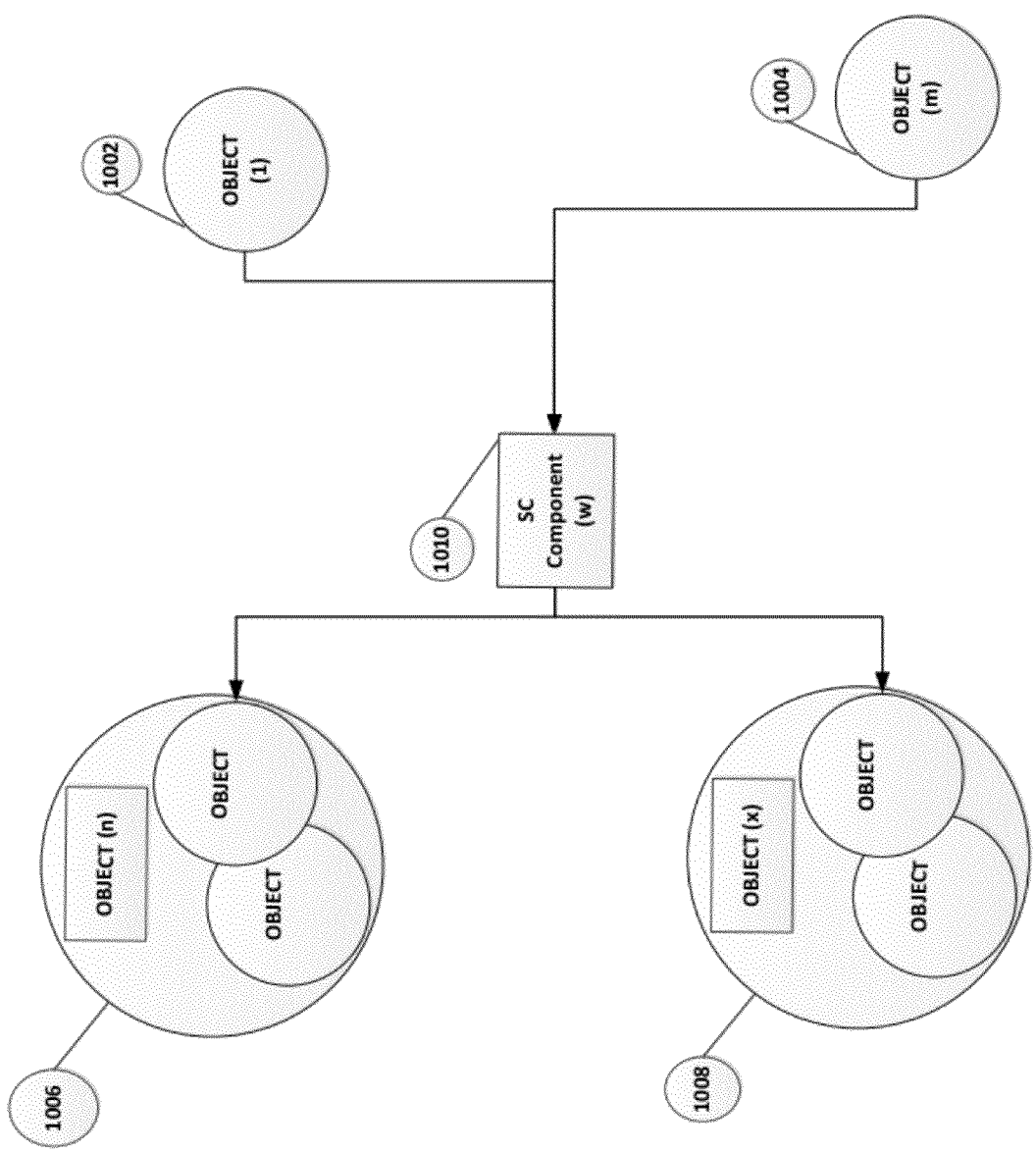
FIG. 10 is a block diagram illustrating an embodiment of dual functionality (e.g., a combination of the blend and split platforms) of a SC component.

As will be apparent to one of ordinary skill in the art, an SC component—such as SC component (q) 812 in FIG. 8, operating as a blend platform, or SC component (t) 902 in FIG. 9, operating as a split platform—may also operate in a manner that combines the respective functionality of both a blend platform and a split platform. FIG. 10 is a block diagram illustrating an embodiment of such dual functionality of a SC component.

Two or more objects—for instance, (m)-count of objects represented collectively by object (l) 1002 and object (m) 1004 in FIG. 10—may transit as separate feedstocks within uniquely identified sequential chains into SC component (w) 1010, which, first, functions as a blend platform. With such blend-platform functionality, as herein above described, these feedstocks may be blended into a single, composite object. Following such blending functionality, the SC component (w) 1010 may next function as a split-platform, thereby creating one or a plurality of split objects—for instance, (x minus n plus 1)-count of objects represented by object (n) 1006 and object (x) 1008. Objects exiting SC component (w) 1010 may proceed further downstream to other uniquely identified SC components or may cease their transit of uniquely identified sequential chains and SC components. In embodiments, certain attributes of the objects (l) 1002 and (m) 1004 may be calculated upon the blending described above and then distributed to the separated objects created by the subsequent splitting into the objects (n) 1006 and (x) 1008. For example, if a purity attribute for the feedstock (e.g., the sulfur or metals content of the feedstock) was recalculated upon the blending of objects (l) 1002 and (m) 1004 (each of which may have had separate and distinct purity attributes prior to blending), that purity may be assumed, in embodiments, to be applicable to both objects (n) 1006 and (x) 1008 after splitting. By way of example but not limitation, object (l) 1002 may represent a quantity of diesel fuel as may be refined from crude oil within process units of a petroleum refinery; object (m) 1004 may be a quantity of additive such as colored dye used in marking (e.g. for taxation purposes) certain grades or classes of diesel fuel; and object (x) 1008 may represent the color-marked diesel fuel emanating from the blend platform (w) 1010. Upon knowing the respective volumes (or weights) of objects (l) 1002 and (m) 1004, one may compute the concentration of object (m) 1004 contained in object (x) 1008, which latter object may be comprised of the combined quantities of objects (l) 1002 and (m) 1004.

Data attributes and data values for both in-bound and outbound objects, which transit through a SC component (w) 1010 operating in the dual (blend- plus split-) platform mode, as just described, may be received by an SCR database via the means herein described.

Modification Platforms

Modification platforms may be used to represent changes to an object as it traverses a sequential chain. As will be apparent to an one of ordinary skill in the art, in embodiments a modification platform functioning in a dual mode, e.g. as both a blend- and a split-platform, alternatively, may be designed as more than one modification platform. For instance, the dual functionality described above for SC component (w) 1010, shown in FIG. 10, alternatively, may be represented by one SC component functioning as a blend platform and another SC component functioning as a split platform in lieu of a single SC component functioning as a dual (blend-plus-split) platform. The text herein above and FIGS. 8, 9, and 10 have described and illustrated, respectively, SC components that operate: with functionality of a blend platform, whereby objects are combined or blended; with functionality of a split platform, whereby an object is split apart into a plurality of component objects; and with a dual functionality, whereby a plurality of objects may first be blended and, subsequently, split into a plurality of other objects. As will be apparent to an artisan of ordinary skill, other definitions of such platform functionality may also be employed in a schema design of a particular SCR database. For instance, the dual functionality just described—whereby an SC component first blends objects and then separates a blended object into other, split objects—may be reversed such that an SC component first operates in the split-platform mode and then in the blend-platform mode. An example of the latter may comprise a petroleum refining process, whereby a crude oil stream is first fractionated, thereby producing several product fractions; and, then, whereby a particular product fraction is combined with certain additives, thus resulting in an additive-enhanced product derived from the pre-fraction raw material stream plus the additive.

In addition to SC component functionalities of a blend platform and a split platform, described herein above and with FIGS. 8, 9, and 10, the SCR system and method may also employ another form of SC component in an embodiment utilizing a change platform. As herein used, the functionality of a change platform is that which enables an object to be changed in any manner other than by blending of two or more objects (as with blend platform) or by splitting apart an object (as with split platform). As herein used, therefore, the exemplary taxonomy of the SCR system and method employs three types of modification platform: blend platform, split platform, and change platform.

SC components functioning (within an SCR embodiment) as either a blend platform or a split platform, as herein above described, may effect physical changes to an object as the object progresses in a sequential chain. For instance, the combination of two feedstock streams within an SC component functioning as a blend platform may entail only physical changes, such as creating one larger object from two smaller objects. Another such instance is the physical change entailed with the liquefaction of natural gas into a liquid state in a liquefaction facility, thus representing a physical phase change in the object's nature.

By contrast, an SC component functioning as a change platform may operate in a manner to cause chemical or other nature of changes in, or to, objects. Thus, referring to FIG. 9, for instance, an object (c) 816 may be subjected to chemical processes or reactions in SC component (t) 902, such that derivative objects (a) 822, (b) 824 are created. By way of further example but not limitation, a change platform may treat with a change of ownership of an object, such as occurs when an object is bought and sold within an SC component. Another example of a change that may occur in a change platform is the payment of customs duties within the platform such that an attribute "price" may be modified to become "price including customs duties."

As will be apparent to an artisan of ordinary skill, SC component modification platforms—such as the blend, split and change platforms described herein—are system-design architecture conveniences that may be employed in the construction of an SCR database within a particular embodiment of the SCR system and method. Other SC component functionalities may also be defined and designed into the architecture and taxonomy of a particular SCR embodiment. Similarly, the schema illustrated in FIG. 4 and herein above described, is another such system architectural convenience. Uniquely identified SC components, as elemental segments that may comprise a uniquely identified sequential chain, may be employed in a plurality of manners as suited to a particular embodiment of the SCR system and method.

A sequential chain (as a database element) may be designed as an element received by, and stored in, an SCR database in a manner whereby one or a plurality of SC components comprising the sequential chain—and including SC components functioning as a blend platform, a split platform, a change platform, or other nature of such platforms—may host a particular object (and including changed forms of the object) at more than a single particular time or time interval. For instance, sequential chains may include functionality for recycling of objects, such as the return of scrap steel to a steel re-processing and fabrication facility. Thus, embodiments of the SCR system and method may employ a schema whereby sequential chains may be articulated within an SCR database in a linear fashion with objects transiting the sequential chain in a particular sequential order. Alternatively, other embodiments of the SCR system and method may employ a data schema whereby objects transit a sequential chain in a non-linear manner, for instance, when object-recycling within a sequential chain occurs.

As herein earlier described, an embodiment of the SCR system and method may be constructed wherein an SCR database may receive data pursuant to a particular schema and taxonomy such that a particular sequential chain and its constituent SC components, as elements in the sequential chain, may be uniquely identified and related within the database. Also as described earlier, the schema and taxonomy applied in a particular SCR embodiment may be other than those used herein. Such schema and taxonomy may be tailored to a particular application environment in which an SCR embodiment is implemented.

By employing a suitable schema and taxonomy within the architecture of a particular embodiment, a system designer or another enables the SCR system and method not only to associate data attributes and data values amongst uniquely identified sequential chains as database elements (e.g., data type-2) and uniquely identified SC components as database elements (e.g., data type-3) comprising sequential chains, but also enables those data to be further associated with: uniquely identified host entities (e.g., data type-4) that host SC components; uniquely identified objects (e.g., data type-1) that exist in, transit through, and may be modified within the SC components of a sequential chain; and other data. The SCR system and method enables such multi-factor data associations, or relations, amongst all the data types, or categories, just described and to enable manipulation of such data in response to search queries such that multi-dimensional data and information may be returned by SCR to system users and to others. Such multi-dimensional data and information, in some instances, is what is commonly referred to as instances of business intelligence, or BI.

Mixed Sequential Chains

Figure 11:
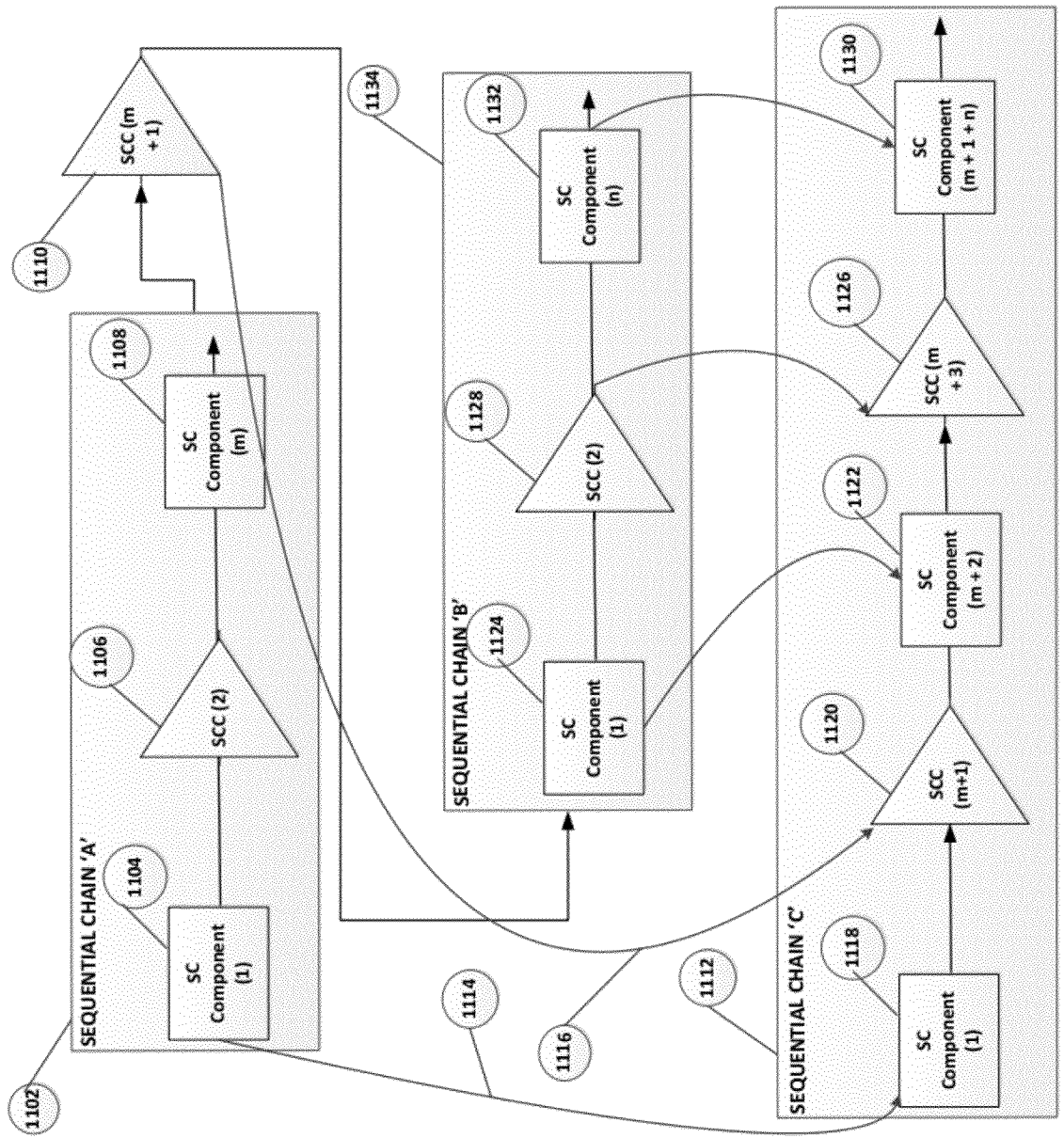
FIG. 11 is a block diagram illustrating another feature of a data schema that may be employed in an SCR embodiment.

FIG. 11 is a block diagram illustrating another feature of a data schema that may be employed in an SCR embodiment. This particular schema is a structure whereby an SCR database is enabled to receive data objects that describe a uniquely identified sequential chain 'C' 1112 that is comprised of two or more other uniquely identified sequential chains 'A' 1102 and 'B' 1134, which are joined by an SC component 1110 functioning as a change of control action, or CCA. As herein used: sequential chains 'A' and 'B' 1102, 1134 are referred to as proprietary sequential chains (or PSCs); sequential chain 'C' 1112, as a mixed sequential chain (MSC), that is, a sequential chain comprised of the three elements 1102, 1134, 1110; and SC component 1110, as a linking change of control action, or linking CCA. Also as used herein, for convenience: process activity is referred to as PA; change of control action, as CCA; and linking change of control action, as linking CCA. Alternatively, other data schema and taxonomies may be employed in order to link, or chain together, previously formed sequential chains. Such linking or chaining together allows for the across-enterprise combination of sequential chains that may be created by individual enterprises. For example, two different sequential chains, each used by different organizations that have disparate database systems (e.g., one organization using Oracle systems and another using IBM systems), each of which systems keeps track of the two separate sequential chains, may be combined via the sequential chain registry concept provided herein into a single sequential chain, thereby providing access to information that would otherwise be siloed within each such proprietary sequential chain. In such manner, therefore, a useful benefit of the SCR systems and methods is the enabling of, what is commonly referred to as, 'closed supply chains,' whereby the connotation of 'closed' (as enabled by SCR) refers to an enclosed data domain derived from data existing in disparate data domains of different organizations and whereby data from such disparate data domains otherwise may not be conveniently or efficiently cross-relatable as may be achieved via SCR.

A proprietary sequential chain (or PSC), such as the PSCs 1102, 1134 in FIG. 11, may be comprised of process activities (or PAs) and change of control actions (or CCAs), as herein earlier described. Also as herein earlier described, an SCR database architecture may be established whereby PSCs are formed: from (n)-count of SC components, where (n) is an odd whole number; from [(n+1)/2]-count of PAs and [(n−1)/2]-count of CCAs; and with a PA positioned both at the beginning and at the end of a set of sequential SC components, which together constitute a sequential chain. Referring to FIG. 11, for instance, sequential chain 'A' 1102 may be comprised of three SC components (such that the (n)-count of three is an odd whole number), including two PAs 1104, 1108 linked by one CCA 1106. By way of example but not limitation, the SC component, or PA, 1104 may be an oil loading terminal in the Persian Gulf; the SC component, or CCA, 1106 may be an ocean going oil tanker; and the SC component, or PA, 1108 may be an oil unloading terminal in Chennai, India. Thus, sequential chain 'A' 1102 is shown, for example, as comprised of three SC components, including two process activities (PAs) linked by one change of control action (CCA), wherein the (m)-rank for SC component 1108 is three. Similarly, exemplary sequential chain 'B' 1134 is also shown as comprised of an odd whole number of SC components of (n)-count 1124, 1128, 1132 and with a CCA positioned between each successive pair of PAs in that PSC. As will be apparent to an artisan of ordinary skill, alternative system architectures and taxonomies may be employed. For instance, particular users of the SCR system and method may wish to employ a structure whereby SCs may be comprised of an even number of SC components; other particular users may wish not to use the distinction employed in the exemplary taxonomy, as herein described, by not distinguishing SC components into PAs and CCAs but rather treating all SCC forms as under one general rubric, e.g., simply as 'SCC.'

Also as shown in FIG. 11, a mixed sequential chain, or MSC 1112, may be formed by concatenating two uniquely identified PSCs 1102, 1134 with a linking CCA 1110 conjoining these. The resulting MSC 1112, therefore, is comprised of: (m)-count SC components associated with proprietary sequential chain (PSC) 'A' 1102; one SC component, a linking CCA 1110, following the first PSC; and (n)-count SC components associated with proprietary sequential chain (PSC) 'B' 1134, which follows the linking CCA.

Insofar as the schema employed in this example embodiment calls for both (m)-count and (n)-count of SC components in the respective two sequential chains to be odd whole numbers, and since one linking CCA SC component is positioned between the two sequential chains, the resulting count of (m+1+n) results in an odd number of SC components for the MSC 'C' 1112. For example, if (m) is 5 and (n) is 9, then an MSC comprised of two PSCs with (m)- and (n)-count SC components, respectively, plus one linking CCA, would contain 15 SC components. Thus, in this instance, the example MSC 1112 shown in FIG. 11: contains an odd whole number, fifteen, of SC components; begins and ends with an SC component that is a PA; and contains one CCA between each two successive PAs. Structurally, therefore, both PSCs and MSCs are herein shown to be formed so as to contain alternating PAs and CCAs and to begin and end with a PA. A feature of this structure is that an MSC may readily be formed from two or more PSCs by joining, or plugging together, each adjoining pair of PSCs together via a linking CCA. Similarly, MSCs may also be formed into other MSCs from two or more MSCs or from one or more MSCs and one or more PSCs by joining, or plugging together, the component segments via linking CCAs. This feature may have utility, for instance, when one enterprise owns or controls a particular sequential chain that inter-operates with a different enterprise's particular sequential chain, as is a common practice in global trade, commerce and finance. Thus, by having a capability for conjoining different enterprises' particular sequential chains into MSCs, the SCR system and method enables tracking and tracing of objects (and including a plurality of data attributes and data values pertaining to such objects) through complex sequential chains that may be owned or controlled by multiple enterprises. Such capability may afford to SCR users and others particular benefit in that cross-enterprise data integration becomes achievable, even in circumstances where multiple different enterprises may employ multiple different data systems and whereby such data integration may not otherwise be possible without SCR.

In other embodiments, other logical schema and arrangements may be employed for designating the composition of sequential chains from discrete segments (e.g., from SC components) and also for conjoining such sequential chains into larger sequential chains. As will be apparent to an artisan of ordinary skill, mixed sequential chains (or MSCs) may be formed not only from two distinct proprietary sequential chains (PSCs) plus one linking change of control action (linking CCA), but also from a plurality of other combinations of both PSCs and MSCs. The system and method as described herein enables MSCs to be formed from any set of conjoined PSCs and MSCs, whereby each pair of adjoining sequential chains is conjoined by an inter-connecting linking CCA. For instance, MSCs may be created by conjoining: two PSCs with one linking CCA, as described earlier; two other MSCs with one linking CCA; one PSC and one MSC with one linking CCA; or, more generally, any number (k) of sequential chains with (k minus 1)-count of linking CCAs conjoining each pair of adjoining sequential chains. Additionally, other schema may also be employed.

By employing the schema just described for distinguishing between proprietary sequential chains, or PSCs, and mixed sequential chains, or MSCs, an embodiment of SCR may also employ a binary distinction, such as, for example, a flag, (that is, a distinction for a particular attribute and attribute value applicable amongst all SC components of a particular sequential chain) in a plurality of manners. For example but not by way of limitation, an embodiment of SCR may treat an entire PSC as a sequential chain that possesses a common attribute and common attribute value amongst all the SC components comprising the sequential chain. For instance, the '1' condition of such binary distinction for an entire PSC may signify all SC components comprising the particular sequential chain are owned or controlled by a single enterprise. In turn, the '0' condition of such binary distinction may signify all such SC components are not owned or controlled by a single enterprise, for instance, that they are leased by the enterprise establishing the particular sequential chain. Such binary conditions, as used herein, can be implemented, in embodiments, as flags set in an SCR database and associated with such SC components. One utility of such flags may be that they serve to alert an operator of a plurality of different SCs regarding the degree of control, ownership or inherent risk associated with particular SCs.

In embodiments, one such binary distinction may be owned- versus leased-status of SC components within a sequential chain. Another such type of binary distinction might be that of enterprise-controlled versus government-controlled status of particular SC components. Alternatively, a plurality of other such distinctions may be employed, depending on the circumstances and needs in a particular application environment. Further, by enabling such binary distinctions via the construct of forming mixed sequential chains (MSCs) in a plurality of manners, data analysis is possible—within an SCR database, within a data analysis module, or otherwise—such that attributes of entire sequential chains (in addition to attributes of SC components within a sequential chain) may be taken into consideration and analyzed. For instance, an enterprise (or an entire industry or industry sub-sector) implementing a particular SCR embodiment that distinguishes PSCs as either enterprise-owned or enterprise-leased may determine the degree to which enterprise-produced goods are sold into markets via sequential chains that are comprised of entirely- or partly-owned SC components versus those that are comprised of entirely-or partly-leased SC components. Such data analysis capability may provide utility for assessing an enterprise's degree of sequential chain control, risk and other attributes.

A plurality of data attributes may be employed to describe a particular sequential chain. In the foregoing, an embodiment of the SCR system and method is described whereby: most of a sequential chain's description is derived, or inherited, from data attributes and data values that describe the SC components which comprise a sequential chain; plus one attribute of an entire sequential chain's characterization—e.g., the binary discriminant that may be implicit in the distinction between PSCs and MSCs, e.g., enterprise-owned versus leased status of a sequential chain—plus the unique identifier of the sequential chain. Alternatively, a plurality of attributes may be specified with respect to an entire sequential chain. Embodiments of the SCR system and method may provide for most of the attributes that describe a sequential chain to be those associated with the sequential chain's constituent SC components, rather than with an entire sequential chain, such that a sequential chain may inherit particular attributes from its constituent SC component parts.

A particular benefit of a schema whereby most attributes (and the attributes' corresponding values) of a sequential chain are associated with particular SC components, as constituent parts of a sequential chain, is that the data security protocol and access privileges structure of a particular RDBMS (as that system may be employed in an SCR embodiment) may be used to enable user access to data contained in an SCR database on a more granular SC component basis or, alternatively, on a more aggregated sequential chain basis. For instance, an implementation of SCR may be established wherein a plurality of users may have access to system-stored data for one or a plurality of particular sequential chains or, alternatively, for one or a plurality of particular SC components, or otherwise. By way of example but not limitation, a relatively long and complex MSC may be formed such that particular users are granted access privileges to data associated only with particular sequential chains comprising the MSC or to particular SC components comprising one or more particular sequential chains. In such manner, an SCR embodiment may implement and enforce certain look-forward and look-back data access rules such that particular users may be granted system access only to certain uniquely identified SC components. For instance, in an embodiment for the oil and gas industry, a particular crude oil trader may be granted system access only to data pertaining to the trader's immediate supplier's sequential chain (e.g. the sequential chain of a crude oil producer selling crude oil to the trader) and to data pertaining to the trader's customer's sequential chain (e.g. to the customer's initial SC component, which may be a set of oil storage tanks) A further, general example follows of the benefit deriving from the exemplary structure herein described—e.g., as this exemplary structure employs discrete, uniquely identified SC components to comprise a uniquely identified SC and, further, as this componentization enables particular security protocols and data access controls. By enabling cross-chain association of information existing at all loci and all times within a uniquely identified SC, and with appropriate security protocols and data access controls (as these are typically available within existing database systems), multiple different enterprises co-involved in SCs (e.g., in MSCs) may be more likely to participate in the sharing of data if they know that they can rely upon specific access controls that will limit particular users, or classes of users or others, as to the extent of particular data classes that may be viewed or otherwise accessed from an SCR database.

DocString Identifiers

As herein earlier described, uncovered objects are objects that are not amenable to tracking and tracing by existing systems that employ physical forms of object unique identifiers, e.g., barcodes and RFIDs. For instance, a large lot quantity of crude oil may transit a complex, global sequential chain wherein one particular product (e.g., one product out of many products) created from such raw material input may be a smaller quantity of refined petroleum product, for example, a particular lot of diesel fuel contained in a tank truck or a particular drum of motor oil. In this exemplary instance, a plurality of processes and other steps occurs throughout the sequential chain, whereby a large quantity of raw material (e.g., crude oil) input is converted into many subsets of product output (e.g., diesel fuel and motor oil) in a manner such that the original object (e.g., crude oil) is altered, destroyed or otherwise rendered unusable, changed or ineffective via conversion into such derivative products.

In order to provide a form of object unique identifier that continuously may be associated with each and all of the original raw material input (e.g., a lot quantity of crude oil), the final product output (e.g., a lot quantity of a particular refined petroleum product, such as petrol) and all object forms that transit a sequential chain in between the first and final steps of the sequential chain, the document string identifier, or DocString identifier as used herein, is created to provide a form of object unique identifier, wherein otherwise an existing form of object unique identifier (e.g., a barcode or RFID) is not available for purpose. For the example instance just cited, the DocString identifier, therefore, has the effect of a synthetic molecular identifier, whereby the hydrocarbon molecules contained in the original, source raw material (e.g., crude oil) may be tracked and traced through a sequential chain and, via the SCR system and method, may be linked to the final, output products (e.g., diesel fuel or motor oil in their respective containers) and also to the intermediate products as those intermediate products existed prior to the final such product and after the first, source raw material.

Figure 12:
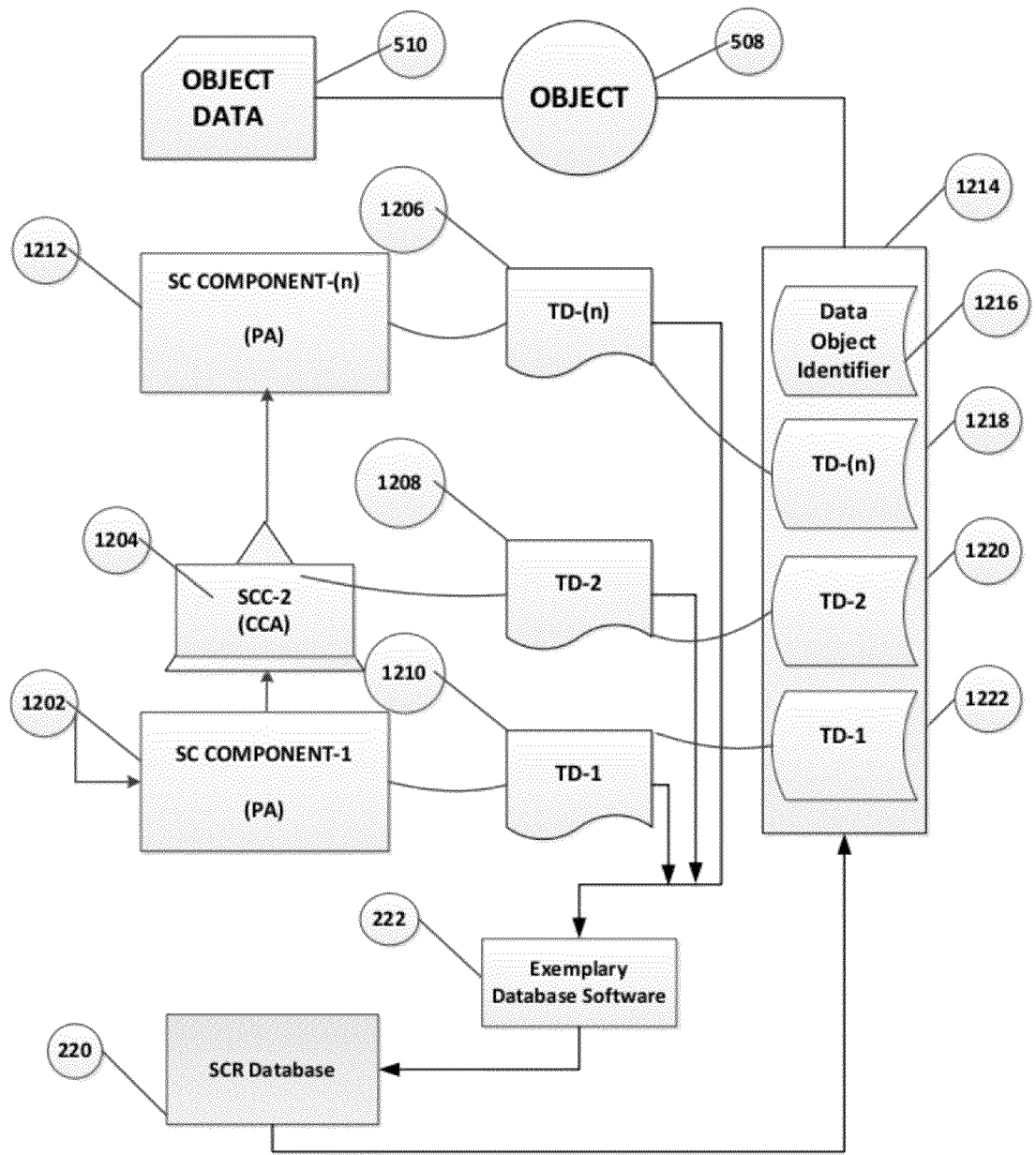
FIG. 12 is a block diagram illustrating formation of a DocString identifier and the relation of the DocString identifier to an uncovered object, which is given unique identity by such form of object identifier.

FIG. 12 is a block diagram illustrating formation of a DocString identifier 1214 and the relation of the DocString identifier to an uncovered object 508, which is given unique identity by such form of object identifier. The DocString identifier form of object unique identifier may also be employed to give object unique identification to a covered object in lieu of otherwise, or in addition to, employing a form of existing object unique identifier that may be available to such covered object.

A plurality of (n)-count SC components 1202, 1204, 1212 is depicted in FIG. 12 to represent SC components comprising a particular sequential chain. For instance, by using data entry forms, a system user or another may enable an SCR database 220 to receive and store data, via database software 222 and via a data communications network, whereby such data establish the unique identity (and other data attributes) of particular SC components and unique identity of a particular sequential chain comprised of the particular SC components. Often, in commercial sequential chains, a trade document (or other form of document) accompanies, or is related in some manner to, an object 508 that transits such sequential chains via a series of SC components. For instance, FIG. 12 shows trade documents TD-1 1210, TD-2 1208, and TD-(n) 1206 as being associated with the corresponding SC components SCC-1 1202, SCC-2 1204, and SCC-(n) 1212. By way of example but not limitation, TD-2 1208 may be a particular bill of lading related to a particular lot quantity of crude oil, as object 508, and to a particular ocean vessel, as SC component-2 1204 (that is, to the ocean vessel as an exemplary instance of a change of control action, or CCA, which is a type of SC component herein represented by a triangle such as element 1204).

In embodiments of the SCR system and method, an SCR database 220 may receive data via database software and a network from one or a plurality of systems, users or others, whereby data pertaining to a set of (n)-count of trade documents—for instance, trade documents TD-1 1210 through TD-(n) 1206—may be stored in the SCR database 220 as a data string or otherwise, which, when combined with a data object identifier for such set of data objects, is referred to herein as a DocString identifier. More specifically, in embodiments, a DocString identifier 1214 may include: a particular form of data object identifier 1216, which gives unique identity to the entire data object constituting the DocString identifier 1214; and, a particular form of data object identifier 1222, 1220 1218, which gives unique identity to each trade document 1210, 1208, 1206, wherein each such trade document relates to a corresponding SC component 1202, 1204, 1212 and to the object 508, as the object exists in a particular form or state in each respective SC component (and wherein an object's particular form or state in one SC component may differ from that in a different SC component, for example, due to successive types of processing of the object within different SC components and/or due to the spatial movement of the object through different SC components). In embodiments, a trade document (or document) may be any type of information related to the object or to a process at a certain point in the sequential chain. As such, a trade document can be any type of information regarding the object, sequential chain component, sequential chain component host entity, or sequential chain. In embodiments, such documents may comprise physical documents (e.g., bills of lading and sales invoices) that are scanned or otherwise digitized and received into the SCR system. In embodiments, a trade document may also be created by entering the information into the SCR system, that is, the trade document may not exist prior to entry of the data into the SCR system. Furthermore, one of skill in the art will appreciate that a trade document may be any item capable of storing such data (e.g., electronic data stored in memory, a physical document, or any other data storing mechanism). In embodiments, the data on, or contained within, the trade document may be converted in order to be entered into the SCR system (e.g., a paper document may be digitized by scanning the document or by inputting the information on it manually).

In embodiments, any suitable form of identifier, such as the GS1's Global Document Type Identifier (or GDTI) or a sequential number, may be employed for giving unique identity to: the DocString identifier 1214, e.g., as the data object identifier 1216 of the DocString identifier; the trade documents 1222, 1220, 1218; and the SC components 1202, 1204, 1212.

In embodiments, the form of object unique identifier employed for identifying the entire DocString identifier need not, but may, be the same as the form of object unique identifier employed for identifying the trade (or other) documents. Thus, herein has been described, and illustrated with FIG. 12, the manner in which a DocString identifier 1214 may be formed within an SCR database 220 and stored (as a data string or otherwise) by the database for the purpose of giving object unique identity to an object 508, as the object exists in a particular state in a particular SC component within a particular sequential chain, whereby otherwise such object (e.g., an uncovered object) may not have available to it an alternative form of existing object unique identifier, such as a barcode or RFID. An SCR database may receive a plurality of data values pertaining to a plurality of data attributes that relate to an object (and including data constituting a DocString identifier 1214), whereby such data is stored as object data 510. In such manner, an object data 510 file is stored within an SCR database 220, shown in FIG. 12, so that data and information, pertaining to the object, received by the database may be accessed by users and related to other data with respect to the object's transit through the sequential chain. Referring further to FIG. 5, an entire set of object data 510 may be received by an SCR database, whereby, in addition to data being so received for the object 508, data is also so received pertaining to each SC component in which the object exists or has existed and to each corresponding SC component host entity 504. Thus, the DocString identifier enables an SCR database to receive and associate, or relate, data pertaining to a plurality of data attributes and data values, including data relevant to: the object, as it exists at each SC component; each SC component that hosts the object; and each SC component host entity (and SCC host sub-entity) that hosts each SC component. The capability of a DocString identifier to enable such data relations for uncovered objects (wherein an alternative form of existing object unique identifier may not otherwise be available) is one benefit of embodiments of the SCR system and method.

The manner in which a DocString identifier may be stored in an SCR database table is illustrated in FIG. 13. Data table 1300 is an embodiment illustrating how particular object-related data may be associated, or related, to other such data. Each column in the table identifies a particular attribute, e.g., the Name-Item 1302, which gives name to an object as the object exists in a particular SC component. Other attributes may include: name of a particular sequential chain 1304, which may host a plurality of SC components, and an ID and name of a plurality of SC components 1306, which may comprise a sequential chain. A DocString identifier 1308 may have a particular identifier and may also have a particular name. The final three columns 1310 in table 1300 illustrate an exemplary identifier for each trade document and give a name and description of the document. Additionally, other or different data attributes may be employed for describing a DocString identifier.

By way of example but not limitation, the set of data 1312, contained in exemplary database table 1300, represents a particular exemplary instance of an object's 1302 existence in a particular SC component 1306—e.g., a SC component with ID of '51' and name of 'gathering lines'—within a particular sequential chain 1304. In this exemplary instance, a DocString identifier is given unique identity as '7' and name as 'Item-15 DocString.' The last three attributes 1310 in the table indicate a particular trade document's identifier, the document's name, and a description of such exemplary document, for instance, as 'meter tickets.' Thus, the element of the DocString identifier used to maintain object unique identity of object 1302 while that object exists in SC component number '51' is herein illustrated as a particular meter ticket, for instance a measurement report indicating the quantity of object that flowed through the particular SC component, 'gathering lines' during a particular time interval. In this exemplary instance, the object 1302 is 'El Morgan crude oil,' (a type of Egyptian crude oil). As the object 1302 transits other SC components 1306 within the sequential chain 1304, an SCR database may receive additional data pertaining to the object and its related attributes at each such SC component. The DocString identifier 1308, which gives object unique identification to the object and which is given its own identity as '7' in this example, increments in its entire data content as the object transits each incremental SC component, for example, from SC component no. 50 to no. 55, as shown in 1306.

Figure 14:
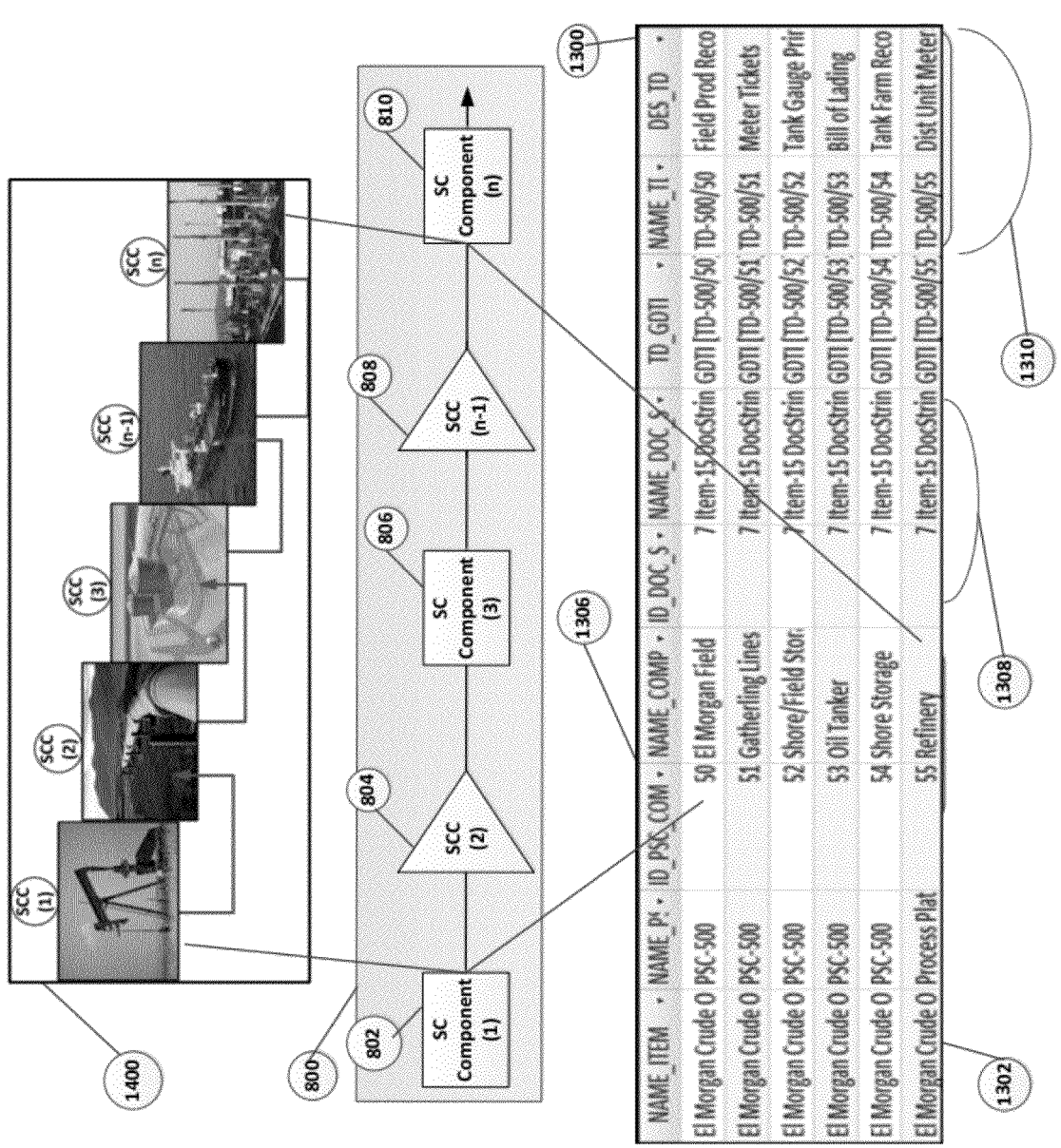
FIG. 14 shows an exemplary instance of application of a DocString identifier.

An exemplary instance of application of a DocString identifier is shown in FIG. 14. In embodiments, an SCR system or method may consider a multi-stage sequential chain in a real-world, physical manner or context. For instance, FIG. 14 shows such a real-world sequential chain 800 comprised of a set of SC components: starting with a producing oil field and continuing downstream, for instance, to pipelines, storage tanks, oil tankers and to a refinery where crude oil may be refined into petroleum products. SCR systems and methods then may translate such real-world construct into a conceptual form of sequential chain 800, whereby the particular real-world sequential chain may be conceptualized to include a set of SC components 802 through 810. That is, as shown in FIG. 14, the sequential chain is comprised of a plurality of SC components, each component related to other components in a defined relational manner, as recorded in a database, whereby an object temporally transits the sequential chain via each such SC component. In the exemplary instance illustrated, such object is shown to be a particular type or grade of crude oil, and the sequential chain is shown to be comprised of an oil field, one or more pipelines and other SC components, culminating at a petroleum refinery.

A particular problem that effectively may be addressed by SCR is now described, with reference to FIG. 14. In the illustrative real-world sequential chain 1400 depicted in FIG. 14, an object—in this instance, for example, a lot quantity of El Morgan crude oil produced in Egypt—may be shown to transit through the conceptually structured sequential chain 800 via a set of linked SC components from SC component (l) 802, which, for instance, may be the El Morgan oil field, ultimately to SC component (n) 810, which may be a petroleum refinery at which the exemplary crude oil may be refined into petroleum products. Such refined petroleum products may then transit further downstream, through the same sequential chain 800 as transits the crude oil, that is, through additional SC components following SC component (n) 810. Alternatively, such petroleum products may enter into, and transit through, one or a plurality of SC components that comprise a sequential chain different from the one illustrated 800. For illustrative purposes, only the set of SC components shown for sequential chain 800 are considered, that is, the set of SC components 802 through 810 through which a quantity of El Morgan crude oil transits to reach a particular refinery, where crude oil may be refined, or processed, into petroleum products.

A particular problem relative to objects that transit sequential chains in global trade (and otherwise)—e.g. lot quantities of crude oil, natural gas, mineral ores, agricultural commodities and the like—is the problem of retaining, relating, and accessing data and information relevant to such objects as these transit from one process to another. A related problem is that of retaining and accessing data and information pertaining to the stages or sections of a chain, e.g., to the SC components, through which an object transits and in which objects may be processed or otherwise handled. A further, related problem is that of retaining and accessing data and information pertaining to the attributes and attribute values of: such objects as they exist in each particular SC component of a chain and allowing for the fact that such objects may or may not be modified within a particular SC component via physical, chemical, or other nature of modifications (e.g., via modification platforms as earlier herein described); such SC components themselves, for instance, data pertaining to ownership, geographic or other attributes of a SC component and including information pertaining to processes that may occur in a SC component whilst an object is in the component; a host entity or host entities (and sub-entities) pertaining to each such SC component; the data describing each such host entity (and sub-entity) that hosts a SC component, for instance, the geographical information that may describe the host entity of a SC component or measures that may describe the tax status of a particular SC component host entity; and other data and information.

The problem just described may be acute for objects that otherwise may not be amenable to track and trace operations via existing methods such as by use of RFIDs or barcodes placed on the object. That is, the problem described may be acute for uncovered objects, as such objects are herein earlier described. Application of the DocString identifier form of object unique identifier, via the SCR system and method, solves this data retention and access problem for uncovered (and covered) objects. The DocString identifier enables continuous tracking and tracing of uncovered objects by: associating a uniquely identified trade (or other) document pertaining to the object as it exists at or in a particular SC component with all other such documents pertaining to the object (including such object in a modified form) as the object exists at or in all other SC components within a particular sequential chain; employing a form of unique identifier for each such unique document; linking together all such uniquely identified documents, each one relating to the object as it exists (or existed) in an SC component included within the sequential chain; giving a form of unique identifier—e.g., the DocString identifier—to the entire data set of unique identifiers for the corresponding such documents; and employing that form of unique identifier (the DocString identifier) as a means for giving continuous object unique identity to, what are herein referred to as, uncovered objects.

For instance, as shown in FIG. 14, a lot quantity of crude oil, as an object 1302 in database table 1300, may have commenced transit of a sequential chain 800 at the El Morgan oil field, e.g., as SC component 1 802, and been identified at that SC component via a particular trade document, shown in the figure as TD-500/50, field production record. The object 1302 may continue transit through a sequence of SC components, finally reaching and transiting SC component (n) 810, which, for instance, may be a petroleum refinery. For each SC component in this exemplary instance, an SCR database may be informed of a particular document associated with the object for each particular SC component, culminating in the illustrative refinery-related trade document, shown in the figure as TD-500/55, distillation unit meter record.

The entire set of trade documents 1310 may then be related and stored in an SCR database, with such set given its own unique identifier. For the illustrative instance shown in FIG. 14, each particular trade (or other) document may be given (by a system user or another) a unique identity, such as via a GDTI (e.g., GS1's global document type identifier), and then the grouping, or set, of such uniquely identified documents also may be given (by a user or another) a single unique identity 1308. For instance, in FIG. 14, a single DocString identifier 1308 may be assigned a unique sequential, numerical identity of '7' and/or a unique name of 'Item-15 DocString.' Such DocString identifier, as a data object contained in an SCR database, enables an uncovered object to be continuously identified as such object transits a sequential chain that is maintained within an embodiment, including an uncovered object that may undergo physical, chemical, or other nature of changes within SC components of such sequential chain. Such continuous identification of an uncovered object like crude oil and derivative products of crude oil may not otherwise be possible through use of existing object unique identifier forms such as barcodes and RFIDs even though such other forms of object unique identifiers may be viable for particular (typically, downstream) segments or components of a sequential chain such as a supply chain.

With such unique object identifier, that is, with a DocString identifier formed as described, the exemplary object—e.g., a lot quantity of liquid crude oil, as such object may initially exist in form—may have its unique identity preserved throughout the entire sequential chain 800, which may be comprised of a plurality of SC components. With this manner of continuous identification of an object (which object may not otherwise be amenable, continuously through a sequential chain, to holding an existing form of identifier, such as an RFID or barcode), the continuous, uninterrupted identification of objects may be maintained as objects transit through (and may be modified within) sequential chains. Thus, the DocString identifier form of object unique identifier can solve the problem of how to track and trace uncovered objects through sequential chains, wherein, otherwise, such ability to track and trace may not be available. Further, via the construct of mixed sequential chains, or MSCs, the DocString identifier can also solve this problem in environments where uncovered objects transit complex sequential chains, or SCs, that are comprised of chains operated by more than one enterprise and also wherein multiple enterprises may employ different forms of sequential chain management systems (e.g., different forms of supply chain management systems, or SCM systems). Within the SCR system and method, therefore, the combination of the DocString identifier with other SCR system capabilities, as herein described, enables an embodiment to provide a plurality of functions including but not limited to: receiving otherwise inaccessible data relating to uncovered objects; storing such data in a relational (or other form of) database; relating such data to other data stored in the relational (or other form of) database; relating such data to other data stored in other data systems, to data stored in enterprise data systems and to data stored in global data synchronization networks; manipulating such data in a data analysis module; and responding to users' search queries for such relational, manipulated, and other data. As will be apparent to an artisan of ordinary skill, such capabilities of the SCR system and method are logically available to system users and others with respect to objects that are not uncovered objects, e.g., with respect to covered objects. For example, the DocString identifiers for objects transiting through their own respective SC may be combined into a new DocString identifier that uniquely identifies the combined object created when two or more objects come together (e.g., a blended object), and then may be broken into two separate DocString identifiers to capture the fact that the blended object may be split at a later time. As such, DocString identifiers may be combined and split any number of times as an object traverses a sequential chain. In other embodiments, separate DocString identifiers may be maintained through blends and splits by adding information from other DocString identifiers as necessary to identify other sequential chains that are introduced and split away at different points.

Figure 19:
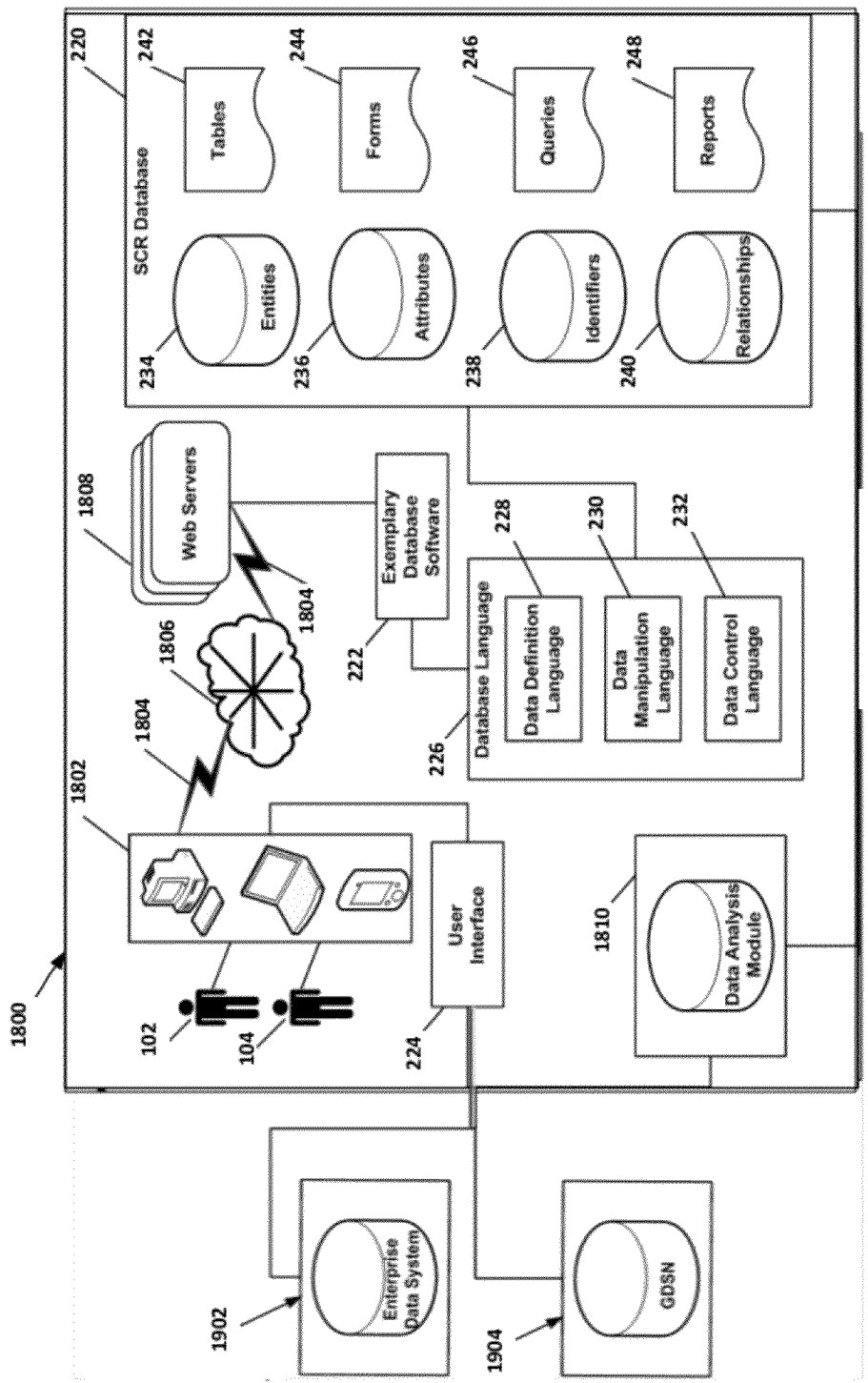
FIG. 19 is a block diagram illustrating an exemplary embodiment of an SCR application in an environment wherein SCR database may receive data from either of, or both, an enterprise data system and a global data synchronization network.

An example of the benefit of such capabilities, as herein described, is given with respect to large lot quantities of crude oil that may be transported to and processed in a petroleum refinery, from which refined petroleum products may be further transported to customers, including, for instance, such products as refined aviation fuels, gasoline, and diesel fuels. For a plurality of reasons—for instance, for reasons of compliance with local, regional, national, or international regulations (whether of a mandatory nature of regulation such as by law [e.g., by the U.S. Dodd-Frank Act] or via a form of voluntary regulation such as may be promulgated by an international organization [e.g., by the EITI])—a purchaser of petroleum products, e.g. of diesel fuel, may wish, or be required, to be aware of particular attributes pertaining to origins or other characteristics that describe the crude oil processed in a petroleum refinery and from which crude oil such petroleum products may be derived. As an example of uncovered objects, a lot quantity of, say, diesel fuel may not be amenable (e.g., via existing systems such as those using RFIDs or barcodes) to being accurately described, or characterized or classified, in terms of the crude oil source(s) used to produce such diesel fuel or to facts and circumstances pertaining to the sequential chains and SC components through which crude oil transits from source to refinery or through which diesel fuel transits from refinery to customer. Another example of an uncovered object type, which is amenable to the SCR systems and methods, is water, for instance water as an input resource to the production of soft drinks and other beverages. The Aqueduct Alliance (a multi-stakeholder initiative backed by seven large U.S. corporations and by the World Resources Institute, an environmental campaign group) is launching in 2011 a new database showing water availability at a local level. Enterprises, such as Coca-Cola, producing and marketing soft drinks, may wish to enhance their product's brand image (and/or the image of the enterprise itself) or otherwise differentiate their product by providing customers (via suitable user interfaces, such as via a smartphone app) information that allows the prospective buyer of a soft drink product to be informed regarding the source/origin of water used in producing such product—e.g., showing the statistical likelihood that 'sustainable sources of water' are employed in the production of the product as offered for sale at a particular store. In this example, insofar as such 'sustainably-sourced water' may be an attribute measured or otherwise determined by a third-party entity, such as the Aqueduct Alliance, data supporting such attribute is an example of data that may be stored, and accessed from, outside an SCR database, for instance as shown in FIG. 19, from an enterprise data system 1902 or a global data synchronization network 1904.

The problem of acquiring, relating and providing (e.g., to customers and/or regulators) such information for uncovered objects—that is, information encompassing an uncovered object's existence from original supplier to final customer (or a subset of such information)—may be solved via embodiments of SCR by enabling continuous identification of such objects with a DocString identifier in conjunction with other capabilities of an embodiment, as herein described. As a further example, for instance, a diesel fuel customer in a particular country may be required by regulation (or otherwise) to ensure that its particular diesel fuel purchases meet a test that proscribes purchase of such fuel in circumstances where the fuel has been derived from crude oil sources originating in any country that is included in a list of sanctioned countries, as such list may be maintained by, say, the United Nations or another body. Given the complexity of supply chains (wherein such chains are an example of sequential chains) through which crude oil—as an instance of an uncovered object type, as herein used—often moves and is transformed into marketable petroleum products, existing systems may not be able to ensure continuous identification of such object and of the products derived from such object, particularly when such object undergoes changes of form such as via physical or chemical processes that may occur in a petroleum refinery. Thus, in the exemplary instance of a purchaser of diesel fuel, such purchaser can be enabled to comply with the exemplary instance of regulation (e.g., concerning diesel fuel being sourced from non-sanctioned crude oil producing countries) by use of an embodiment of SCR, whereas such compliance may not otherwise be achievable by other systems. Many other real-world examples exist, whereby mandatory and/or voluntary regulation proscribe particular uses of particular object types with particular attributes, for instance: the U.S. Defense Authorization Act 2007, which treats with rare earth minerals used in United States defense procurement operations; the U.S. Dodd-Frank Act 2010, which treats with particular resources sourced from the Democratic Republic of Congo; the Roundtable on Sustainable Palm Oil, or RSPO, which deals with sustainably-sourced palm oil; the Kimberly Process, dealing with 'transparent' (non-'blood') diamonds; and the Extractive Industries Transparency Initiative, or EITI, which seeks to disclose measures of fiscal transparency concerning financial payments by companies, and receipts by government bodies, relating to oil, gas and non-hydrocarbon minerals. In all these noted exemplary instances and in others, the available information required (via mandatory regulation, such as Dodd-Frank) or suggested (via voluntary regulation, such as via RSPO and EITI) may either provided in the first instance (or significantly enhanced) through use of embodiments of SCR systems and methods.

A plurality of other exemplary instances may be described, whereby a consumer of uncovered objects—at any point in a sequential chain—may wish, need, or be required, to know particular information pertaining to objects either being purchased by, or sold to, that consumer. For instance, a buyer of crude oil may be required to verify all channels (e.g., SC components) through which the crude oil has been handled, including, for instance, verification of: the nationality of any or all of the SCC host entities that host each SC component through which the crude oil has transited; the identities of parties handling the crude oil throughout the sequential chain; whether or not the crude oil was produced in a country that is a member of a particular transparency organization; and other facts and circumstances. In such respect, for instance, embodiments of the SCR system and method may facilitate for enterprises and others their compliance with international (or other) sanctions regimes that may be promulgated to control the global flows of particular forms of sanctioned natural resources, such as crude oil originating from a sanctioned country or refined products formed from such sanctioned natural resources. By way of further example but not limitation, the SCR system and method may be used to assist U.S. SEC-listed enterprises in complying with particular provisions of the Dodd-Frank Act with respect to not dealing with, or acting as, suppliers of natural resources originating in a particular country. The SCR system and method, further, can assist such enterprises in such form of compliance in the event that compliance is extended to include not only proscribed natural resources from proscribed countries (e.g., proscribed via the U.S. Defense Authorization Act 2007) but also intermediate and final products created from such proscribed natural resources, wherein such resources may be in the form of uncovered objects as herein described. As one skilled in the art may appreciate, many other examples exist, for instance, with respect to mandatory regulations pertaining to money laundering.

Insofar as crude oil may be considered an example of uncovered objects, as herein described, an embodiment's use of the DocString identifier enables the continuous identification of an object such as a large lot quantity of crude oil, thereby, further enabling a diesel fuel purchaser in this exemplary instance to obtain particular information such as may be required pursuant to regulation (or otherwise). A benefit of the SCR system and method, therefore, is the enabling of acquisition, relation, manipulation, storage, and dissemination of such information pertaining to uncovered objects, where otherwise, such uncovered objects may not be amenable to tracking and tracing via other systems, thereby preventing the capacity to capture and retain particular classes or types of desired information in the first place Example User Interface For purposes of convenience, data accuracy, and other reasons, an embodiment of the SCR system and method may employ one or a plurality of data entry forms, whereby users may enter data into such forms and thereby enable an SCR database to receive particular data. In embodiments, it is also noted that forms, tables, queries and reports may be received into the SCR database first as templates, that is, as blank formats created by a system designer or another for later use by SCR system users. Such templates for forms, tables, queries and reports may be received by the SCR database and stored therein as data objects and may be modified from time to time.

FIG. 15 is an embodiment of a data entry form 1500 that can be suitable for the enabling of an SCR database to receive data, which may be entered into such exemplary form and, thereby, declared by an SCR system user and, thus, received by a database. In this exemplary instance, data form 1500 pertains to a database entity class for the entity named 'SC component,' that is, for a building block of a sequential chain (in the instance portrayed in FIG. 15, a particular form of SC component, viz., a SCC comprising a segment of a 'PSC' or proprietary sequential chain). For clarity, it is noted that such entity (that is, the entity SC component) previously will have been established as a data object in the SCR database, pursuant to the procedure described earlier. As will be apparent to an artisan of ordinary skill, other data entry forms may similarly be created and stored as data objects in an SCR database for a plurality of other database entities that similarly have been previously established. For example but not limitation, such entities and their corresponding data entry forms may be created and stored in an SCR database for the entity classes of: objects that exist and move in sequential chains; sequential chains; SC components, which comprise sequential chains; SC component host entities that host SC components; and other database entities.

A data form, such as example form 1500 shown in FIG. 15, enables an SCR database to receive particular data pertaining to a particular sequential chain and to particular SC components. For instance, a user may wish to cause an SCR database to receive and store data pertaining to a uniquely identified sequential chain, such as the one described in FIG. 14, comprised of (n)-count of uniquely identified SC components. Exemplary data entry form 1500, as it may be received by and stored in an SCR database, may be used to enable the digital formation and storage (also in an SCR database) of data pertaining to such a sequential chain, comprised of a plurality of SC components, whereby each such SC component may have a plurality of data attributes and corresponding data values that describe it. For instance, exemplary data entry form 1500 includes a plurality of data attributes and corresponding data values to identify and describe a particular SC component, such as the SC component of FIG. 14, which is one SC component comprising the exemplary sequential chain. Similarly, data form 1500 may be employed to enable an SCR database to receive data pertaining to a plurality of or all the SC components that comprise a particular sequential chain, thereby enabling relation, or association, amongst the SC components comprising a particular sequential chain.

An SCR database may receive data via data entry forms, such as exemplary form 1500 depicted in FIG. 15, for forming and describing a particular sequential chain and the SC components comprising the particular sequential chain by one of a plurality of methods, depending on the needs and requirements of a particular application environment. For instance, in one method of operation, an SCR database may receive data via data forms, such as form 1500, over a time period corresponding to the movement of an object through a sequential chain. As used herein, such method of operation is referred to as a continuous-formation method or mode.

In embodiments, whereby an SCR system and method is operated in continuous-formation method, an SCR database may receive data describing a sequential chain 800 and a plurality of SC components 802, 804, 806, 808, 810 (FIG. 14) from one or a plurality of system users over a period of time rather than at a single time. For example but not limitation, a particular sequential chain's set of all SC components may not be fully known in advance at the time an object enters the first SC component comprising the sequential chain. In such instance, an SCR database may receive data via data entry forms, such as form 1500, at a plurality of discrete times, for example, at the times at which an object enters or exits each discrete SC component. For example, at the time when a lot quantity of crude oil exists in an SC component named 'field storage tanks,' subsequent (or downstream) SC components, such as a particular oil tanker or a particular refinery that may later host the same object (or the same object as it may be subsequently modified), may not yet be known. Data for such downstream SC components may be received by an SCR database via suitable data entry forms at later times than when the first SC component data is received by the SCR database. Such is an example of a continuous-formation method of SCR.

In other embodiments, another method of operation is referred to herein as front-end-formation mode. An SCR system functioning in the front-end-formation mode is one whereby an SCR database may receive data pertaining to sequential chains and their constituent SC components all at one time or, alternatively, at only a few particular times, as contrasted with the continuous formation-method of operation described above. The front-end-formation method of operation may be more convenient for application by system users in instances where a particular, complete sequential chain may be known in advance of objects entering into such chain and also wherein such chain may be expected to remain invariant over a longer time period, as to its constituent SC components comprising the sequential chain. In such instances, users may find it convenient to enable an SCR database to receive data pertaining to a sequential chain and its constituent SC components, via data entry forms or otherwise, in advance of a period of time during which such sequential chain is expected to remain invariant for a particular time period.

By way of example, but not limitation, of the front-end-formation method of operation, data for a particular sequential chain may be received by, and stored in, an SCR database for SC components including, for instance, a particular producing oil field comprised of a plurality of oil wells, particular oil gathering lines, a particular field transit pipeline, and particular oil storage tanks at a particular harbor. In such circumstances, an SCR system user may observe that all such SC components are fixed assets and are unexpected to change for, say, several years or to be substituted by other such SC components (although, ex post facto, they may be so substituted in which event the SCR system and method, nonetheless, accommodates such initially unplanned change). In such example, the front-end-formation method of SCR system operation may be more suitable than the continuous formation method of operation. For clarity, however, it is also noted that the front-end-formation method of operation still allows for the SCR database to receive new or updated data pertaining to particular data attributes and data values relating to a plurality of SC components for which data attributes and data values earlier may have been received by the SCR database. For example, the SCR database may receive a new data value corresponding to a particular data attribute for a previously declared SC component, whilst that SC component itself is not substituted with a different SC component.

As will be apparent to an artisan of ordinary skill, other methods of operation, in addition to the two just described, may also be employed. For instance, an SCR database might receive data pertaining to sequential chains and SC components in a multiple-batch mode, whereby such data may be received via data entry forms, such as form 1500 in FIG. 15 or otherwise, in more than a single batch as for the front-end-method but in fewer batches than in the continuous-formation method.

Regardless of the method of operation by which an SCR database may receive data pertaining to sequential chains and SC components, data pertaining to objects hosted by sequential chains and by sequential chains' SC components, as well as data pertaining to SC component host entity attributes, may be received by the SCR database as frequently as circumstances warrant. For instance, when a particular lot quantity of liquefied natural gas, or LNG, is re-gasified at a re-gasification facility after being discharged in liquid form from a cryogenic LNG tanker, an SCR database may receive new data attributes and data values pertaining to the object because the object will have been modified in form from liquid to gas state. In a similar manner, data attributes and data values may change for a SC component host entity even though the SC component itself may remain invariant over time. For example, an SCR database may contain data describing a particular SC component as 'company owned,' and may later receive data updating such ownership attribute to indicate that the same SC component has changed to a 'leased' status of ownership—even though the SC component itself physically has not changed in this example.

Exemplary data attributes and some of their corresponding exemplary data values are shown in FIG. 15 for the exemplary data entry form 1500, including, for instance, attributes and values for: the unique identity number 1502 that identifies an exemplary sequential chain (such as sequential chain 800 shown in FIG. 14), shown as ID number '1' in FIG. 15, whereby the particular, identified sequential chain hosts a plurality of SC components; the name of the exemplary sequential chain 1504, shown as 'Name-PSC-100;' the unique identity number for the enterprise 1506 that owns or controls the sequential chain; the unique identity number for the particular SC component 1508 contained in the identified sequential chain 1502; the SC component type 1510, by which is meant either a process activity (PA), as shown in the exemplary data form, or a change of control action (CCA), as these two terms are herein earlier described; a component rank 1512, by which in this example is meant the serial rank order in which a SC component exists in a sequential chain, starting with rank order 1 and ending in rank order (n), as depicted in the model shown for a sequential chain 800 in FIG. 14; the name of the SC component 1514, for instance 'oil field;' a description of the SC component 1516, for instance, 'producing wells X, Y, Z'; the name of the mixed sequential chain (MSC) 1518, if any (which term, MSC, is defined and described later below), which MSC contains the particular sequential chain 1502, 1504 in which the SC component 1508 is further contained; the type of SC component host entity 1520 that hosts the SC component, for instance, the type 'country;' the name of the SC component host entity 1522, for instance, 'U. K.' as the particular instance of the host type 1520, 'country;' and an MSC segment flag 1524, which is also herein below further described and illustrated with FIG. 16. An artisan of ordinary skill will observe that the exemplary data entry form 1500, absent data values, represents a construct for listing one or more data attributes (for instance, 'Type of Host' 1520) pertaining to a database entity (for instance, to 'PSC' representing the construct of a proprietary sequential chain) and that such data entry form also contains blank data entry fields whereby a database may receive particular data values related to particular data attributes (for instance, 'Country' 1520 as the particular exemplary data value for the particular data attribute 'Type of Host'). Thus, in this example, 'Type of Host' may be a data attribute, and 'Country' may be a data value for such data attribute. The capability, within an embodiment of an SCR system and method, to allow for hierarchical data is shown in data form 1500, for instance, in the hierarchical data arrangement whereby 'U.K' is shown as a data value for the data attribute, 'Name of Host' 1522 and, in turn, whereby 'U.K.' is an instance of 'Country' where 'Country' is a data value for 'Type of Host' 1520 as one type of data attribute 'Type of Host.' Such capacity for handling tiered or hierarchical data is typical in extant relational database systems.

A particular data entry form—such as the exemplary form 1500 shown in FIG. 15 for use in enabling an SCR database to receive data pertaining to a SC component 802 comprising a segment of a sequential chain 800, as these are shown in FIG. 14—may be created by a system designer or another for use by system users for all instances of all database entity classes. Thus, for instance, data entry forms also may be created by a system designer or another and received by and stored in an SCR database for a plurality of other database entities, including for the entities of: objects, which exist and move within sequential chains, and for the host entities that host SC components.

Referenced in FIG. 15 are several exemplary data attributes pertaining to declaration of data by user input, and receipt of data by an SCR database, relating to formation of uniquely identified sequential chains. An identifier 1502 is specified to give unique identity to a particular sequential chain, in this example to a proprietary sequential chain, or PSC. A name of the PSC 1504 may also be specified, as may the unique identifier of the enterprise 1506 having a particular jurisdiction for, or interest in, the sequential chain. Among the plurality of data attributes shown in data form 1500 is a field 1524 for designating whether a particular sequential chain - in this exemplary instance, the PSC with ID of '1' —is associated with, and a part of, a mixed sequential chain and, if so, the name of the MSC 1518 in which the PSC is a constituent part. Further descriptions of the manner in which data is received by an SCR database are provided elsewhere herein.

The form of identifier employed in a particular embodiment of the SCR system and method to assign a particular, unique identity to a particular data object in an SCR database may be one of a plurality of object unique identifier systems. For instance, the GS1 organization's form of object unique identifier known as the Global Individual Asset Identifier, or GIAI, may be used in a particular SCR embodiment to give unique identity to particular sequential chains, corresponding to data entry field 1502 in FIG. 15. Alternatively, other such forms of object unique identifier may be used, for instance, a sequential numbering system. A particular form of object unique identifier, as described next, may be created within an SCR database for use with uncovered objects, as this object type is herein earlier defined.

Although example user interface and data entry forms are provided, one of skill in the art will appreciate that the user interface and data entry forms are provided for illustrative purposes. Other types of data forms and user interfaces may be employed with the embodiments disclosed herein.

Creating a Unique Identifier

Figure 16:
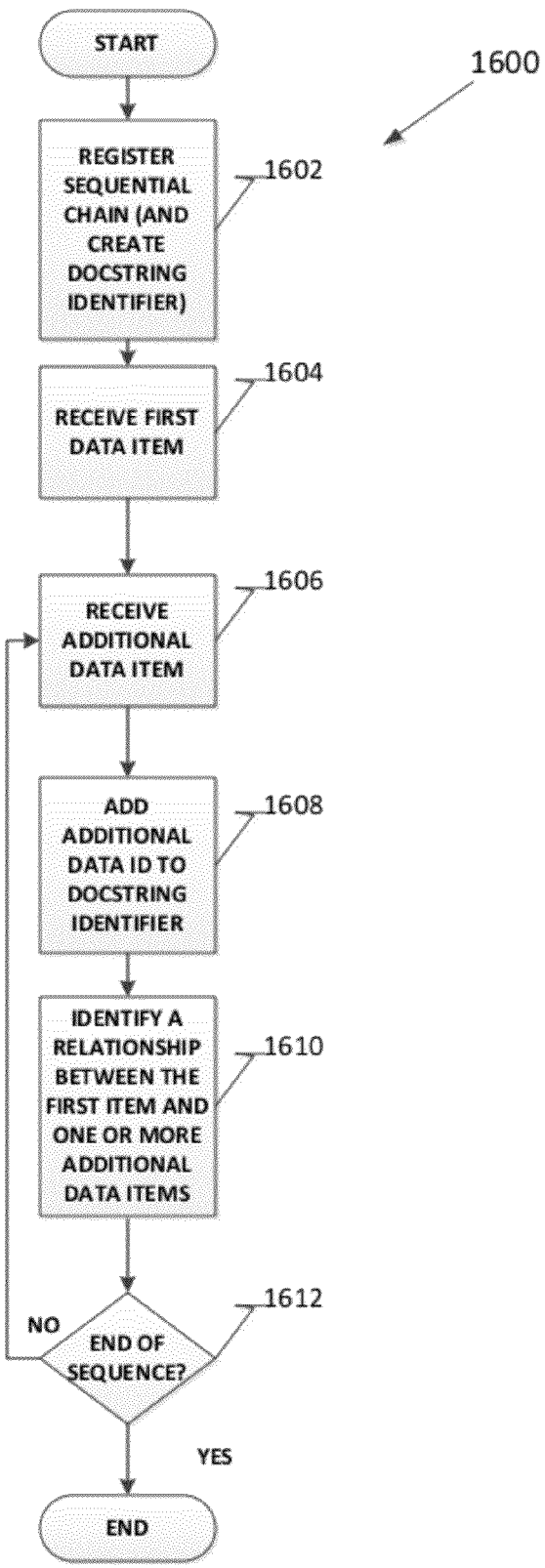
FIG. 16 is a flow chart illustrating an example embodiment of a method to create a DocString identifier.

FIG. 16 is a flow chart illustrating an example embodiment of a method 1600 to create a DocString identifier. The method 1600 may be employed to create a DocString identifier, as previously described with respect to FIGS. 12-15. In embodiments, the method 1600 may be performed by a database or a general computing device. Flow begins with operation 1602 where a sequential chain is registered. Registering a sequential chain associates the sequential chain with a unique identifier that may be used to relate an object with data as it traverses a sequential chain. In embodiments, the DocString identifier is created upon registering the sequential chain. In such embodiments, the DocString identifier is the unique identifier created upon registering the sequential chain. In other embodiments, the DocString identifier may be a modification of a unique identifier created upon registration. For example, the DocString identifier may be created by modifying the unique identifier using an operation such as a hash and/or by combining the unique identifier with other data. One of skill in the art will appreciate that any manner of creating a unique identifier may be employed at operation 1602.

Flow proceeds to operation 1604, by which the database receives a first data item. For example, the database may receive the initial object definition from a user of the database, a user using a different computer device connected to the database over a network, or by another system, application, or process in communication with the database. In embodiments, the first data item may be received from a first user at a first location. In one embodiment, a user interface such as the example user interface provided in FIG. 15, may be used to gather and then send data defining the first data item that the database receives at operation 1604. In embodiments, the first data item may be a data object containing information about an object, such as, an object passing through a sequential chain, such as, for example, oil passing through an oil supply chain. In embodiments, the first data item may contain any type of data related to the data object.

In embodiments, the first data item may be associated with a unique ID. In one embodiment, the unique ID may be received at operation 1604 along with the data item. In another embodiment, the database or general computing device performing the method 1600 may create a unique ID for the first data item upon receiving it. For instance, and referring to FIG. 12, such first data item may pertain to a trade document, TD-1 1210, as such document pertains to an object 508, such as a lot quantity of crude oil as the object exists in SC component 1202. Such data item, as it pertains to a particular trade document, may, for instance, pertain to a document such as a trade invoice, a customs document, an assay document or other form of business or other document that, regardless of its particular documentary purpose, has the capability to effect specific linkage of the object of interest to the SC component in which the object may exist at a time or in a time interval and, further, to effect similar linkage of the object of interest to other SC components that are included with the first SC component 1202 in a common sequential chain. In other embodiments, the data may be created at operation 1604.

Flow continues to operation 1606, where an additional data item is received. In embodiments, the additional data item may be a sequential chain component, a sequential chain component host, an object, or any other type of data related to a sequential chain. In embodiments, the additional data item may be received by a second user that is different from the first. Furthermore, because the method disclosed herein is capable of tracking object information as an object traverses a sequential chain, such as, for example a supply chain, the additional data item may be received from a different location than the first data item. In embodiments, the additional data item may include its own unique ID. In another embodiment, the method 1600 may create a unique ID for the additional data item upon receiving it.

Flow continues to operation 1608, where the DocString identifier is modified using the unique ID of the additional data item. In embodiments, the DocString identifier may be modified by concatenating it with the unique ID of the additional data item. In other embodiments, the DocString identifier may be modified in another manner, such as performing a hash on the DocString identifier using the unique ID of the additional data item. In other embodiments, the data item may be stored with the DocString identifier, thereby allowing all the related documents to be pulled and analyzed when accessing the data item. One of skill in the art will appreciate that any manner of modifying the DocString identifier may be employed with the embodiments disclosed herein.

Flow then proceeds to operation 1610, where a relationship is created between the first data item and the additional data item or items. In one embodiment, the relationship is created using the DocString identifier. For example, the first data item and the additional data item may each be stored in a relational database along with the DocString identifier. The DocString identifier is used to relate the data items, for example, by acting as a primary or secondary key for each database entry corresponding to the first data item and the additional data item. In embodiments, the relation of the first data item and the additional data item or items creates a sequential chain. The relation of the first data item and the one or more additional data items allows for the tracking of an object (e.g., the first data item or an object) to be tracked as it travels a sequential chain, represented by the additional data items (e.g., sequential chain components, sequential chain component hosts, etc.)

Flow continues to decision operation 1612. At operation 1612 a determination is made as to whether the sequence has completed. For example, the method 1600 may receive an indication that the sequence is complete. One of skill in the art will appreciate that any matter of determining that a sequence has completed may be employed with the embodiments disclosed herein. If the sequence is complete, flow branches YES and terminates, resulting in a completed sequential chain for the object. If the sequence is not complete, flow branches NO and returns to operation 1606 where additional data items are received and the DocString identifier is again modified, thereby continuing construction of the sequential chain.

In embodiments, the method 1600 may be employed using a front-end-formation mode of data entry, a continuous-formation mode of data entry, a combination of both or another mode of data entry. One of skill in the art will appreciate that the first data item and the one or more additional data items may be received at the same time or at later times.

Figure 17:
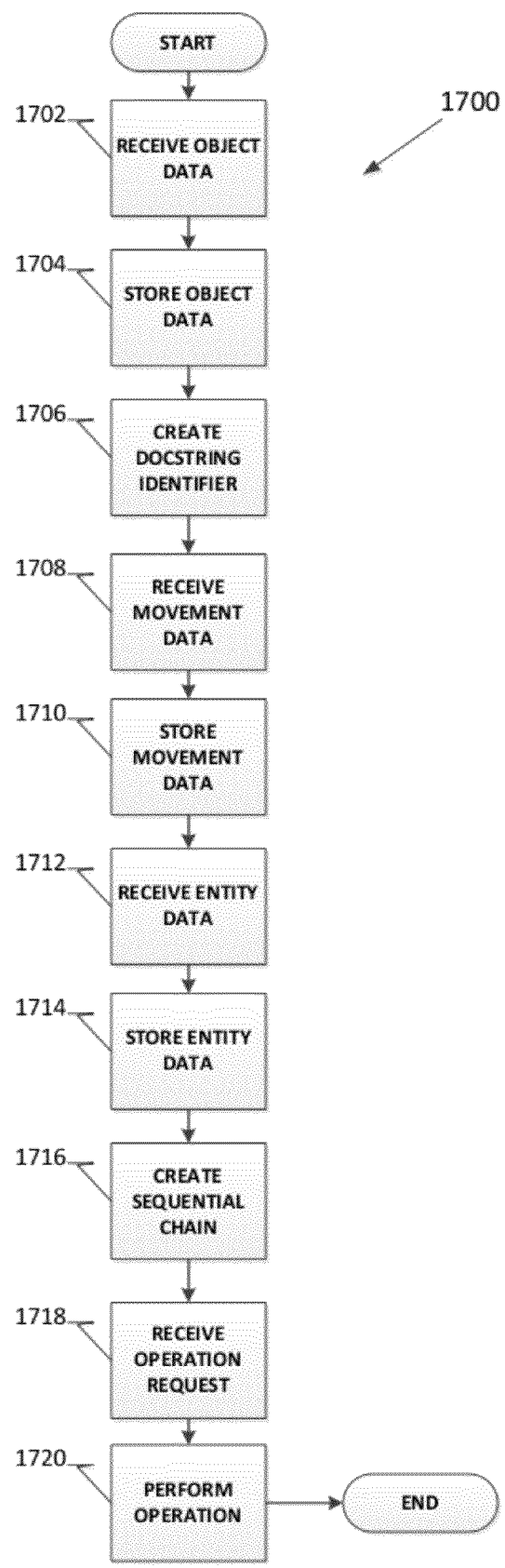
FIG. 17 is a flow chart illustrating an embodiment of a method for constructing and operating on a sequential chain.

Referring now to FIG. 17, which is a flow chart illustrating an embodiment of a method 1700 for adding data to a sequential chain. The method 1700 may be employed to form data entities and data relationships. In embodiments, the method 1700 may be performed using a database, such as SCR database 220 or a general computing device. Flow begins with operation 1702, where object data is received. In embodiments, object data may be data regarding a covered object, an uncovered object, or any other data related to any type of object, including tangible and intangible objects, capable of traversing a sequential chain. Flow continues to operation 1704, where the object data is stored. In embodiments, the object data may be stored as an object. In other embodiments, the object data may be stored in a relational database as a table entry. One of skill in the art will appreciate that any manner of storing the object data may be employed with embodiments disclosed herein.

Flow continues to operation 1706, where the method 1700 creates a DocString identifier. The DocString identifier may be created and modified as described with respect to FIG. 16. In embodiments, the DocString identifier is used to identify and relate data received while performing method 1700. Flow continues to operation 1708, where movement data is received. In embodiments, movement data may relate to the object as it moves through time in a sequential chain. In other embodiments, movement data may correspond to actual movement of the object, a change in the object, or any other type of data indicating that the object has progressed through a sequential chain. Flow continues to operation 1710, where the movement data is stored. In one embodiment, the movement data may be stored as a sequential chain component. In other embodiments, the movement data may be stored in a relational database as a table entry. One of skill in the art will appreciate that any manner of storing the object data may be employed with embodiments disclosed herein.

Flow continues to operation 1712, where entity data is received. In embodiments, entity data corresponds to an entity at a particular point in time or a particular time interval. For example, the entity may relate to the location of the object at the particular point of time. Non-limiting examples of entities include countries, companies, pipelines, vessels, containers, or even non-tangible processes. In embodiments, although not shown, the entity data may be related to the movement data upon its receipt. Flow proceeds to operation 1714, where the entity data is stored. In one embodiment, the entity data may be stored as a sequential chain component host. In other embodiments, the entity data may be stored in a relational database as a table entry. One of skill in the art will appreciate that any manner of storing the object data may be employed with embodiments disclosed herein.

Flow continues to operation 1716, where a sequential chain is created. In embodiments, the sequential chain is the relation between the object data, movement data, and entity data. In such embodiments, the creation of the sequential chain includes creating a unique identifier for the sequential chain that is used to relate all information that is a part of the sequential chain. Although the sequential chain is described as being created in operation 1716, this step may be performed at the beginning of method 1700 or at any other point. In embodiments, the object data, movement data, and entity data may be related using the DocString identifier. In embodiments, the sequential chain may be stored as a sequential chain object previously discussed. Although construction of the sequential chain object is showed at operation 1716, one of skill in the art will appreciate that the sequential chain may be constructed at any time during method 1700. For example, the sequential chain may be constructed upon first receiving the object data. In such embodiments, the sequential chain will be continuously modified as other data (e.g., movement data, entity data, etc.) is received.

Flow proceeds to operation 1718, where operation data is received. In embodiments, operation data is additional data, beyond that which is received during the phase in which a sequential chain is constructed. By way of example but not limitation, operating data may include: instance class data, e.g. data that describe a plurality of particular oil wells (as entity instances) for the entity class 'oil well;' new entity class data, e.g. data that describes additional database entity classes that are not earlier received by the database, such as 'Ocean Vessels' as an entity class; search queries, which are data objects that enable the database to receive a user's specification of particular data that is to be searched within, formatted by, and returned from the database to the user; results tables, which may be created within the database from a plurality of database tables and which compile and convey desired information to a user in response to the user or another first specifying the content and format of such tables; results reports, which also may be created within the database from a plurality of database tables and which compile and convey desired information to a user in response to the user or another first specifying the content and format of such reports; and other forms of data objects.

Operating data, such as that just described, are formed into appropriate data objects in the same manner as also earlier described for forming data entities and entity relationships. That is, appropriate data entry forms may be employed to enable an SCR database to receive data from a system user or another. By use of such data entry forms, which forms themselves are stored as data objects in the SCR database, desired source data may be received by and returned from the database.

In addition to the particular operations for enabling an SCR database to receive operating data, there may be other nature of database operations that relate to data protection, data verification, computer system maintenance, software updates and upgrades, system security, and a plurality of other conventional or other operations relevant to effective, efficient, safe operation of the platforms on which an SCR system and method operates. Further, there is a plurality of methods and means by which the method 1700 may inter-operate with existing enterprise data systems and existing global data synchronization networks. The maintenance and general operation of such existing, external systems is not herein described.

Flow continues to operation 1720, where the operation indicated by the operation data is performed. Although the method 1700 has been described as discreet steps performed in a particular order, one of skill in the art will appreciate that the order of the steps may be changed. Furthermore, while the method 1700 described receiving one instance of object data, movement data, and entity data, one of skill in the art will appreciate that any number of instances of such data may be received. For example, in a blend or split platform object data may change (e.g., new objects may be created). In other embodiments, multiple instances of movement data and entity data may be received by the method 1700. One of skill in the art will appreciate that the method 1700 may be employed to create the entities and relationships described herein such as, but not limited to, the entities and relationships described with respect to FIGS. 2-11. Accordingly, the method 1700 may operate upon any of the data, entities, and relationships described herein. Furthermore, one of skill in the art will appreciate that the method 1700 is extendable such that it may operate upon different sets of data not described in the present disclosure.

Example SCR Systems

Figure 18:
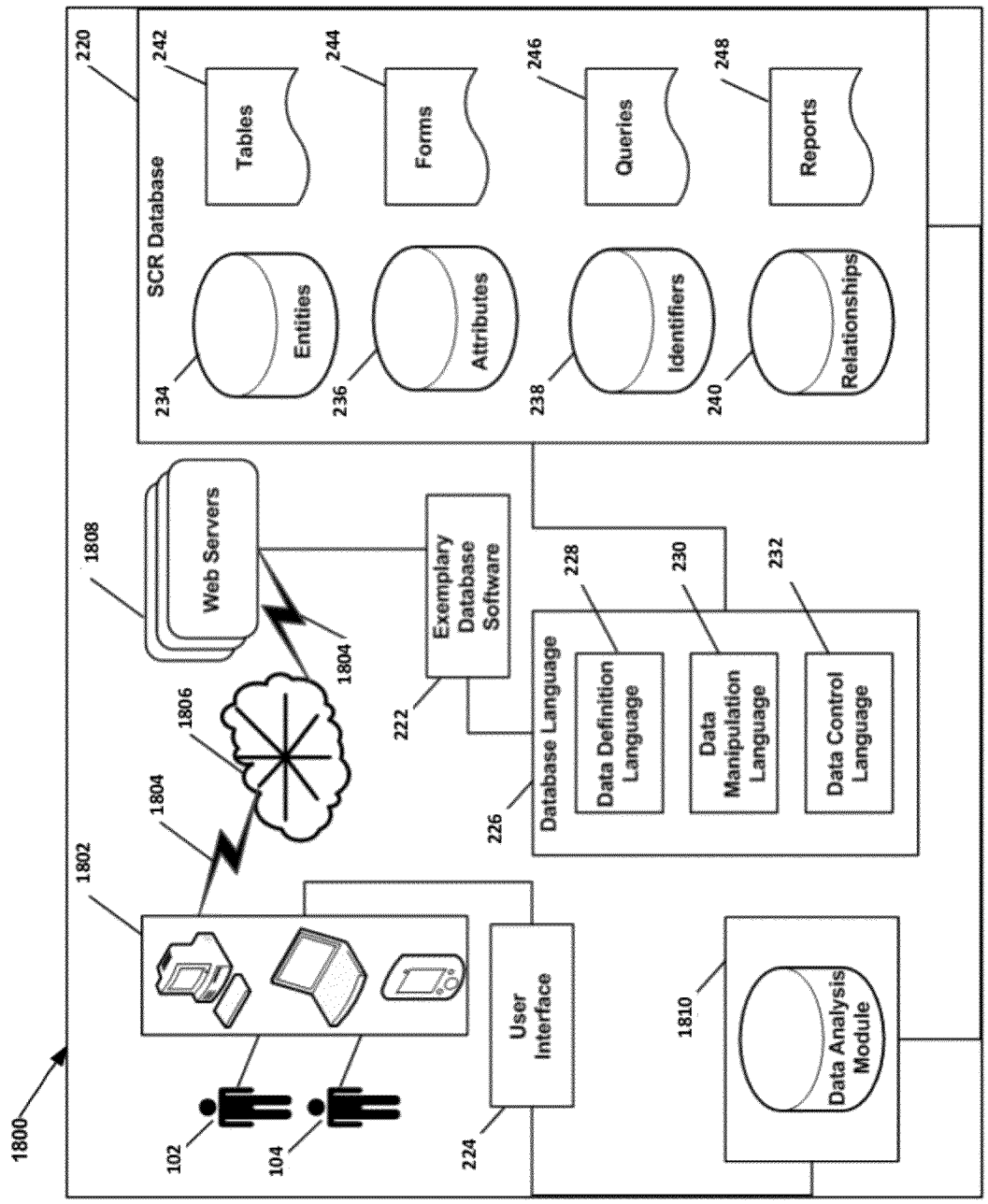
FIG. 18 is a block diagram illustrating components of an example embodiment of an SCR system.

FIG. 18 is a block diagram illustrating components of an example embodiment of an SCR system 1800, including illustration of the manner in which data is received by an SCR database 220 and may be returned to users 102, 104 following manipulation of data so received. An embodiment of SCR system and method 1800 may include, inter alia: i) a network communications system that facilitates data and other communication between a system facilitator 102 and a plurality of other users 104 with an SCR database 220 via exemplary database software 222; and ii) a data analysis module 1810. System users 102, 104 and including a system designer (collectively referred to herein, as users) may use an appropriate remote device 1802, such as a desktop or laptop computer, a telephone or smartphone, PDA or other suitable electronic device, to access the exemplary database software 222 and SCR database 220 through a network 1806, such as the world wide web or an intranet, via a communications link 1804. In embodiments of SCR 1800, the exemplary database software 222 and SCR database 220 may be accessed by users via a suitable user interface 224, which may also enable access to a data analysis module 1810.

SCR system 1800 includes a database software platform 222, executing on one or more computers, for example web or application servers, that are in communication with SCR database 220, which database also executes on one or more computers. Software platform 222 may include a form of database language 226. Database language 226 may include: a data definition language 228, or DDL; a data manipulation language 230, or DML; and a data control language 232, or DCL.

DDL 228 is a part of a database language 226 used by a system designer or another to: create a particular database and structural components of the database; modify the structure of an existing database; and destroy a database after it is no longer needed. DDL 228 is employed to create structural elements, including, for instance, data schemas, data tables, and data views. DML 230 is a part of a database language 226 used by a system designer or another to operate on data that inhabits a data structure created via the DDL 228, including operations to: store data in a structured way that makes data easily retrievable; change stored data; selectively retrieve information that responds to a user's needs; remove data from a database when such data are no longer needed; and perform other such data management operations.

DCL 232 is a part of a database language 226 used by a system designer or another to: provide protection of, and security for, stored data from misuse, misappropriation, corruption, and destruction; grant, manage, and revoke access privileges to users for accessing a database system or particular segments of a database system; provide other control functions such as preserving database integrity for particular data transactions and providing backup in event of system failures; and perform other such data management operations. Insofar as the SCR system and method may be implemented using a database software system and database language suitable to a particular application environment for a particular SCR embodiment, the particular commands and instructions for effecting such implementation are specific to the particular database software system and, therefore, are not herein described.

An embodiment of SCR database 220, therefore, may receive a plurality of data: as may be declared by users via a communications network 1802, 1804, 1806, 1808 and, in particular instances, via the aid of a user interface 224; and as defined, manipulated and controlled via database software 222 and database language 226. SCR database 220 may store such data as particular classes of data and as particular instances of data within a particular class. Data in SCR database 220 may be further organized into entities 234, attributes 236, unique identifiers 238 and entity relationships 240. As also illustrated in FIG. 18, SCR database 220 may include tables 242, forms 244, queries 246, and reports 248.

Although not illustrated in FIG. 18, one of skill in the art will appreciate that the systems disclosed herein may exist in a cloud computing network. For example, the SCR database 220 may exist on a number of distributed data stores and/or servers, such as Web Servers 1808 that are located in a number of different locations. The various types of data and SCR components disclosed herein may be stored across the distributed data stores and or servers that make up a cloud networked SCR database. Client devices, such as devices 1802, can access the various devices that make up the cloud via a network, such as network 1806. One of skill in the art will appreciate that network 1806 may be the Internet, a WAN, a LAN, or any other type of network known to the art.

FIG. 19 is a block diagram illustrating an exemplary embodiment of an SCR application 1800 in an environment wherein SCR database 220 may receive data from either of, or both, an enterprise data system and a global data synchronization network. For instance, an embodiment of SCR may be used in an environment in which particular data regarding objects existing in sequential chains may already exist in existing enterprise data systems 1902 such as accounting systems, inventory management systems or any ERP system, such as those provided by SAP AG, IBM® or Oracle® Corporation. Similarly, an embodiment of SCR may be used in an environment in which particular data regarding objects existing in sequential chains may already exist in one or a plurality of global data synchronization networks 1904, or GDSN, such as the GDSN® that is interoperated with the GS1 Global Registry.

In such an application environment, wherein SCR system and method 1800 may be interoperated with either or both an enterprise system 1902 and a GDSN 1904—referred to herein, collectively, as external data networks—SCR database 220 may receive data via a network 1802, 1804, 1806, 1808 and database software 222, as described above, but whereby data stored in such external networks is first manipulated via a suitable user interface 224, for instance, via an interface that may enable data extraction, transformation, and load (also, herein referred to as ETL) operations. Integration of data supplied by external data networks 1902, 1904 and received by SCR database 220 may execute within the same operating environment as database software platform 222, as described above. Alternatively, data integration may execute independently from database software platform 222, that is, on separate computers. In either event, such data integration enables SCR database 220 to receive data from one or more external networks 1902, 1904 in addition to receiving data from users 102, 104 communicating directly with SCR database 220, as described earlier.

Figure 20:
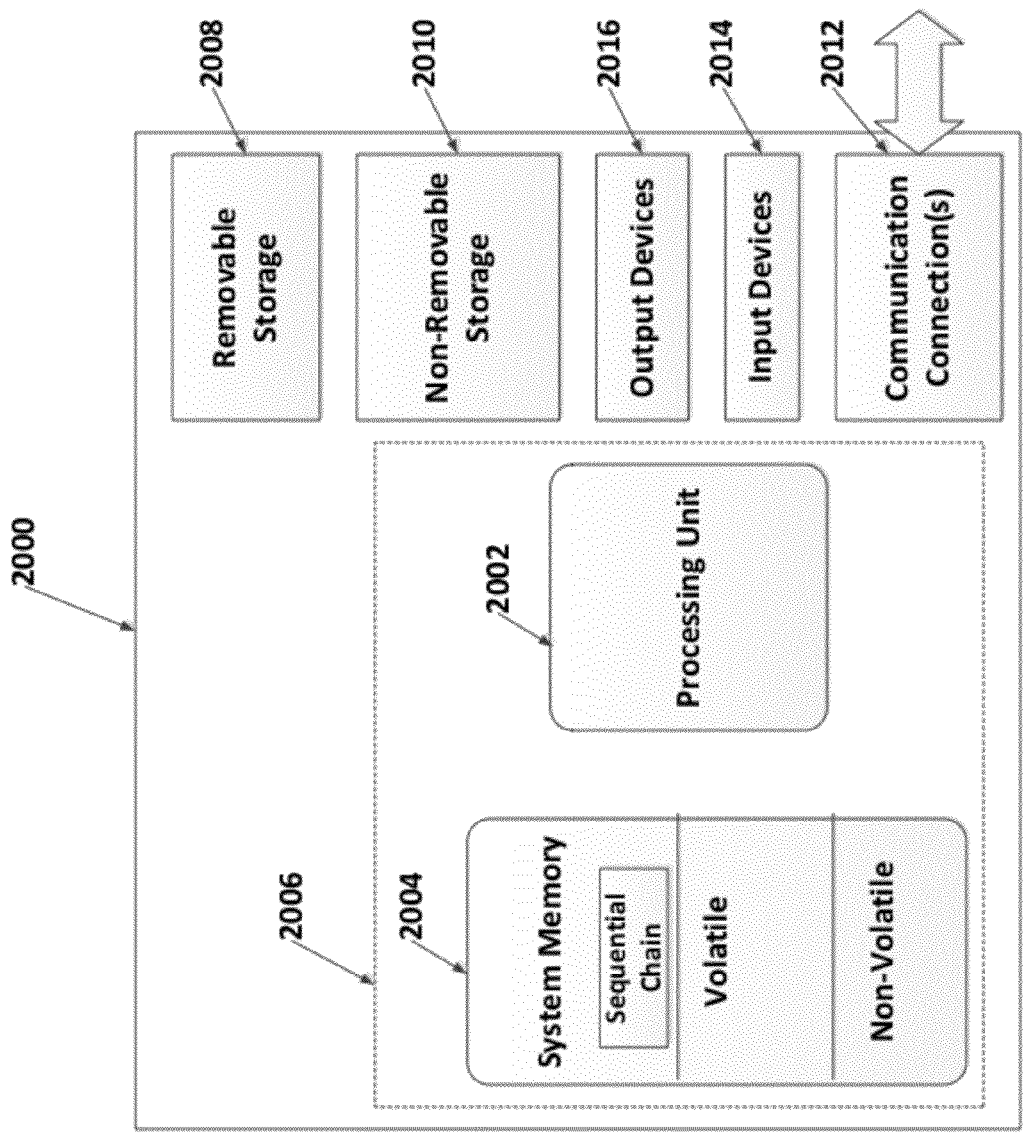
FIG. 20 illustrates one example of a suitable operating environment in which one or more of the present embodiments may be implemented.

FIG. 20 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server, including a server operating in a cloud environment. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 20 illustrates one example of a suitable operating environment 2000 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 2000 typically includes at least one processing unit 2002 and memory 2004. Depending on the exact configuration and type of computing device, memory 2004 (storing, among other things, sequential chains constructed as described herein) may be volatile (such as RAM), non-volatile (such as ROM, flash memory, etc.), or some combination of the two. This most basic configuration is illustrated in FIG. 20 by dashed line 2006. Further, environment 2000 may also include storage devices (removable, 2008, and/or non-removable, 2010) including, but not limited to, magnetic or optical disks or tape. Similarly, environment 2000 may also have input device(s) 2014 such as keyboard, mouse, pen, voice input, etc. and/or output device(s) 2016 such as a display, speakers, printer, etc. Also included in the environment may be one or more communication connections, 2012, such as LAN, WAN, point to point, etc.

Operating environment 2000 typically includes at least some form of computer readable media. Computer readable media can be any available media that can be accessed by processing unit 2002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 2000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Data Analysis Module

As described above and illustrated with FIGS. 18 and 19, an embodiment of the SCR system and method may include a data analysis module 1810. Such data analysis module, for instance, may include software with a range of data mining tools, deep statistical analysis tools and methods, parsers, etc. The following paragraphs describe exemplary data output created via data mining (or similar data analysis) tools for an exemplary embodiment of SCR in the oil and gas industry.

Figure 21:
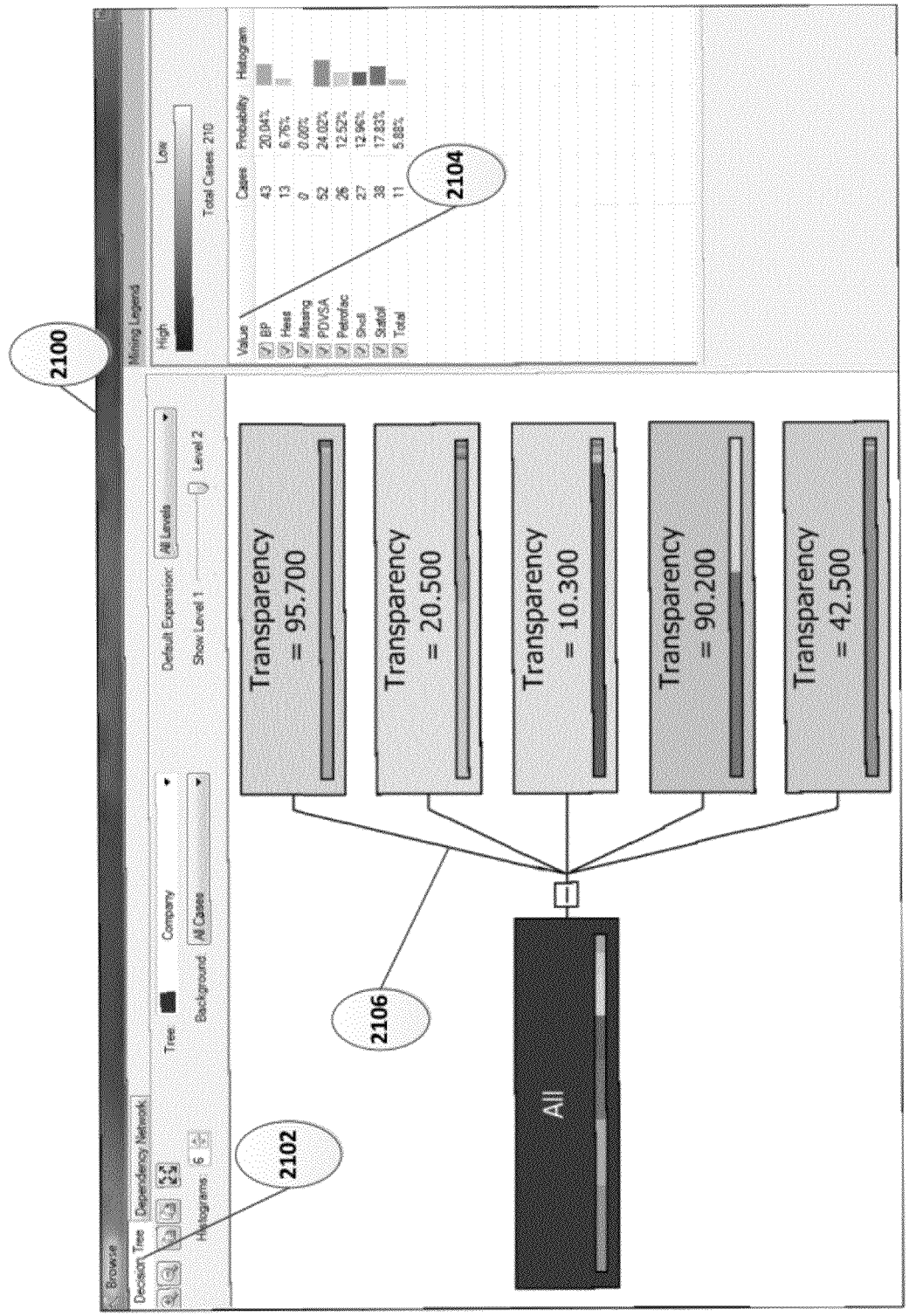
FIG. 21 is an embodiment of a user interface illustrating data output from a data analysis module, which may be included in an SCR embodiment for the oil and gas industry.

FIG. 21 is an embodiment of a user interface illustrating data output (as shown in screenshot 2100) from a data analysis module, which may be included in an SCR embodiment for the oil and gas industry. In this exemplary data output, a decision tree data mining algorithm 2102 has operated on relational data created in an SCR database. An interpretation of such data output, in this instance, may be as follows. A petroleum refiner has purchased (or is considering purchase of) a plurality of crude oil cargoes from a plurality of oil suppliers 2104. Each cargo is from a particular source country. Each country has a particular third-party rating for a country parameter (as an example of data type-4, an attribute of a SC component host entity), such as for a measure of reported fiscal transparency, which has been received by and stored in an SCR database. (A non-limiting example of such a measure is the Corruption Perceptions Index, or CPI, published periodically by Transparency International, a transparency organization.) The data mining tool, in this instance, has computed on the data pertaining to such transparency measure for the plurality of cargo instances and has returned a decision tree 2106 based on computed data histograms. Relational information such as that illustrated in FIG. 21 may provide utility to an SCR user, for example, in making relative comparisons for particular attributes associated with the source (e.g., the country in this illustration) of material inputs purchased—or which may be purchased—at a particular point in a sequential chain. Such relational information, as may be queried by a user and returned (in response to a user query) by the SCR system and method and specifically by the SCR database holding the data elements enabling formation of such relational information, may be managed within such database as follows. First, and referring to FIG. 15, such database may receive data via the nature of data input form 1500, or otherwise via other data input methods, via the data communications methods as described elsewhere herein. Second, and once such data input has been received by the database, a data analysis module 1810 as shown in FIGS. 18 and 19 may be used to perform data manipulation, e.g. statistical analyses or creation of relational data displays amongst different classes of data or information that may be of use or interest to users. Third, as shown in data object 2106 in FIG. 21, as output from such relational data analysis, classes of data may be employed in order to create relationships amongst the dynamic data that pertains to objects transiting through sequential chains (for instance, crude oil moving in large lot quantities through global petroleum supply chains) and other data that may be associated with such dynamic object, or product, data such as data pertaining to the degree of fiscal transparency reported by an independent body for the particular countries from which particular lot quantities of crude oil may be produced. The latter nature or class of data, unlike the dynamic object-related data (such as quantities of crude oil lots, as objects or products) may be, as in this instance just described, relatively more static data, for instance data that may remain fixed annually such as the Corruption Perceptions Index, or CPI, data annually disclosed by Transparency International. Thus, a benefit of the SCR system and method to users may often be its capability to provide to users and others the often more static data or information, such as attribute values pertaining to features of particular SC components or SCC host entities, and to relate or associate (via computational techniques, performed in a data analysis module 1810 in FIGS. 18 and 19) such static data to the more dynamic data pertaining to the objects, e.g., products themselves that transit sequential chains.

Figure 22:
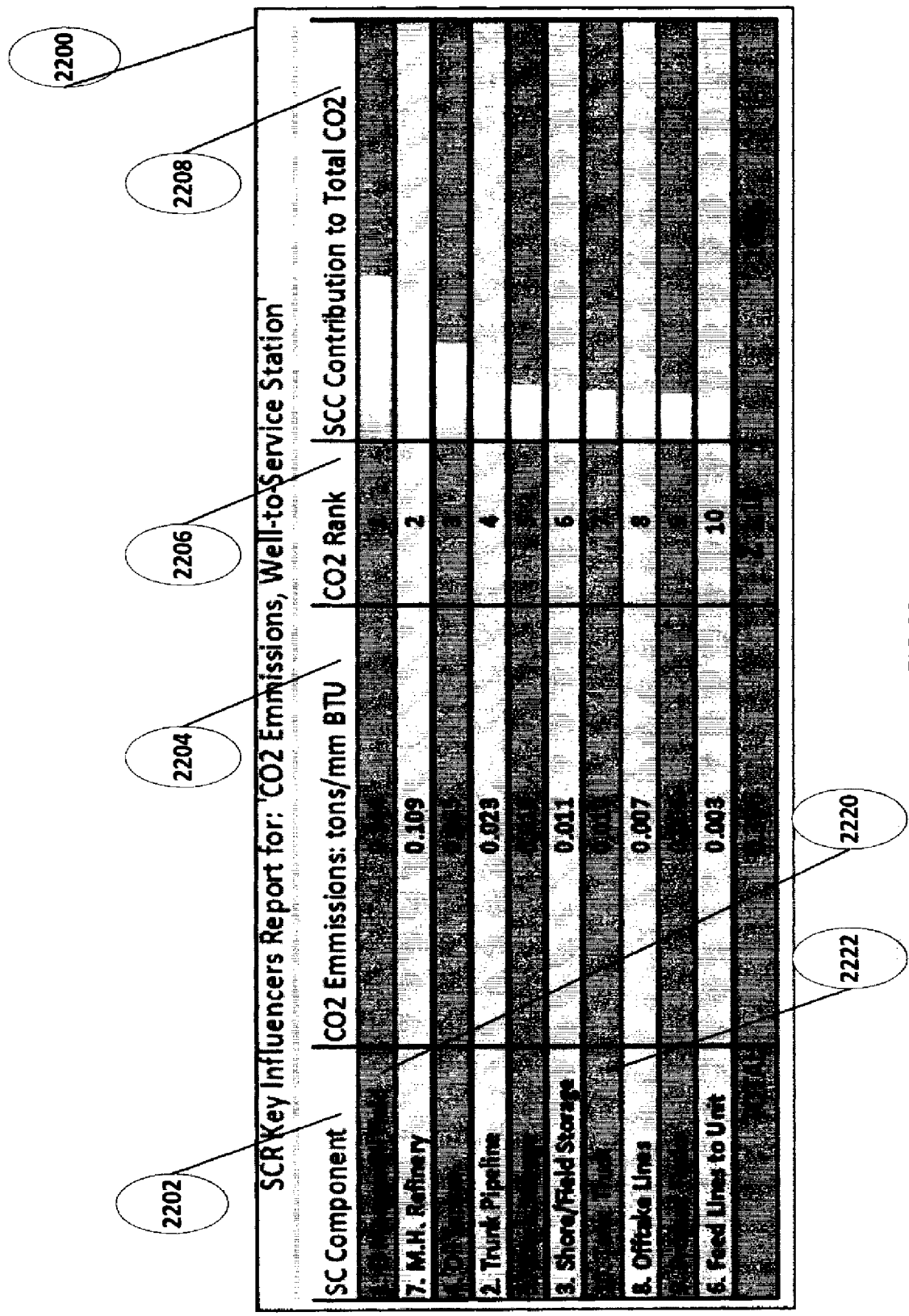
FIG. 22 is a screenshot illustrating other exemplary data output from a data analysis module, which may be included in an SCR embodiment for the oil and gas industry.
Figure 28:
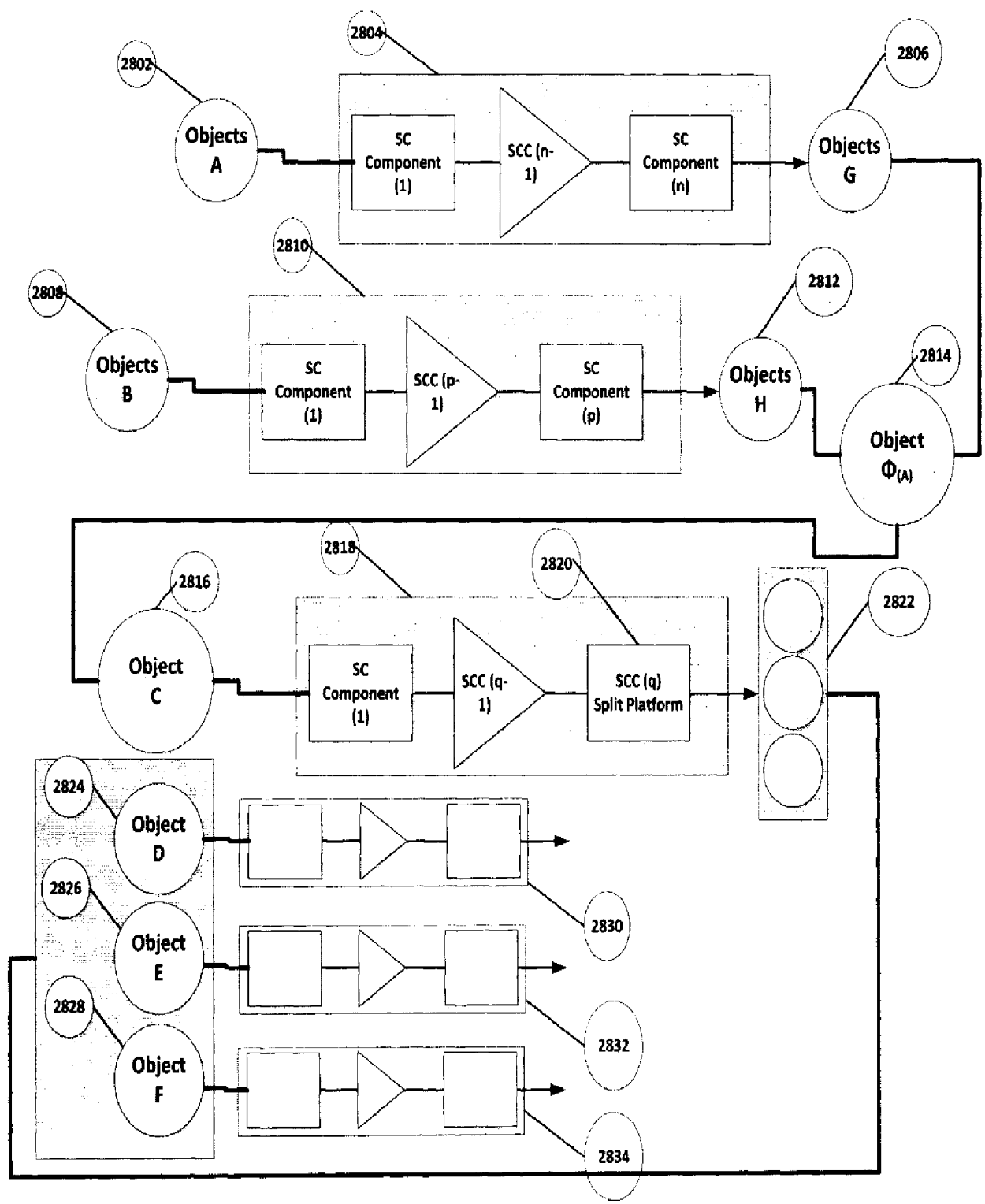

FIG. 22 is a screenshot 2200 illustrating other nature of exemplary data output from a data analysis module, shown as element 1810 in FIGS. 18 and 19, which may be included in an SCR embodiment for the oil and gas industry. In this exemplary data output, carbon dioxide (or $CO_2$) emissions are reported as tons per million British thermal units (tons $CO_2$/mm BTU) 2204 for production (from crude oil input), transport and delivery of gasoline. In embodiments, it may be observed that such data output 2200 portrays the data attribute of $CO_2$ emissions 2208 for each of ten SC components 2202—from SC component no. 2220, the El Morgan crude oil field, through SC component no. 2222, tank trucks delivering gasoline to petrol service stations. $CO_2$ emissions are also ranked 2206, in this instance, from the highest $CO_2$-emitting SC component (e.g., the oil field that produces El Morgan crude oil) to the lowest $CO_2$-emitting SC component (e.g., the feed pipelines that charge crude oil to a crude oil distillation unit). The exemplary data output also shows each SC component's relative contribution 2208 to total $CO_2$ emissions in the form of a bar chart. Relational data such as that shown in table 2200 may be of use to gasoline consumers, for instance, in comparing unit $CO_2$ emissions levels across a plurality of gasoline brands. Such data may also be of use to crude oil producers, refiners, oil tanker operators, regulators, and others, for instance, in evaluating operational performance in efforts to reduce emission levels or to meet regulatory requirements. For instance, of particular current interest to officials, oil producers and investors in the Province of Alberta, Canada is the "well-to-wheel" emissions content for various, different factors (such as $CO_2$ and sulphur) as well as the water consumption, as these are emitted or used in producing crude oil (for downstream refining of crude oil into refined products such as gasoline and diesel fuel) for crude oil derived from Alberta's vast resources of oil sands and how such data compares to comparable data attributes for other crude oil sources, e.g. for crude oil produced in Texas, Trinidad and Venezuela. While recent economic studies have been performed to illustrate such bench-scale comparisons of particular data attributes for various alternative crude oil sources, as compared to data for Alberta's oil sands resources, the SCR system and method, using a data analysis module, may enable consumers and regulators to track actual, physical quantities of crude oil through their complex supply chains, as one example of a sequential chain, and thereby gain a statistical comparison of particular data attributes at the point of consumption (e.g. at the gas pump) in connection with or in advance of purchasing a particular brand of gasoline derived from a particular type and source of crude oil. The foregoing, therefore, provides the reader an example of the SCR system and method's capability to associate static data, for example, data pertaining to a relatively stable oil refining process (as an example of a SC component), with the dynamic data that may be associated with the product (as an example of an object transiting a sequential chain) itself. Such relational data for different classes of data and for varying degrees of data transience (e.g., dynamic versus static data) may be created within an SCR system via various combinations of data input and analysis techniques, as herein described.

In an embodiment, the data analysis module 1810 as shown in FIGS. 18 and 19, may compute an 'SCR score.' An SCR score may be computed based on a set of particular publicly disclosed measures. In an exemplary instance, measures selected as components of a customizable SCR score are three different metrics pertaining to sustainability: i) a measure of EITI membership, reflecting a weighted average (with 'yes' as 100 percent and 'no' as zero percent) of all the countries' EITI membership condition for the countries comprising Enterprise A's and B's respective quantities of crude oil produced in a given period; ii) a similar weighted average for countries' transparency rating by Transparency International; and iii) a similar weighted average for countries' UN human development index or HDI. For instance, enterprise 'A' may have produced 725.6 million barrels in a particular time period. By weighting each of the producing countries' three sustainability measures by their share of enterprise A's total crude oil production, and applying a formulaic weighting of each such measure, an SCR score of 78.2 is obtained for 'A.' For the exemplary instance, the following illustrative formula is used to obtain the indicated SCR score: SCR score={[EITI value]+10*[TI rating]+100*[UN HDI]} divided by 3.0.

Although specific examples of computing an SCR score have been provided, one of skill in the art will appreciate that other manners of scores may be computed. In embodiments, the SCR score may be adapted to a particular industry, a particular sector in an industry or to any other domain.

Sequential Chain Monitoring

Embodiments of example uses of the SCR systems and methods disclosed herein will now be provided. In one such embodiment, the systems and methods disclosed herein may be employed to track products, as a form of object, as they traverse a supply chain. By connecting to an SCR database over a network, such as the Internet, data about a product can be captured as the product moves through a supply chain. As will be apparent to an artisan of ordinary skill, an SCR database may receive data input from one or a plurality of authorized users and others, depending on factors such as the size of an organization deploying an SCR embodiment, the geographic dispersion of the organization, the internal configuration of the organization, the number and nature of enterprise and other data systems employed by the organization, and a plurality of other factors. Although, for clarity, all exemplary embodiments of SCR described herein employ such decentralized data entry modes, it will be apparent to an artisan of ordinary skill that fully or partly centralized data entry modes may alternatively be used for enabling an SCR database to receive data. Also, it is noted that the SCR system and method employs a plurality of data types. As described earlier herein, data type-4 is defined as data pertaining to SC component host entities. As such, and given that SCC host entities may relate to a geographic or positional attribute of SC components—for instance, to a country, state, province, or other such geographic attribute or to many or all of such geographic attributes in a hierarchical manner—a system facilitator, or another, apart from the enterprise or other organization deploying SCR, may provide data entry with respect to data type-4 (SCC host entity data objects). As earlier herein described, SCC host entity data attributes and data values often may be of a relatively static nature and less transient or time-sensitive than may be data pertaining to objects that transit dynamically through sequential chains. Such relatively more static nature of SCC host entity data may be one reason, amongst others, why parties, organizations, persons or another, other than system users, suppliers and customers, are appropriate for enabling an SCR database to receive such relatively static data. That is, such SCC host entity data, when they are relatively static, may be received less frequently (for instance, monthly or annually) from a neutral body overseeing such SCC host entity data, whereas data pertaining to objects and SC components are more transient in nature and generally are more amenable to being received dynamically—for instance, in real- or near real-time—by an SCR database from enterprise users or other appropriate system users.

Figure 23:
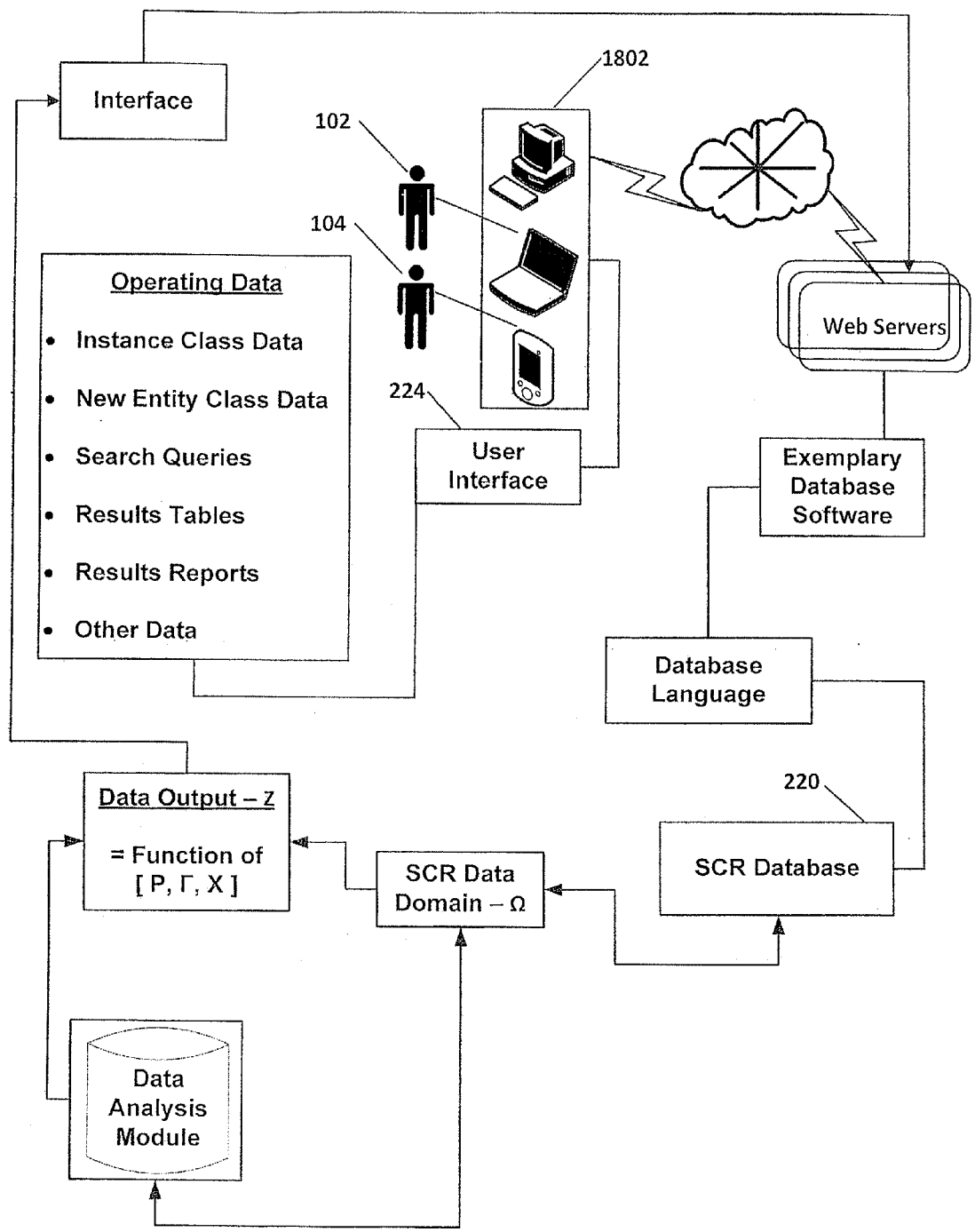
FIG. 23 is a block diagram illustrating flows of data, as received by and returned from an SCR database for an embodiment of the SCR system and method.

FIG. 23 is a block diagram illustrating flows of data, as received by and returned from an SCR database 220 for an embodiment of the SCR system and method in the global, integrated oil and gas industry. The method by which data is communicated between the SCR database and a plurality of system users and others is as described herein.

Upon completion of construction of a database model and corresponding database structure 220, as shown in FIG. 23 and as described herein above, authorized users (or, as also used herein, users) in the oil and gas industry (for this exemplary embodiment) commence operation of the SCR system and method by defining database entities. A database entity corresponds to an actual entity—for instance, 'object,' 'SC component,' or 'enterprise'—for which a user or another wishes to assign a unique identity and to keep track of in some manner. In common database usage, entities are often thought of as nouns, e.g. 'enterprise' or 'SCC host entity.' (Examples of data pertaining to database entities received by SCR database 220 are described above and with FIG. 2.) SCR database 220 receives data relating to specification of a database entity by a user: i) selecting a data entry form, such as data entry form 1500, shown in FIG. 15 and described above, wherein such data entry form will have already been created (as part of the system construction process, described herein earlier) as a data object and stored in SCR database 220; ii) entering appropriate data into such data entry form; and iii) transmitting the completed data entry form to the database 220. The exemplary SCR embodiment for the oil and gas industry may, as one example, include use of the Internet as a selected data communications mode of operation and use of web browsers as a method for user interface between users and the SCR system and method. Therefore, an artisan of ordinary skill will understand that, in this exemplary embodiment, a user (102, 104): may access an appropriate data entry form from SCR database 220 via the internet, using a web browser and a user interface 224; completes the data entry form within the web browser, for instance, by using a desktop computer or laptop computer 1802; and enables the database to receive the completed data entry form via the internet and using a web browser. As also will be apparent to an artisan of ordinary skill, alternative means of enabling a database 220 to receive data input may be used, such as via mobile phone or PDA 1802. The following paragraphs describe more particularly the manner in which database entities and database entity relationships are received by SCR database 220 for an embodiment of SCR in the oil and gas industry.

Figure 24:
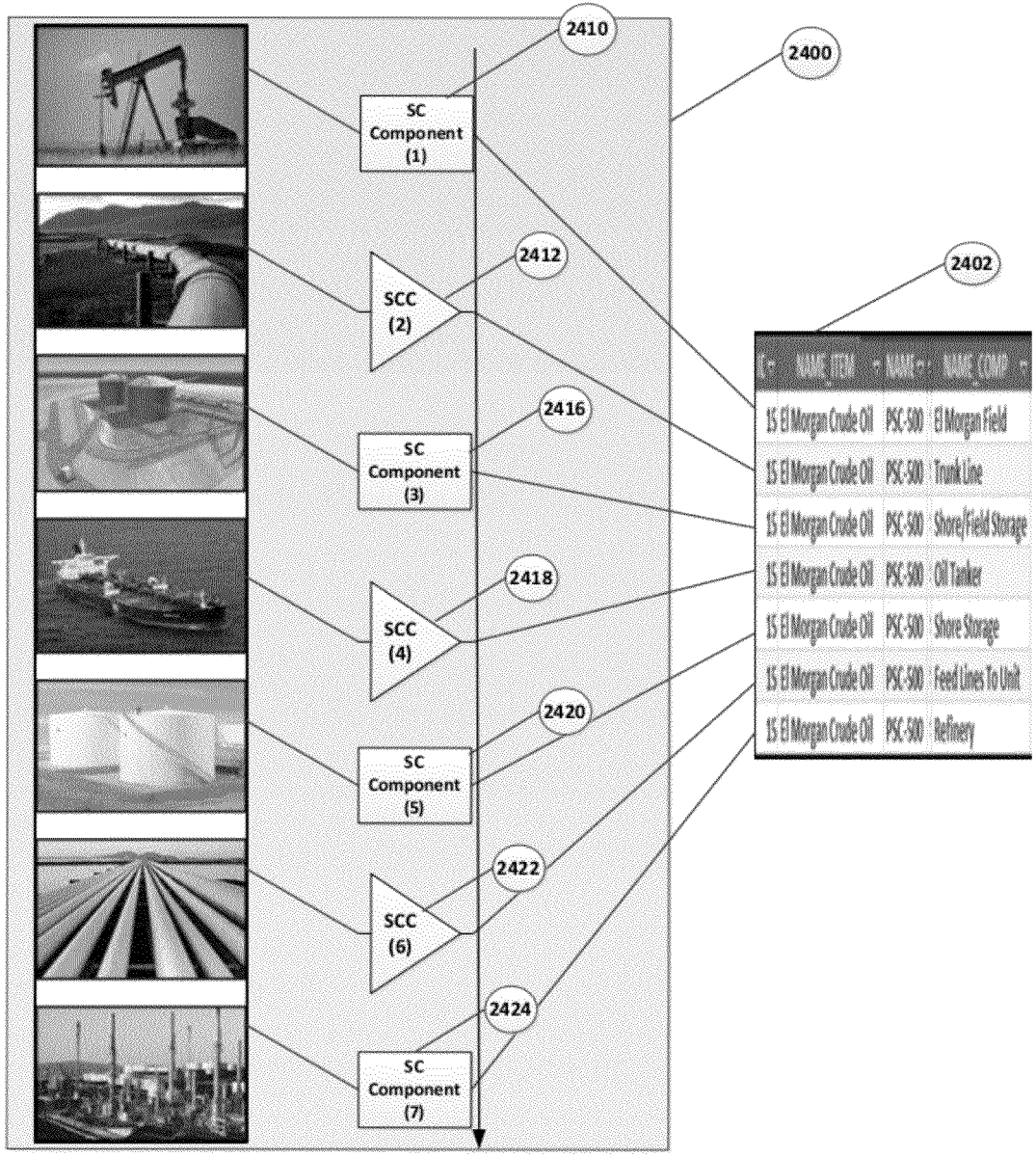
FIG. 24 illustrates an exemplary sequential chain.

FIG. 24 illustrates an exemplary problem concerning a sequential chain participant's—in this instance, a petroleum refiner's—presumed imperative need for a particular type of information and how the SCR system can solve such a problem. In this figure, box 2400 illustrates an exemplary oil and gas industry supply chain, as a particular nature of sequential chain, wherein such supply chain may be comprised of seven exemplary SC components, e.g., SCC no. 2410 through SCC no. 2424 in the figure. Focus of this exemplary problem, which the SCR system can solve, is on the last SC component, e.g. on a petroleum refiner—and, particularly, on assumed information needs of such exemplary petroleum refiner. For instance, a petroleum refiner may be required by law or regulation in a particular country to demonstrate that crude oil processed in the refining company's particular petroleum refinery has not been procured in such manner as to benefit known corrupt oil producing countries. The U.S. Dodd-Frank Act 2010 contains such a provision with respect to minerals extracted from the Democratic Republic of Congo, or DRC. Thus, for exemplary purposes, the information need, for instance, may be stated as: "A refining company (operating in a particular country, herein referred to as a 'processing country') is required to prove that crude oil processed in a refinery within such processing country did not originate, e.g., was not sourced, from a country (herein referred to as a 'source country') that is considered to exhibit known characteristics of corruption, as may be evidenced by specific metrics," for instance, as such characteristics may be inferred from the corruption perceptions index, or CPI, which is periodically determined and widely published by the international organization Transparency International (www.transparency.org/). Embodiments of the SCR system enable acquisition of such information, as described next, thereby providing a solution to this exemplary information problem.

FIG. 24 illustrates a sequential chain 2400, also referred to as a supply chain (and, sometimes, as a value chain), through which a lot quantity of crude oil—as an example of what herein is referred to as an uncovered object, as earlier described—may transit and ultimately be received by an exemplary petroleum refiner at SC component no. 2424, at which component a refiner may process such crude oil into a plurality of petroleum products, including, for instance, naphtha, gasoline, diesel fuel, fuel oil, and asphalt. In this example, the exemplary petroleum refiner, employing an embodiment of the SCR system, is required to ensure and prove that crude oil charged to processing units in its petroleum refinery in a given processing country has been sourced from source countries that are not considered to be corrupt countries, e.g., pursuant to a presumed law or regulation.

First, the exemplary refiner may actualize, via an SCR database, a representation of the sequential chain depicted in FIG. 24 by employing the object-centric chain mode, illustrated in FIG. 4, thus enabling an SCR database to receive and organize data in a relational manner, thus enabling association of a plurality of data within and across all seven of the exemplary SC components illustrated in FIG. 24. For instance, by using the SCR system's object-centric chain embodiment or mode, a system user may create in an SCR database a relational data set, such as that shown in the exemplary database table 2402. Thus, FIG. 24 illustrates how a plurality of SC components in an exemplary oil and gas industry sequential chain, represented by the set of pictures, may be conceptualized as a series of SC components, which, in turn, may be represented as discrete instances in a database table 2402, which may be stored in an SCR database, using methods as herein earlier described. For instance, the illustrative database table 2402 may be understood as including data pertaining to a set of seven SC components—starting with the El Morgan oil field, SCC 2410, and concluding with the petroleum refiner's refinery, SCC 2424—and with an uncovered object, that is, a lot quantity of El Morgan crude oil, transiting in a particular sequence from the first to the seventh exemplary SC component. The exemplary object of 'crude oil,' as an example of an uncovered object, means, for clarity, that such object (as it would be comprised of possibly billions of particular hydrocarbon molecules) is incapable of having associated with it (that is, with each of such exemplary billions of molecules) an existing form of object unique identifier such as an RFID or a barcode.

Next, the exemplary petroleum refiner or another may declare a plurality of data, which may be received by an SCR database as earlier described, and which may be joined or related via the mechanisms and methods described herein. As herein earlier described, these methods include: i) an SCR database enabling data association within a particular SC component, herein referred to as vertical logical conjunction, or relation, of data; and ii) an SCR database enabling data association amongst a plurality of SC components, herein referred to as horizontal logical conjunction, or relation, of data. Also as herein earlier described data received and stored by an SCR database may include data of a plurality of data types, including, for instance, data pertaining to: an object; a sequential chain; SC components, which comprise a sequential chain; SCC host entities, which host SC components; and other data, including various forms of data object identifiers. In the present exemplary instance, a petroleum refiner situated at SC component no. 2424 in supply chain 2400 in FIG. 24 may include particular data, inter alia, data pertaining to a host entity that hosts SC component 2424. In particular, the petroleum refiner needs information, available to it at SC component 2424, e.g., at the processing country, wherein such information pertains to particular attributes of the SCC host entity that hosts SC component 2410, e.g., data relating to certain corruption perceptions ratings of the crude oil-source country. As described herein earlier, data pertaining mainly to an enterprise's entities—including objects, sequential chains, and SC components—may be declared into an SCR database by the enterprise or another, whereas data pertaining mainly to an SCC host entity, which hosts an SC component, may (but need not) be declared into an SCR database by a system facilitator, the enterprise, some neutral party, or another.

The mechanisms herein described, including vertical logical conjunction and horizontal logical conjunction, enable the exemplary refiner at SC component no. 2424 in FIG. 24 to access, via an embodiment, the target information relative to the SCC host entity that hosts SC component 2410, e.g., to information pertaining to measures or indicators of corruption (or to absence of corruption or to degree of corruption) relevant to the source country. To ensure that such information pertaining, in this exemplary instance, to the first SCC host entity (that is, to the host entity hosting SC component no. 2410 in the source country) is accessible to the refiner at the last SC component (that is, the refinery, as SC component no. 2424, located in the processing country), it suffices that an embodiment of the SCR system enables data association for data in any SC component (n) to data in any other SC component (n−1) and/or (n+1), so long as: i) the target data (e.g., in this instance, data pertaining to ratings for perceptions of corruption at the origin, that is, at the SCC-1) for the first SCC host entity are, in fact, received by, stored and manipulated in, and accessible from the SCR database; ii) there is not a break in the sequence of SC components within the SCR database, e.g., there is a continuous connection, without gaps, amongst each SC component with each adjacent such component; and iii) a user at the last SC component has access to the relevant data contained in the SCR system, including to the relevant data pertaining to the first SCC host entity. An embodiment of the SCR system, as described herein, provides these and other capabilities, thereby enabling the exemplary petroleum refiner to demonstrate—e.g. to regulators in the processing country, which hosts SC component no. 2424 in the sequential chain 2400—the source origin of crude oil refined (or to be refined) at the petroleum refinery and, therefore, to demonstrate particular attributes that describe the SCC host entity, including attributes that can be used to calculate measures of the source country's ratings pertaining to corruption and to other features. As will be apparent to one of skill in the art, there may be instances in embodiments wherein continuous connection of data across a set of SC components, as described above, may not always be necessary. For instance, in an embodiment, particular data may be received into an SCR database (e.g., data pertaining to SCC (4) 2418) whereby some other means of forward-linking such data to a downstream SCC (e.g., SCC (7) 2424) may be used (e.g., a user transmitting such data via facsimile) such that the data may still be preserved in the SCR database and appropriately related at the downstream SCC even though the data may not be preserved in the SCR database at the upstream SCC.

As previously described, in embodiments, a DocString identifier may be created and associated with each component of the sequential chain. The DocString identifier is modified as each piece of data is added to the sequential chain. In embodiments, the modification may be in the form of concatenating the unique identifier of each component of the chain to the DocString identifier. By doing so, the DocString identifier contains information that can relate each component of the sequential chain, thereby identifying a relationship between all data in the chain that might otherwise be siloed in individual, proprietary enterprise systems.

As herein later below described, embodiments also provide—via a concept of 'point of defined dilution'—for the circumstance wherein a gap in a sequential chain does occur, whereby system users may still obtain data and information at SC components downstream of such a gap and wherein such data may be provided as statistical data (e.g., data expressed with a measured degree of uncertainty, for example, by use of 'significance' metrics). Such sequential chain gaps may occur, for instance, when one party in the chain is not a participant in a particular embodiment. For instance, referring to FIG. 24, the owner or operator of the fourth SC component 2418, an oil tanker, may not initially be a participant in an embodiment operated by an enterprise or group of enterprises operating the remainder of sequential chain 2400. In such instance, the operator or operators of the remainder of the entire sequential chain 2400 may require the operator of SC component 2418, the oil tanker, to cooperate by participating, in at least a minimum degree by declaring particular data input to an SCR database, or else to lose the business opportunity of transporting crude oil via a component, or segment, in the sequential chain 2400. Alternatively, the operator or operators of the entire sequential chain 2400 may accept the non-cooperation of the operator of SC component 2418, the oil tanker, and employ the concept of 'point of defined dilution,' thereby diluting the level of certainty of data and information at the SC component causing the gap in the chain and thereafter. As will be apparent to an artisan of ordinary skill, the completeness of information content pertaining to objects and the SC components in which objects exist may be greater when all SC components in a given sequential chain are included and, likewise, less when some SC components are excluded from the scope of the complete sequential chain, as such scope may be reflected in the data content of an SCR database in a particular embodiment. As described above for an exemplary instance in the petroleum industry, embodiments are capable of solving the problem of how to provide relational information concerning objects and the sequential chains (and their SC components) that objects transit for uncovered objects, such as lot shipments of crude oil. The SCR system, therefore, is shown to have capability to help track otherwise untraceable lot shipments of crude oil and, by extension, of other nature of uncovered objects. Although current oil and gas industry practice often provides for identifying crude oil origins from source up to a petroleum refinery, further examples described below show how such identity information—along with a plurality of other attributes—may be tracked by embodiments even after crude oil is refined into a plurality of petroleum products, that is, after a resource input has been consumed (for instance, by the process of petroleum refining) and no longer exists in the form that it once had at its origin.

Figure 25:
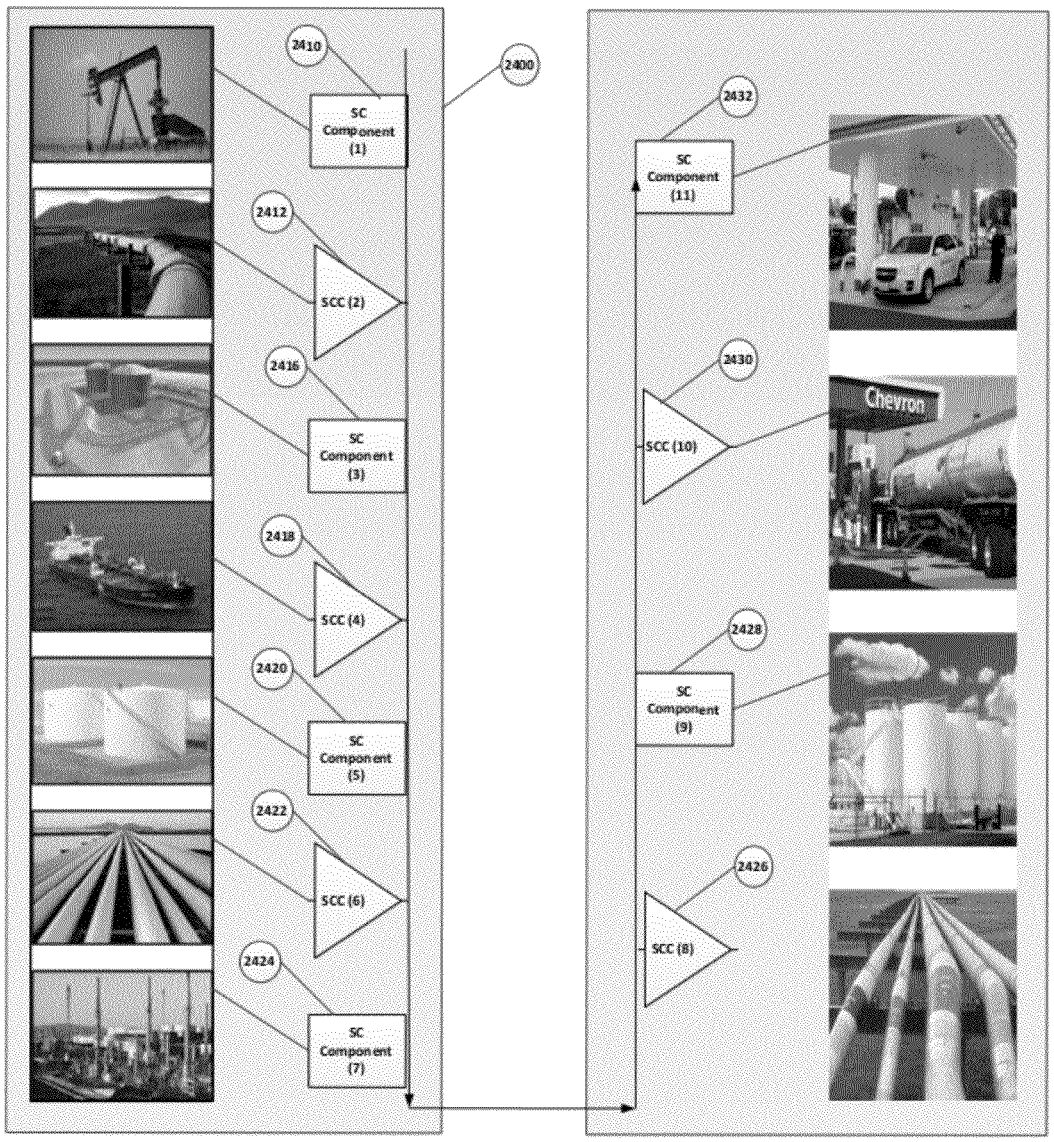
FIG. 25 illustrates another exemplary sequential chain.

FIG. 25 illustrates a sequential chain, such as a supply chain in the oil and gas industry, by which crude oil may be produced and moved via a plurality of SC components, and then refined into gasoline, or petrol, and marketed to final customers. The first seven components shown in FIG. 25, as comprising parts of sequential chain 2400, are identical to those illustrated in FIG. 24. That is, these seven SC components represent: production of El Morgan crude oil, at SCC 2410; storage and transport of such crude oil via SCCs 2412 through 2422; and refining of such crude oil at SCC 2424, a petroleum refinery. FIG. 25 includes a continuation of the sequential chain 2400 by listing additional SC components situated downstream of the exemplary refinery. Thus, FIG. 25 portrays representation of an extensive oil industry supply chain—also referred to as a 'well to wheel' supply chain and as a value chain—by which crude oil may be produced, transported, and refined into petroleum products and whereby such products are stored, transported, and marketed to final consumers. The entire set of 11 illustrative SC components in FIG. 25 may comprise a single sequential chain, herein also referred to as a proprietary sequential chain, or PSC. Alternatively, the 11 SC components may be formed as two or more PSCs, joined by one or more linking changes of control action (or CCAs), into a mixed sequential chain, or MSC. The terms PSC, CCA, and MSC are as herein earlier described. For instance, the set of seven SC components in 2400 may represent one uniquely identified sequential chain, as a PSC, and the set of the final three SC components in 2400—SCCs no. 2428, 2430, and 2432—may represent a second uniquely identified PSC, whereby SCC no. 2426 acts as a CCA linking together the two PSCs into one MSC (that is, as a 'linking CCA,' as earlier described). This example illustrates another capability of the SCR system and method, that of facilitating deep data relationships even in circumstances wherein the supply chain management ('SCM') software systems employed by one enterprise (e.g. by the enterprise responsible for the PSC comprised of SCCs no. 2410 through 2424) and another enterprise (e.g. by the enterprise responsible for the other PSC shown in the latter stages of FIG. 25) may be disparate systems, for example a system vended to one enterprise by Oracle and a system vended to the other enterprise by IBM. Often vendors of particular SCM systems attempt to ensure that their SCM customers remain tied to the particular vendor by employing highly specific system coding and other features to help foster a 'silo' nature of relationship between the SCM vendor and the customer.

Although specific embodiments of analysis data have been provided with respect to a specific industry, e.g., the oil and gas industry, one of skill in the art will appreciate that the data analysis module (shown as element 1810 in FIGS. 18 and 19) may perform other industry-specific analysis. The sequential chain components described herein may be used with any type of data related to any industry, thereby allowing different industry-specific analysis to be performed on an object as it traverses a sequential chain. Similarly, the construct of an SCR score, as earlier herein described, may also be tailored in a highly customizable fashion, for instance, with respect to any of: an industry; an industry sector; an enterprise; a group of enterprises; and others.

For example, the SCR systems and methods described herein may be used to track food products as they travel through a supply chain. By leveraging the sequential chains described herein, the supply chain for a particular food item may be provided. For example, an apple may be identified, by scanning its bar code (which may, in some instances, not be applied until late in a particular sequential chain that ends with the apple being sold in a store), entering its shipping identification, etc. Upon identifying the food item (e.g., the apple) the sequential chain associated with the food item may be retrieved from a database, such as an SCR database. The sequential chain contains data identifying the specific traversal of the food item (e.g., the apple) from its origin (e.g., the apple orchard) through every intermediary up until its final retail destination (e.g., a grocery store). Such information may be provided to consumers who are concerned about the source of their food, the carbon foot print of their food purchase, or for any other purpose.

Assembly Chain Monitoring

The SCR systems and methods disclosed herein may also be applied to the engineering and construction industries. As used herein, the term engineering and construction refers to any or all of a plurality of functions performed in the areas of design, engineering, procurement, construction, commissioning, maintenance and similar or related functions, whereby a product is assembled from a plurality of component parts, units, segments or the like and whereby the product may be comprised of a plurality of sub-assemblies. By way of example but not limitation, products assembled in the engineering and construction sector, as herein defined, include: tangible objects such as an offshore drilling platform, an automobile, and an airplane; and intangible objects such as a computer program, a suite of legal contracts pertaining to financing, construction, ownership and operation of a trans-national oil pipeline, and an assembly of financial securities comprising a package of securitized debt obligations. Thus, the final product formed by processes functioning in the assembly mode of operation—for assembled products, either tangible or intangible in nature—is comprised of a plurality of objects, which may transit through a plurality of sequential chains, which may converge at a common point of assembly or sub-assembly.

Figure 26:
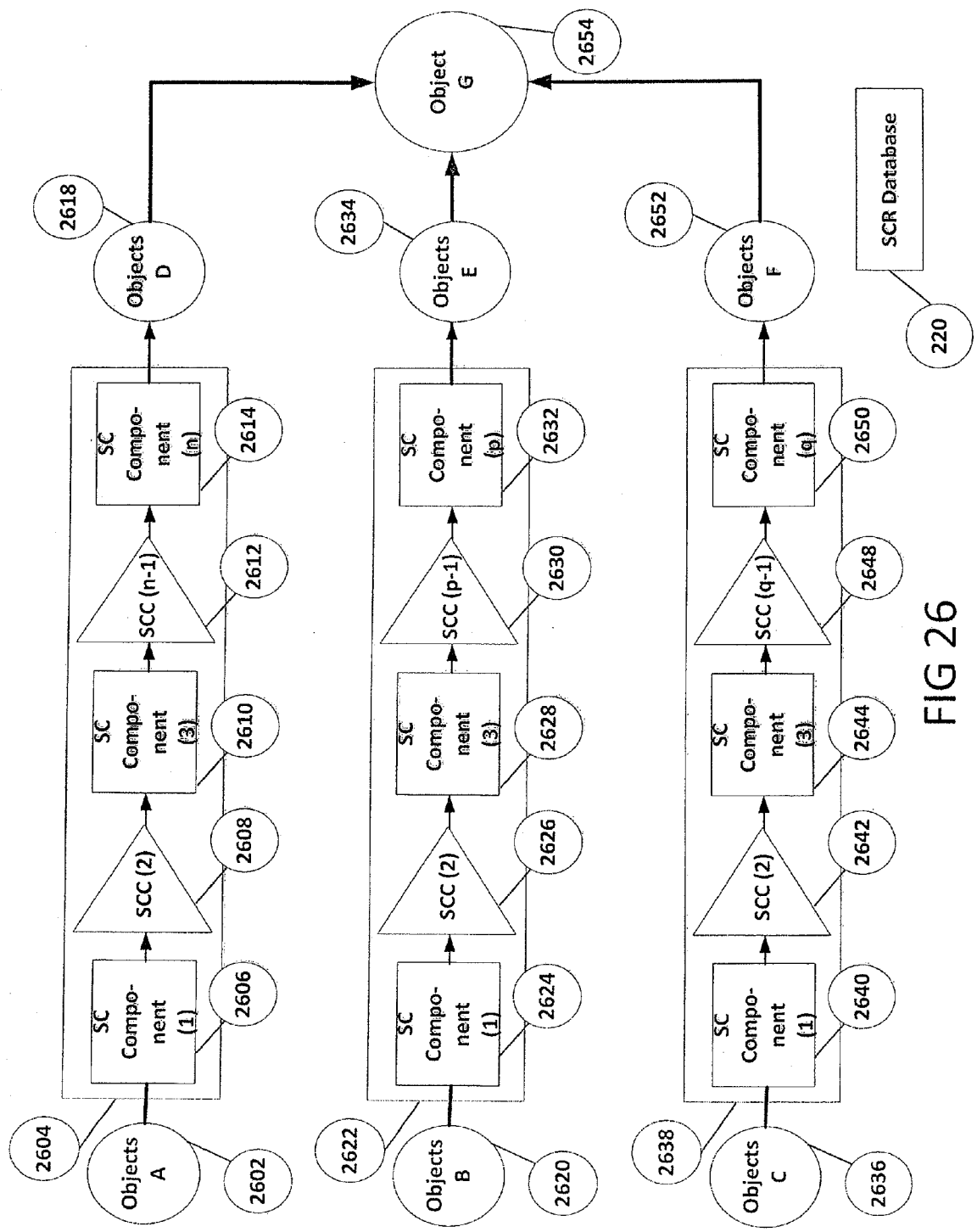
FIG. 26 illustrates additional exemplary sequential chains.

An SCR embodiment in the engineering and construction sector may operate in a SCR's assembly chain mode while supply chain embodiments described herein may operate in an embodiment referred to as SCR's object-centric mode, as earlier described. This distinction is illustrated in FIG. 26. In the object-centric operation mode of an SCR embodiment—e.g., in the exemplary oil and gas industry embodiment—an SCR database 220 receives and manipulates data pertaining to an object or objects that transit through, and may be changed within, a particular sequential chain—for instance, object A 2602 as it enters sequential chain 2604 and a related object D 2618 as it exits the same sequential chain 2604. In the assembly mode of operation of an SCR embodiment—e.g., in the engineering and construction embodiment—an SCR database 220 receives data for objects as they transit sequential chains and then continues to receive data pertaining to a plurality of objects D, E, F 2618, 2634, 2652 as these objects further proceed to be included in a final, assembled object (or in sub-assemblies included in a final, assembled object).

A final assembled object G 2654 in FIG. 26—for instance, an offshore oil producing platform, a petroleum refinery, a subsea oil pipeline, a motorway, or an assembled automobile—may be comprised of a plurality of objects, e.g., objects A, B, and C 2602, 2620, 2636. In assembly mode of operation, as employed for an SCR embodiment in the engineering and construction sector, such objects commence their transit of a particular sequential chain, e.g., SCs 2604, 2622, 2638 as object forms 2602, 2620, 2636. Forms of objects at commencement of sequential chains may be the same or different from the object forms 2618, 2634, 2652 existing at conclusion of those sequential chains. For instance, sequential chain 2604 in FIG. 26 may be a pipe coating plant or facility, wherein a set of homogeneous objects A 2602—e.g., discrete sections of steel pipe—enters the sequential chain at SC component 2606 and exits the sequential chain at SC component 2614, whereby the objects (via the SC) may be treated and coated with protective materials prior to being assembled [e.g., as assembled object G 2654] into a finished sub-sea petroleum pipeline.

Each sequential chain 2604, 2622, 2638, as illustrated in FIG. 26, may exist in form similar to that illustrated in FIG. 4, whereby a sequential chain may be comprised of a plurality of SC components beginning and ending with a process activity and with a change of control action between each adjacent pair of process activities. As earlier herein described, logical structures other than the structure of alternating one process activity (or PA) and one change of control action (or CCA), as adjoining SC components, may also be employed. The alternating (PA)-(CCA) structure, as illustrated in FIG. 4, is used herein as one exemplary logical structure, with an accompanying taxonomy, by which data may be structured and organized in a database of an embodiment. Other logical structures may also be employed in embodiments. For instance, a user, system designer, or another may wish to implement an embodiment wherein no distinction is made between PAs and CCAs, perhaps instead using only 'stages,' or 'STGs' herein, as a locus of activity at which something occurs with respect to an object located within a given STG. Another instance of a user-specified logical structure that differs from the (PA)-(CCA) structure herein described may be one in which a user, system designer, or another may wish to implement an embodiment wherein each pair of STGs, as just described, may be considered as a single sequential chain—that is, wherein the logical structure used is: $\{[STG_1]\text{-}[STG_2]\}$ representing a sequential chain, which may further be linked to other such sequential chains. Many different such logical structures and accompanying taxonomies may be employed in embodiments, depending on users' needs, application environment, and other factors.

Sequential chains in an SCR embodiment for the engineering and construction sector may include both PSCs and MSCs, as illustrated in FIG. 11. As shown in FIG. 26, an SCR database 220 receives data pertaining to all of: objects 2602, 2618, 2620, 2634, 2636, 2652, 2654; sequential chains 2604, 2622, 2638; SC components 2606 through 2614, 2624 through 2632, 2640 through 2650; SC host entities (not illustrated in FIG. 26); and other elements (also not illustrated in FIG. 26). As described earlier and with FIG. 4, a particular taxonomy may be employed to aid in creating a data schema for use in constructing and operating an SCR embodiment in the engineering and construction sector. As described herein, the taxonomy used in describing the engineering and construction sector embodiment is the same as used earlier herein describing the oil and gas industry embodiment. However, SCR taxonomies need not be the same for different embodiments of the SCR system and method and may be constructed to suit the needs and circumstances of a particular application environment. Even users in the same particular application environment, perhaps having different particular needs and interests, may employ different schema and taxonomies.

Figure 27:
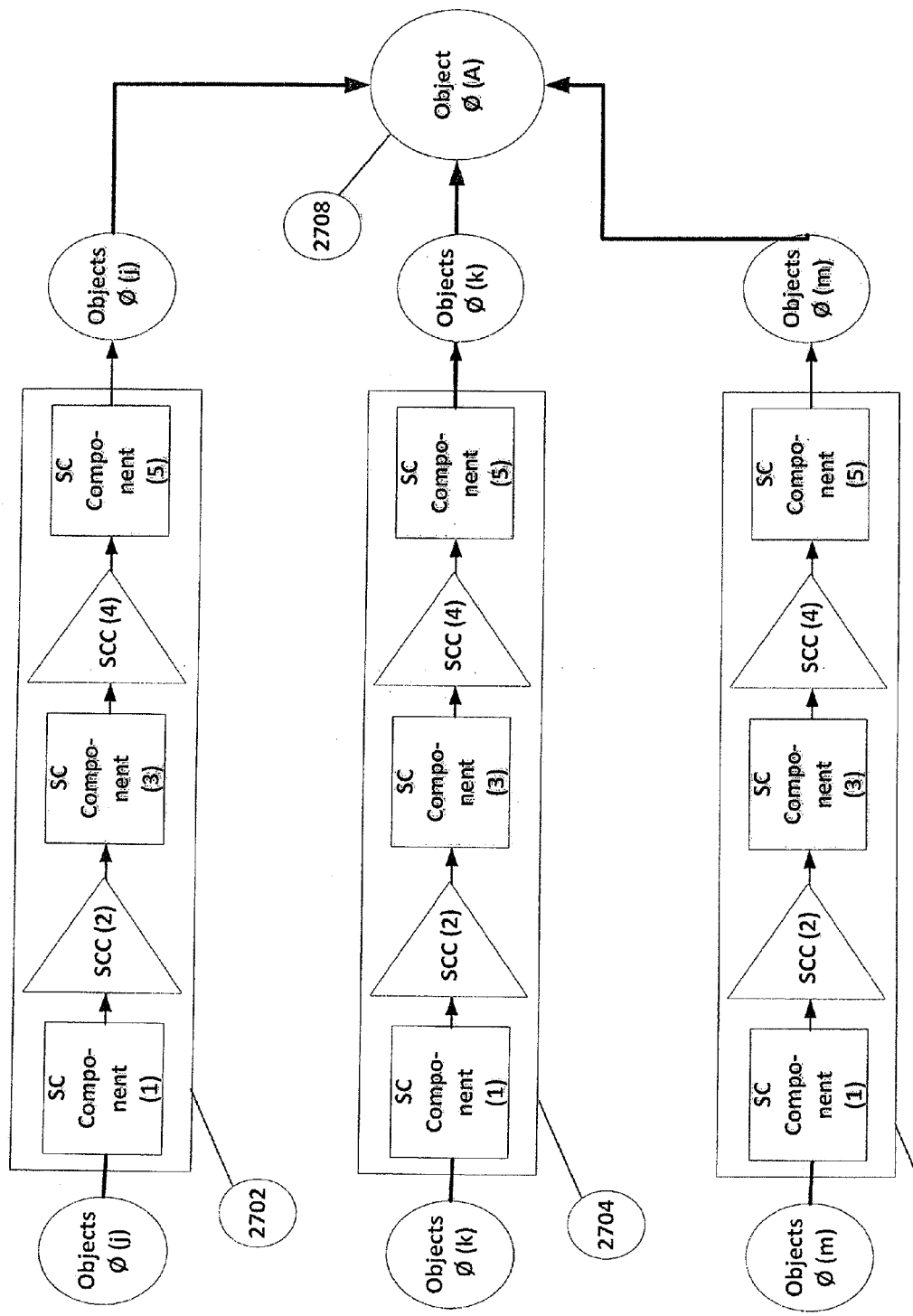
FIG. 27 illustrates three exemplary sequential chains and relationships between and among them.

FIG. 27 shows a representation of the three exemplary, discrete sequential chains illustrating how such sequential chains in the pipeline engineering and construction industry—operating in the assembly-mode of SCR operation, as earlier described—relate to one another, enabling completion of a finished object 2708. In this exemplary instance, such finished object 2708 may be considered as the entire pipeline, engineered, constructed and brought to fruition via a set of distinct sequential chains 2702, 2704, and 2706, functioning together in the assembly-mode of SCR operation.

Although specific examples are provided with respect to Assembly Chain Monitoring, one of skill in the art will appreciate that the embodiments disclosed herein are not limited to the specific examples provided. For example, the SCR systems and methods disclosed herein may apply to other areas such as, automotive, general manufacturing, computer software and hardware, or any other industry, service or the like in which the creation of products occurs in a sequential manner.

In embodiments, the data output from the assembly chain mode may be similar to the other forms of output described herein.

Combined Chain Mode

The assembly chain mode is an embodiment, such as that herein earlier described for application in sectors such as the engineering and construction industry and sub-sectors, whereby users may wish to focus on assembly of a completed object—for instance, of an offshore drilling platform or a pipeline as used in the oil and gas industry—that may be comprised of a plurality of particular objects and sub-assemblies. The object-centric chain mode is an embodiment such as that herein earlier described for application in sectors, such as the oil and gas and other extractive industries, whereby users may wish to focus on transit of objects (such as large lot quantities of hydrocarbons) through particular sequential chains. As also earlier herein described, users of embodiments employing the assembly chain mode or the object-centric chain mode further may wish to focus on data and information pertaining to the informational milieu of the sequential chains through which objects transit, including, for instance, on such milieu as may relate to: SC components that comprise sequential chains, SC component host entities that host SC components, and other information. A third form of SCR embodiment is that which may be constructed by using, in combination, one or a plurality of sequential chains operating in the SCR's object-centric chain mode plus one or a plurality of sequential chains operating in the SCR's assembly chain mode. Such third operational mode, or embodiment, of the SCR system and method is herein referred to as the combined chain mode or embodiment. One example of an industry in which a combined chain mode may be utilized is the financial services industry.

Figure 28:
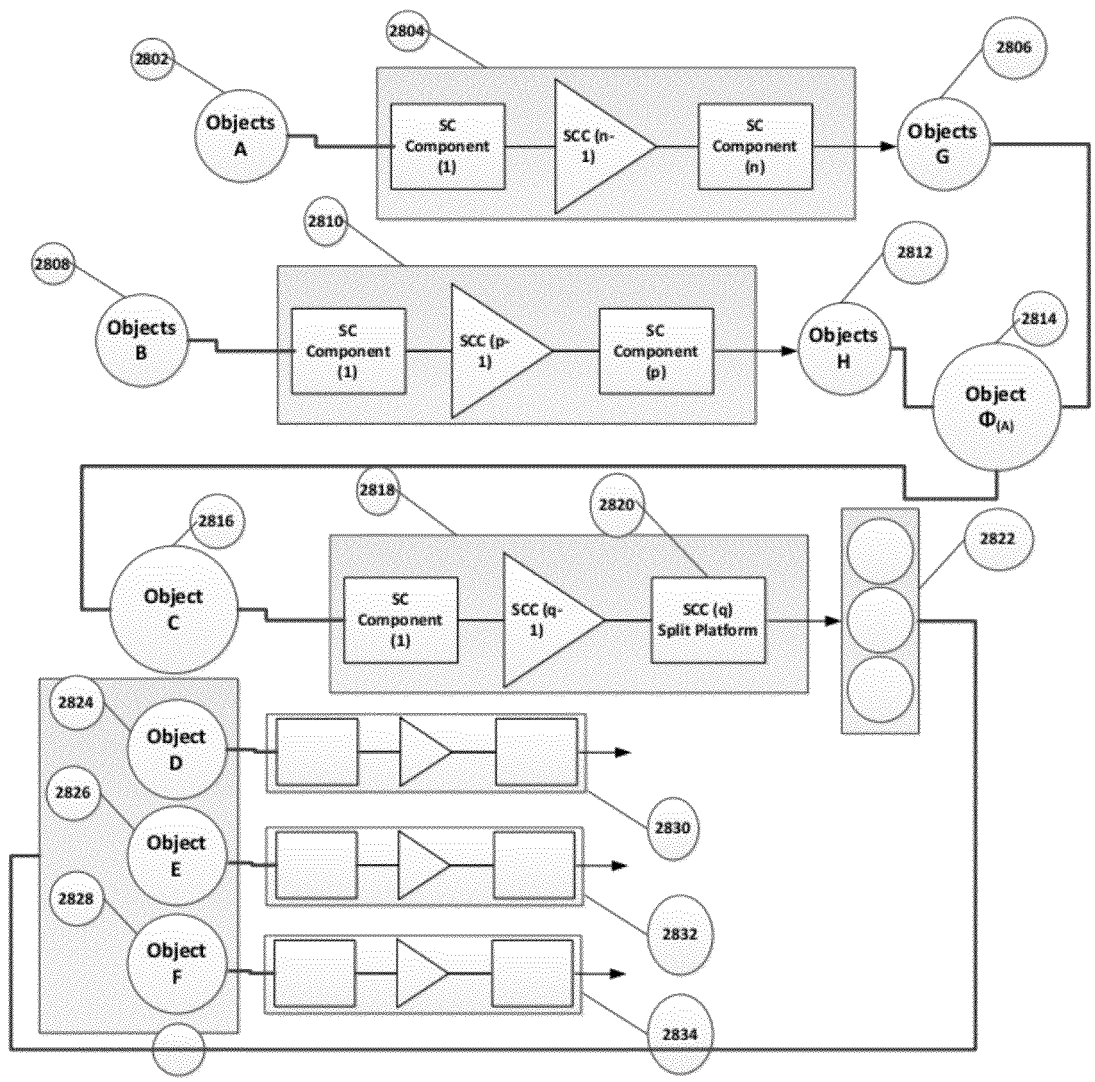
FIG. 28 illustrates a plurality of sequential chains that, together, function in a combined chain mode.

FIG. 28 illustrates a plurality of sequential chains 2804, 2810, 2818, 2830, 2832, 2834 that, together, function in SCR's combined chain mode. Each such chain is comprised of a plurality of SC components, by which objects, for instance, objects in the financial services sector, may transit from origin to destination. These sequential chains operate both in assembly chain mode [sequential chains 2804, 2810] and in object-centric chain mode [sequential chains 2818, 2830, 2832, 2834]. Thus, these sequential chains, taken together, may be considered to operate in the combined chain mode, or embodiment, of the SCR system and method.

By way of example but not limitation, the nature of objects in a financial services environment such as illustrated in FIG. 28 may include: objects A 2802, G 2806 and objects B 2808, H 2812, which in this figure may represent a plurality of particular corporate or project loans; object C 2816, which may represent a set, or package, of such loans that is assembled from the particular project loans and which is referred to herein as collateralized debt obligations or CDOs; objects 2822, which represent a plurality of subsets, or slices, of such package of CDOs; and object D 2824, object E 2826, and object F 2828, which represent a plurality of particular subsets, or slices, of CDOs. The following paragraphs describe a manner in which SCR's combined chain mode of operation, or embodiment, may be employed to track and trace such financial objects through a plurality of sequential chains and to capture and make available relational information pertaining to such financial objects and to the sequential chains in which they exist or existed. As will be apparent to an artisan of ordinary skill, financial objects transiting sequential chains, wherein such objects may be transformed in nature—e.g., by processes known as securitization and partitioning into tranches, or sub-sets, of partitioned loans - represent a set of processes similar to that herein earlier described for resource-transformation industries such as the oil and gas industry. That is, financial objects that transit sequential chains, which operate in SCR's combined chain mode, or embodiment, may be either covered or uncovered objects and may undergo transformations within one or a plurality of such sequential chains such that financial objects exiting such chains may be changed in form in relation to such objects' form upon entering such chains. Thus, as with the other embodiment application environments herein described, the nature of problem addressed via SCR's combined chain mode of operation, or embodiment, is one of preserving and making available data and information pertaining to objects that transit sequential chains functioning in the combined assembly and object-chain modes and to the environments in which such objects exist.

Movements of financial securities, as objects, through the referenced sequential chains, as just described, may occur as follows; later, below, a concrete example is illustrated. An enterprise may form object $\Phi_{(A)}$ 2814, that is, a package of CDOs, first by assembling a plurality of particular loans G 2806 and H 2812 via sequential chains 2804, 2810. Operating in this manner, these sequential chains 2804, 2810, taken together, represent the assembly chain mode of operation within the financial services embodiment of SCR, analogous to the assembly chain mode herein earlier described for the engineering and construction sector. Once such a package of project or corporate loans 2814 is assembled—for instance, representing a collective face value of $30 billion—the enterprise may process such package of loans via sequential chain 2818, operating as shown in FIG. 28 in the object-centric chain mode, analogous to the chain mode herein earlier described for the oil and gas sector. For instance, in sequential chain 2818, such package of loans, as a group, may pass through a plurality (q) of SC components whereby: the composite package is partitioned, or sliced, into a plurality of particular risk categories; each such risk category, or slice, of the original package of loans is evaluated; and the plurality of such slices then prepared for distribution to customers in financial markets. SC component (q) 2820, as one SC component in sequential chain 2818, may operate as a split platform (as this form of SC component is described herein and with FIG. 9), whereby a plurality of CDO tranches—object D 2824, object E 2826, and object F 2828—are created, with each such CDO tranche then being distributed, respectively, via sequential chains 2830, 2832, 2834.

As has been described, above and with FIG. 28, a manner in which an SCR embodiment in the financial services sector, functioning in SCR's combined chain mode, may enable: assembly, via sequential chains 2804, 2810 functioning in assembly chain mode, of a set of project or corporate loans 2814 from a plurality of discrete loan obligations 2802, 2808; processing of the set of loans 2814, via sequential chain 2818 functioning in object-centric chain mode into particular risk-rated tranches, or subsets, of such set of loans; and sale of such tranches 2824, 2826, 2828 via a plurality of distribution chains 2830, 2832, 2834, each operating in object-centric chain mode. The foregoing description illustrates the originate-and-distribute method of operation, combined with securitization, employed by a plurality of financial institutions in existing financial markets. Operations such as these in the residential mortgage sub-sector known as sub-prime mortgages were a principal contributor to the financial crisis of 2007-2009. Use of an SCR embodiment, operating in the combined-chain mode as herein described, may have enabled players in the sub-prime mortgage industry to have maintained better monitoring of the actual, atomic level of risk contribution made by each portion of each individual sub-prime mortgage contained in the financial instruments eventually sold into markets as tranches of the securitized, partitioned component mortgages. The ability, via SCR, to preserve such atomic-level risk data may be contrasted with the more aggregated risk ratings assigned to these complex financial securities by rating agencies such as Moody's and others. In this respect, wide use of SCR's combined-chain mode or embodiment may have enabled avoidance of potentially a substantial portion of the multi-trillion dollar losses encountered during and since the financial crisis of 2007-2009. In private communication during 2011 with the inventor, an analyst at the New York branch of the Federal Reserve Bank has indicated that the capacity of SCR [that is, via its combined-chain mode of operation] to track intermediated risk would be a huge benefit.

While FIG. 28 and the foregoing description illustrate a financial services embodiment of SCR employing a particular configuration of sequential chains operating in both the assembly chain mode and in the object-centric chain mode, it will be apparent to an artisan of ordinary skill that, alternatively, other configurations of sequential chains may also be used, as may be appropriate to circumstances and objectives in a particular application embodiment.

Figure 29:
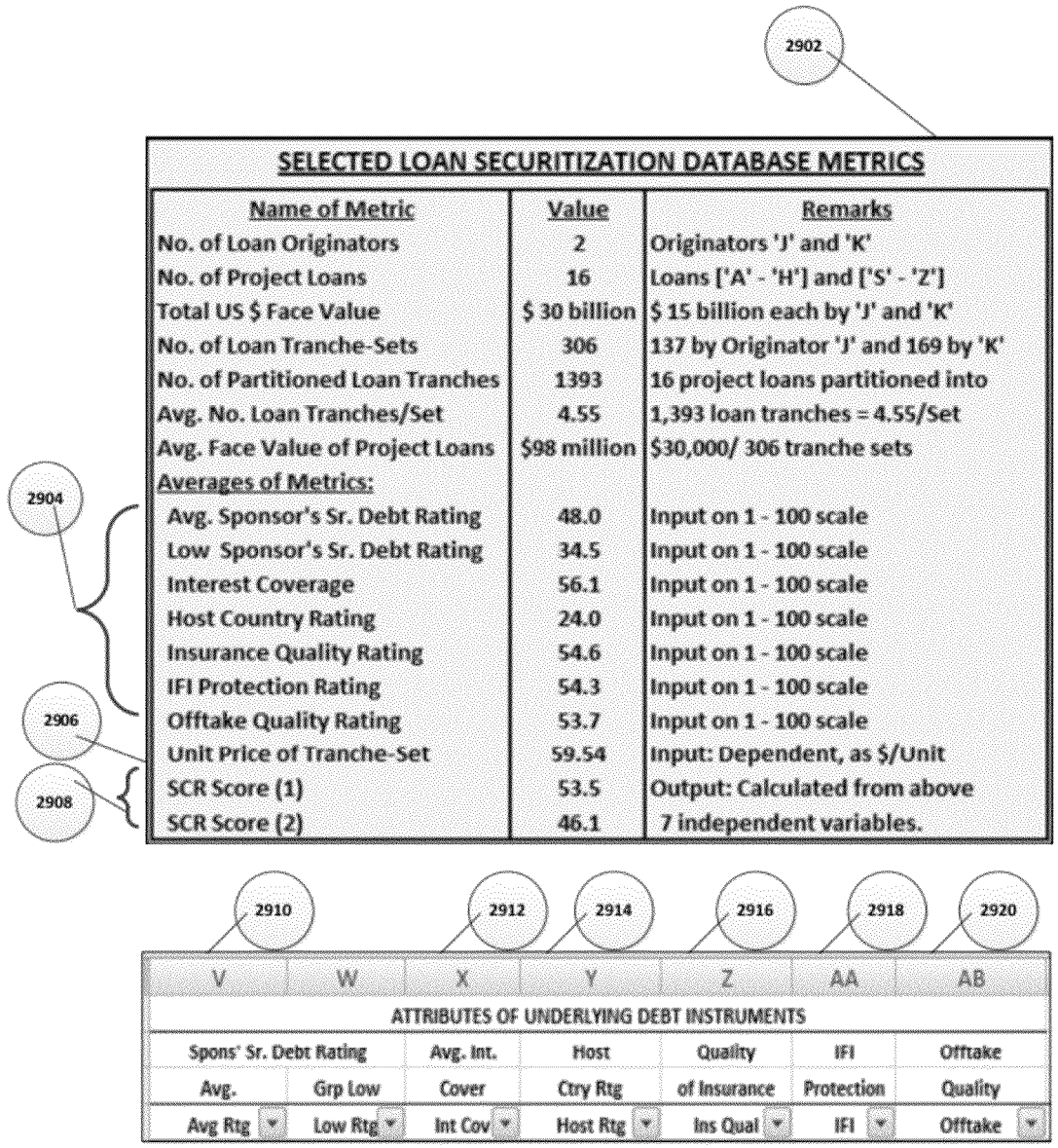
FIG. 29 provides an example of data analysis that may be performed in a combined chain mode.

FIG. 29 provides an example of data analysis that may be performed in a combined chain mode. For such illustrative purposes, an actual database, comprised of hypothetical data, has been created with the following features, as summarized in table 2902 in FIG. 29: i) two loan originators, 'J' and 'K,' who originate 16 project loans (named 'A' through 'H' and 'S' through 'Z') with total face value of $30 billion; 306 discrete loan tranche sets, of which 137 contain loan tranches partitioned from loans originated only by originator 'J' and 169 with loan tranches partitioned from loans originated only by originator 'K' a total of 1,393 partitioned loan tranches, representing an average of 4.55 loan tranches per tranche set and an average face value of $98 million per partitioned loan tranche; data input, with respect to seven attributes 2904 of the 16 discrete project loans, whereby values for each such attribute are normalized to continuous variables and on a 1-to-100 scale where '1' is worst and '100' is best; and data input of a unit price 2906 for each tranche set, whereby such unit price is indexed to a scale of zero to $100 per unit and where the average unit price is $59.54 for the group of 306 tranche sets.

Two other independent variables, as one form of data output, are computed from six of the seven independent (input) variables 2904 listed in FIG. 29: i) a weighted value, herein referred to as 'SCR score 1;' and a second weighted value, herein referred to as 'SCR score 2.' These two SCR score indices, each including weighted values for three different independent variables, may be computed within an SCR database 220, as shown in FIG. 18, or within a data analysis module 1810, as also shown in FIG. 18. Considerations of computational speed, data transfer speeds and other factors may favor such computational operations being done within either the database element 220 of an embodiment or within the data analysis module element 1810 of an embodiment. Construction of the two forms of SCR score is described next, with reference to the six exemplary independent variables (2910 through 2920) in FIG. 29 and wherein the symbols 'V,' 'X,' 'Y,' 'Z,' 'AA,' and 'AB' have the meanings shown for these six variables. While the attributes SCR score 1 and SCR score 2 may be considered as dependent variables—e.g., variables that each are dependent on three particular independent variables—herein these two representations of multi-dimensional SCR scores are considered as independent variables (e.g. with respect to tranche price) that are derived from other independent variables as data inputs.

SCR score (1) 2908, in the exemplary combined chain embodiment within the financial services sector, is computed as follows:

$$\text{``}SCRScore(1)\text{''} = \left\{ \frac{\lfloor (V) \to (Z - X) \to (B + AB) \rfloor}{6} \right\}.$$

Thus, by this exemplary, non-limiting example of an equation, SCR score (1) may be understood to represent a composite measure, with respect to a particular tranche set (and to the underlying loans for loan tranches included in a particular tranche set), such as tranche set Alpha-1 constructed from the following three independent variables: i) a project's sponsors' average senior debt rating, 'V' 2910, with respect to all the sponsors of a particular project that receives project loans, which are originated by either originator 'J' or 'K;' ii) a measure of the project's interest coverage, 'X' 2912, e.g., an average of the first five full operating years' estimated before-tax cash flow cover of average estimated before-tax interest expense; and iii) a measure of estimated quality of product offtake arrangements, 'AB' 2920, wherein these three variables are normalized to a 1-to-100 scale. As will be apparent to an artisan of ordinary skill, with these three particular independent variables, SCR score 1 may be viewed, for instance, as representing a composite measure that reflects a set of factors that describe aspects of the overall health of a project—e.g., from a combined operating and financial perspective—wherein the project is associated with particular loans, which may be partitioned into loan tranches and included in a particular tranche set.

SCR score (2), 2908 in the exemplary combined chain embodiment within the financial services sector, is computed as follows:

$$\text{``}SCRScore(2)\text{''} = \left\{ \frac{\lfloor (1B \to Y) \to (Z) \to (B + AA) \rfloor}{BA} \right\}.$$

Thus, by this equation, SCR score (2) may be understood to represent a composite measure, with respect to a particular tranche set (and to the underlying loans for loan tranches included in a particular tranche set), such as tranche set Alpha-1 constructed from these the following three independent variables: i) a host country rating, 'Y' 2914, with respect to the country that hosts the project, which receives project loans that are partitioned into loan tranches—for instance, a relative country rating such as that which may be published by a financial institution or by the United Nations; ii) a measure of the quality of the project's insurance coverage, 'Z' 2916, e.g., pertaining to the extent of cover for particular assets and for business interruption risks; and iii) a measure of protection afforded to the project by virtue of IFIs' participation, 'AA' 2918, wherein these three variables are normalized to a 1-to-100 scale. As will be apparent to an artisan of ordinary skill, with these three particular independent variables, SCR score (2) may be viewed, for instance, as representing a composite measure that reflects a set of factors that describe aspects of the overall health of a project—from a perspective of external bodies' views of the project's host country and of insurers' willingness to insure against particular risks associated with the project—wherein the project is associated with particular loans, which may be partitioned into loan tranches and included in a particular tranche set.

Thus, the exemplary SCR scores, as herein described for an embodiment in the financial services sector, may include, for instance: i) a score that indicates a single, composite measure of the estimated overall financial health of the project itself (e.g., SCR score 1), whereby such measure may be of interest to parties considering purchase of securities such as those described above for this example embodiment; and ii) another score that indicates a single, composite measure of the estimated overall political or macroeconomic health of the country that hosts the project (e.g., SCR score 2), whereby such measure may also be of interest to such parties. As will be apparent to an artisan of ordinary skill, such scores or indices like the ones described herein for SCR score 1 and SCR score 2 may be constructed in a plurality of manners, depending on factors such as the perceived needs of system users, the requirements of regulators, and other factors; or, such composite scores or indices may not be constructed. The availability of multi-dimensional scores or ratings, such as those described herein for SCR score 1 and SCR score 2, may be of considerable additional benefit to financial market participants, customers, regulators and others insofar as these scores may supplement the ratings provided by rating agencies. The capacity of such SCR scores to provide such supplemental risk information is created via SCR's capabilities for accessing, retaining and using atomic-level risk measures associated with, for example, individual sub-prime mortgages that enter into complex origination-and-distribution chains at the furthest upstream stage (that is, SC component) in such chains, that is, at the stage or component where discrete, individual sub-prime mortgages are originated. The unavailability of such atomic-level risk information at the intermediate and downstream stages (that is, SC components) of the sequential chains that originated, processed and sold complex financial instruments, such as those just described above, is widely reported in the global financial press to be one of the core causes of the global financial crisis of 2007-2009. To the extent that "markets mispriced risk," as declared by former Federal Reserve Bank Chairman, Alan Greenspan, in official testimony, such mispricing of risk may have been in large part due to market players having lost track of the atomic-level risk of individual sub-prime mortgages as such risk accumulated (without accurate, continued measurement) at the downstream stages of the financial industry chains by which complex, securitized sub-prime mortgages were (and still are) created. That is, the mispricing of risk, as averred by Alan Greenspan may, in large part, have been attributable to markets and market players having lost track of risk due to the inability of the financial industry to track attributes, such as risk, continuously through the complex business chains characterizing that industry. SCR's systems and methods can solve this problem.

Figure 30:
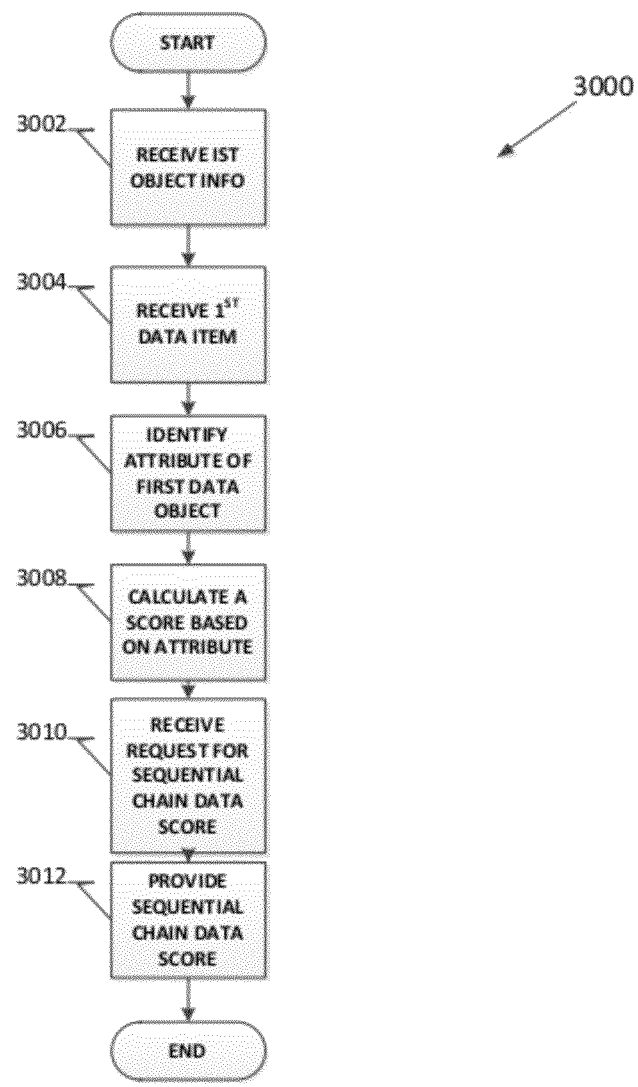
FIG. 30 provides an exemplary method for deriving and providing a sequential chain data score according to embodiments of the present application.
Figure 12:
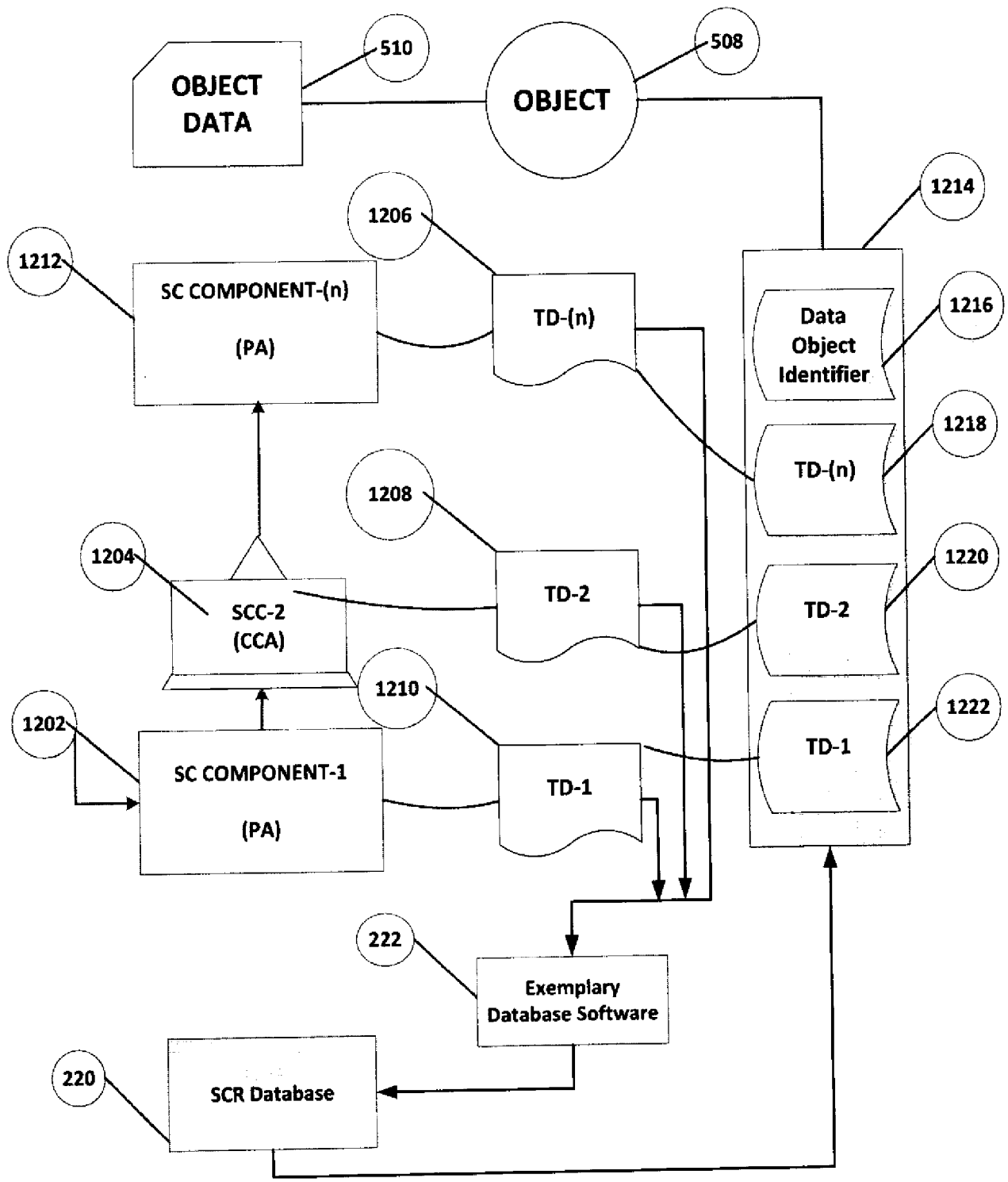

FIG. 30 is a flow chart illustrating an embodiment of a method 3000 for providing information to a user about an object (e.g., a covered or an uncovered object) as it transits a sequential chain. Flow begins at operation 3002, where information about a first object is received. In embodiments, a first object may be any type of tangible or intangible object that traverses a sequential chain. In embodiments, the first object is related to a sequential chain by a unique identifier that is associated with the sequential chain. For example, the unique identifier may be a DocString identifier as disclosed herein.

Flow continues to operation 3004, where a first data item is received. The first data item may be any type of data related to the object as it traverses a sequential chain. For example, the first data item may be any type of data related to the sequential chain components, the sequential chain component host entities, or other objects disclosed herein. In one embodiment, the first data item may be a trade document (or may be gathered from a trade document) as described herein.

In embodiments, the first object may be related to the first data item using a unique identifier, e.g., a DocString identifier or other unique identifier as described herein. Although not shown in FIG. 30, the methods described with respect to FIGS. 16 and 17 may be employed with FIG. 30 to create a SCR component and/or relationships described herein.

Flow continues to operation 3006, where the method 3000 identifies at least one attribute of the first data object. For example, the first data object may have multiple attributes (e.g., entity name, host country, purity score, etc.). In embodiments, the multiple attributes may be stored collectively (e.g., in one SCR component). In other embodiments, each attribute may constitute an individual data item. In such embodiment, each attribute may be stored collectively or individually (e.g., as multiple SCR components such as, for example, multiple sequential chain host entities). In embodiments, only some attributes may be used to calculate a score for the object and/or sequential chain. In such embodiments, these attributes are identified at operation 3008.

At operation 3008, a score is calculated based upon the one or more identified attributes. In one embodiment, an algorithm may be deployed at operation 3008 to calculate the score. For example, the purity attribute may be modified depending on other data from the sequential chain (e.g., splitting or blending the object). In such embodiment, any of the algorithms disclosed herein or any other algorithm related to the specific object, the object's associated industry, or sequential chain may be employed at operation 3008. One of skill in the art will appreciate that multiple types of algorithms may be employed at operation 3008.

In another embodiment, information may be retrieved from an external source (e.g., another database, a third-party, etc.) at operation 3008. In such embodiments, the information used to calculate the SCR score may be stored in a centralized repository, and attribute data stored in the SCR system may be used to retrieve such information. Examples of such information include, but are not limited to, data related to the child labor practices of a country, the purity of oil from a specific country or well, the carbon produced by the facility that manufactured the product, etc. In embodiments, the attribute identified in operation 3008 may be used to query the external source for the score, or information that may be used to calculate the score. For example, if one of the attributes identified at operation 3006 is the country "China", data related to China's carbon emissions may be retrieved at operation 3008 from a third party, such as the UN. The retrieved data may itself comprise the score calculated at operation 3008, or it may be further modified by an algorithm to produce a score. In addition, attribute data may also be used to query for information within the SCR system to calculate a score.

Flow continues to operation 3010, where the method 3000 receives a request for data about a sequential chain. In embodiments, the request may include the unique sequential chain identifier. In other embodiments, the request may include an identifier associated with an object. In such embodiments, the sequential chain may be identified by its relation to the object. For example, as described herein a DocString identifier may be modified to include the identifier of the sequential chain, an object, and all sequential chain components and sequential chain component host entities related to the object. In such embodiments, the sequential chain may be identified by the DocString identifier. For example, in one embodiment a user may scan a barcode attached to a tangible item to receive information about the item's traversal of a sequential chain. For example, a user in a grocery store may scan a bar code affixed to a sticker on an apple. The bar code is an object identifier of the apple that may be sent to a SCR system to identify a related sequential chain. In further embodiments, the request may also include a request for specific data about the sequential chain. For example, the user may be interested in the carbon footprint of the object, the country of origin of the object, etc. As such, the type of information related to the sequential chain may be specified at the request received at operation 3010. By using the SCR system, the user may be able to retrieve information about the apple that was collected before the bar code was affixed to the apple.

Flow continues to operation 3012. At operation 3012, the method 3000 provides the score to the user. For example, at operation 3012, the method 3000 may gather information about the object, such as the first data item received at operation 3004, using the established relationship between the object and the data item as described herein. For example, the relationship may be identified based upon a unique identifier, such as, but not limited to the DocString identifier. Upon identifying the related information, the related information may be provided to the user at operation 3012.

In further embodiments, the method 3000 may filter the sequential chain data score or modify the sequential chain data score before providing the sequential chain data score at operation 3012. For example, if the request identified a specific type of information (e.g., information related to a carbon footprint, the purity of the product, etc.),. operation 3012 may perform a filter operation such that only the requested type of sequential chain data score, rather than all the sequential chain data, is returned at operation 3012. In still further embodiments, an algorithm may be employed on the sequential chain data at operation 3012 in order to produce the requested information at operation 3012.

Although method 3000 is described as only receiving a first data item, one of skill in the art will understand that any number of data items having any number of attributes (and those attributes' associated values) may be received by operation 3004. Furthermore, in embodiments, the method 3000 may be used with blend platforms, split platforms, change platforms or combinations of these. One of skill in the art will appreciate the method 3000 may be employed to calculate and provide a score for any type of sequential chain using any type of data related to an object traversing the sequential chain.

Although specific embodiments were described herein and specific examples were provided, the scope of the invention is not limited to those specific embodiments and examples. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A method for identifying data related to a first object traversing a sequential chain, the method comprising:
    registering the sequential chain, including creating a first DocString identifier, wherein the DocString identifier comprises a unique identifier for the sequential chain;
    receiving a first data item related to the first object, the first data item having a first identifier, wherein the first identifier is a unique identifier for the first data item;
    modifying the first DocString identifier using the first identifier;
    receiving a second data item related to the first object, the second data item having a second identifier, wherein the second identifier is a unique identifier for the second data item;
    modifying the first DocString identifier using the second identifier;
    receiving a third data item related to the first object wherein the third data item has a third identifier;
    further modifying the first DocString identifier using the third identifier;
    identifying a relationship between the first, second, and third data items using the first DocString identifier, wherein modifications to the first DocString identifier indicate the relationship between the first, second, and third data items;
    providing information relating to the first object based at least on the identified relationship;
    determining that the first object is combined with a second object to create a third object, wherein the second object is associated with a second DocString Identifier;
    creating a combined DocString identifier, wherein the combined DocString identifier is based on the first DocString identifier and second DocString identifier;
    receiving a fourth data item comprising a fourth identifier, wherein the fourth identifier is a unique identifier for the fourth data item; and
    modifying the combined DocString identifier using the fourth unique identifier.

2. The method of claim 1, wherein the first data item and the second data item include attribute information about the first object, and wherein the provided information comprises a score based on the attribute information.

3. The method of claim 2, wherein the second data item is a sequential chain component, wherein the sequential chain component comprises data representing the movement of the first object as it transits through the sequential chain.

4. The method of claim 1, wherein modifying the first DocString identifier comprises concatenating the first identifier with the second identifier.

5. The method of claim 1, wherein the third data item is a sequential chain host entity, wherein the sequential chain host entity comprises data pertaining to an entity that is related to at least a particular portion of the sequential chain.

6. The method of claim 1, wherein the first data item is received from a first user at a first location and the second data item is received from a second user at a second location.

7. The method of claim 6, wherein the second location is different from the first location.

8. The method of claim 1, further comprising:
    determining that the third object is split into a fourth object and fifth object; and
    creating a third DocString identifier, wherein the third DocString identifier comprises the first DocString Identifier, the second DocString Identifier, and a unique identifier for the fifth object.

9. A non-transitory computer storage medium comprising computer executable instructions that, when executed by a processor, perform a method for identifying data related to objects traversing a sequential chain, the method comprising:
    registering the sequential chain, including creating a first DocString identifier, wherein the first DocString identifier comprises a unique identifier for the sequential chain;
    receiving a first data item related to a first object, the first data item having a first identifier, wherein the first identifier is a unique identifier for the first data item;

modifying the first DocString identifier using the first identifier;
receiving a second data item related to the first object, the second data item having a second identifier;
modifying the first DocString identifier using the second identifier, wherein the second identifier is a unique identifier for the second data item;
receiving a third data item, the third data item having a third identifier;
modifying the first DocString identifier using the third identifier;
identifying a relationship between the first, second, and third data items using the first DocString identifier, wherein modifications to the first DocString identifier indicate the relationship between the first, second, and third data item;
providing information relating to the first object based at least on the identified relationship;
determining that the first object is split into a second object and a third object; and
creating a second DocString identifier, wherein the second DocString identifier comprises the first DocString Identifier and a unique identifier for the second object.

10. The non-transitory computer storage medium of claim 9, wherein the first data item, the second data item, and the third data item include attribute information about the first object, and wherein the provided information comprises a score based on the attribute information.

11. The non-transitory computer storage medium of claim 9, wherein the method further comprises:
determining that the second object is combined with a fourth object, wherein the fourth object is associated with a third DocString Identifier;
modifying the second DocString identifier using the third DocString identifier;
receiving a fourth data item comprising a fourth identifier, wherein the fourth identifier is a unique identifier for the fourth data item; and
modifying the third DocString identifier using the fourth identifier.

12. The non-transitory computer storage medium of claim 9, wherein the method further comprises:
determining that the second object is changed, wherein the change results in a plurality of derivative objects; and
creating a plurality of additional DocString identifiers, wherein the additional DocString identifiers comprise the second DocString identifier and a unique identifier for the plurality of derivative objects.

13. The non-transitory computer storage medium of claim 9, wherein the method further comprises:
determining that the second object is combined with a fourth object, wherein the fourth object is associated with a third DocString Identifier; and
modifying the second DocString identifier using the third DocString identifier.

14. The non-transitory computer storage medium of claim 9, wherein the method further comprises:
determining that the second object is combined with a fourth object, wherein the fourth object is associated with a third DocString Identifier;
creating a combined DocString identifier, wherein the combined DocString identifier is based on the second DocString identifier and third DocString identifier;
receiving a fourth data item comprising a fourth identifier, wherein the fourth identifier is a unique identifier for the fourth data item; and
modifying the combined DocString identifier using the fourth identifier.

15. A non-transitory computer storage medium comprising computer executable instructions that, when executed by a processor, perform a method comprising:
registering the sequential chain, including creating a first DocString identifier, wherein the DocString identifier comprises a unique identifier for the sequential chain;
receiving a first data item related to a first object, the first data item having a first identifier, wherein the first identifier is a unique identifier for the first data item;
modifying the first DocString identifier using the first identifier;
receiving a second data item related to the first object, the second data item having a second identifier, wherein the second identifier is a unique identifier for the second data item;
modifying the first DocString identifier using the second identifier;
receiving a third data item related to the first object, wherein the third data item has a third identifier;
further modifying the first DocString identifier using the third identifier;
identifying a relationship between the first, second, and third data items using the first DocString identifier, wherein modifications to the first DocString identifier indicate the relationship between the first, second, and third data items;
providing information relating to the first object based at least on the identified relationship;
determining that the first object is combined with a second object to create a third object, wherein the second object is associated with a second DocString Identifier;
creating a combined DocString identifier, wherein the combined DocString identifier is based on the first DocString identifier and the second DocString identifier;
receiving a fourth data item comprising a fourth identifier, wherein the fourth identifier is a unique identifier for the fourth data item; and
modifying the combined DocString identifier using the fourth unique identifier.

16. The non-transitory computer storage medium of claim 15, wherein the method further comprises:
determining that the third object is split into a fourth object and fifth object; and
creating a third DocString identifier, wherein the third DocString identifier comprises the first DocString Identifier, the second DocString Identifier, and a unique identifier for the fifth object.

17. The non-transitory computer storage medium of claim 15, wherein the first data item and the second data item include attribute information about the first object, and wherein the provided information comprises a score based on the attribute information.

18. The non-transitory computer storage medium of claim 17, wherein the second data item is a sequential chain component, and wherein the sequential chain component comprises data representing the movement of the first object as it transits through the sequential chain.

19. The non-transitory computer storage medium of claim 15, wherein modifying the first DocString identifier comprises concatenating the first identifier with the second identifier.

20. The non-transitory computer storage medium of claim 15, wherein the third data item is a sequential chain host entity, wherein the sequential chain host entity comprises data pertaining to an entity that is related to at least a particular portion of the sequential chain.

* * * * *

UNITED STATES PATENT AND TRADEMARK OFFICE
CERTIFICATE OF CORRECTION

PATENT NO.        : 8,819,026 B2
APPLICATION NO.   : 13/218288
DATED             : August 26, 2014
INVENTOR(S)       : Randal B. Fischer It is certified that error appears in the above-identified patent and that said Letters Patent is hereby corrected as shown below:

In the Drawings

Replace old "FIG 12" with new FIG 12 attached hereto as "REPLACEMENT SHEET".

Replace old "FIG 22" with new FIG 22 attached hereto as "REPLACEMENT SHEET".

Replace old "FIG 28" with new FIG 28 attached hereto as "REPLACEMENT SHEET".

Sheet 8, Fig. 8, Object 818, change "(n-1" to --(n-1)--.

Sheet 9, Fig. 9, Object 816, should be Object --828--.

Sheet 9, Fig. 9, Object 801, change "SCC (n-1" to --SCC (n-1)--.

In the Specification

In column 5, line 34, change "storage tanks)" to --storage tanks).--

In column 15, line 24, change "the" to --that--.

In column 15, line 58, change "812" to --826--.

In column 16, lines 4, 5, 41, 45, 48, 66, and 67, change "812" to --826--.

In column 16, line 38, change both instances of "816" to --828--.

In column 16, line 44, change "816" to --828--.

In column 16, line 47, change "814" to --830--.

In column 16, line 57, change "FIG. 8" to --FIG. 18--.

In column 17, lines 2, 29, 31. 39, 42, 46, and 58, change "816" to --828--.

In column 17, lines 4, 27, 30, and 33, change "812" to --826--.

In column 17, lines 5 and 6, change "814" to --830--.

In column 18, lines 24, 28, 39, and 60, change "816" to --828--.

In column 19, line 5, change "812" to --826--.

In column 20, line 47, change "816" to --828--.

Signed and Sealed this
Twenty-fourth Day of March, 2015

Michelle K. Lee
*Director of the United States Patent and Trademark Office*

In column 32, line 52, remove the paragraph indentation.

In column 32, line 59, change "either provided" to --either be provided--.

In column 53, line 40, change "continues" to --continue--.

In column 58, lines 6-12, replace old equation with new equation:

$$\text{"SCR Score (1)"} = \left\{ \frac{\lfloor (V)+(2*X)+(3*AB) \rfloor}{6} \right\}$$

In column 58, lines 37-42, replace old equation with new equation:

$$\text{"SCR Score (2)"} = \left\{ \frac{\lfloor (1.5*Y)+(Z)+(3*AA) \rfloor}{5.5} \right\}$$

In column 61, line 29, remove the "." before "operation".

In column 61, line 35, change "3012" to --3010--.